US012658545B2

(12) United States Patent
Fleury et al.

(10) Patent No.: US 12,658,545 B2
(45) Date of Patent: Jun. 16, 2026

(54) MICROWAVE OR MILLIMETER WAVE PASSIVE COMPONENTS OR DEVICES

(71) Applicant: ECOLE POLYTECHNIQUE FEDERALE DE LAUSANNE (EPFL), Lausanne (CH)

(72) Inventors: Romain Fleury, Denges (CH); Maliheh Khatibi Moghaddam, Crissier (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 590 days.

(21) Appl. No.: 17/914,249

(22) PCT Filed: Mar. 23, 2021

(86) PCT No.: PCT/IB2021/052399
§ 371 (c)(1),
(2) Date: Sep. 23, 2022

(87) PCT Pub. No.: WO2021/191794
PCT Pub. Date: Sep. 30, 2021

(65) Prior Publication Data

US 2023/0109939 A1 Apr. 13, 2023

(30) Foreign Application Priority Data

Mar. 25, 2020 (WO) .................. PCT/IB2020/052819

(51) Int. Cl.
*H01P 1/208* (2006.01)
*H01P 3/12* (2006.01)

(52) U.S. Cl.
CPC ................ *H01P 1/208* (2013.01); *H01P 3/12* (2013.01)

(58) Field of Classification Search
CPC .. H01P 1/208; H01P 3/12; H01P 1/211; H01P 1/2138; H01P 1/219; H01P 1/2005
See application file for complete search history.

(56) References Cited

U.S. PATENT DOCUMENTS

2005/0128028 A1 6/2005 Sanchez et al.

FOREIGN PATENT DOCUMENTS

CN 106299573 A 1/2017
ES 2 355 341 3/2011

(Continued)

OTHER PUBLICATIONS

Wook-Ki Park, Hyun-Yong Lim, Dong-Woo Kim, and Soon-soo Oh, "A frequency tunable SRR adopted two pole waveguide filter operating below the cutoff frequency" , Apr. 6, 2017, Hindawi International Journal of Antennas and Propagation vol. 2017, Article ID 3915709, 6 pages.*

(Continued)

*Primary Examiner* — Andrea Lindgren Baltzell
*Assistant Examiner* — Kimberly E Glenn
(74) *Attorney, Agent, or Firm* — Nixon & Vanderhye P.C.

(57) ABSTRACT

The invention discloses a waveguide power divider with a high-pass filtering function, and solves the problems of overlarge length dimension and incapability of placement in a narrow space after a conventional waveguide power divider is connected with a waveguide high-pass filter in a cascading manner. An upward input waveguide port (1) is formed in the upward side of the middle part of a cavity; a gradually-changed waveguide transitional section (2) and a waveguide T-shaped junction (3) are arranged behind the input waveguide port; the two ends of the waveguide T-shaped junction (3) are combined with an impedance conversion transitional stage (4), a bending waveguide (5), a gradually-changed waveguide transitional section (6) and (Continued)

a downward output waveguide port (7) together; a microwave signal enters the waveguide power divider through the input waveguide port (1); then the waveguide wide edge is narrowed in the gradually-changed waveguide transitional section (2), so that a high-pass filter effect is achieved by a cut-off effect on a low-frequency signal by the waveguide; and meanwhile, a power divider effect is realized through the waveguide T-shaped junction (3).

21 Claims, 46 Drawing Sheets

(56) References Cited

FOREIGN PATENT DOCUMENTS

| | | | | | |
|---|---|---|---|---|---|
| WO | WO-2005096350 | A2 | * | 10/2005 | H01L 23/49838 |
| WO | WO-2012153164 | A1 | * | 11/2012 | H01Q 1/40 |
| WO | WO-2024134500 | A1 | * | 6/2024 | |

OTHER PUBLICATIONS

International Search Report dated Aug. 20, 2021, for PCT/IB2021/052399, 6 pp.

Written Opinion of the ISA dated Aug. 20, 2021, for PCT/IB2021/052399, 17 pp.

International Search Report dated Mar. 4, 2021, issued in International Application No. PCT/IB2020/052819, 6 pages.

Written Opinion of the International Searching Authority dated Mar. 4, 2021, issued in International Application No. PCT/IB2020/052819, 14 pages.

Kaine, Nadège, et al., "Slow waves in locally resonant metamaterials line defect waveguides", Scientific Reports, Nov. 8, 2017, vol. 7, No. 1, 11 pages.

Rajo-Iglesias, Eva, et al., "Groove Gap Waveguide: A Rectangular Waveguide Between Contactless Metal Plates Enabled by Parallel-Plate Cut-Off", 2010 Proceedings of the Fourth European Conference on Antennas and Propagation (EUCAP), IEEE, Apr. 12, 2010, 4 pages Snyder, Richard V., et al., "Broad Passband, Wide Stopband, High Power Evanescent Mode Filters Using Capacitively-Loaded Ridges", Proceedings of the 42nd European Microwave Conference, Oct. 29-Nov. 1, 2012, pp. 176-179.

Chinese First Office Action dated Mar. 25, 2025 for CN Application No. 202180037906.9.

* cited by examiner

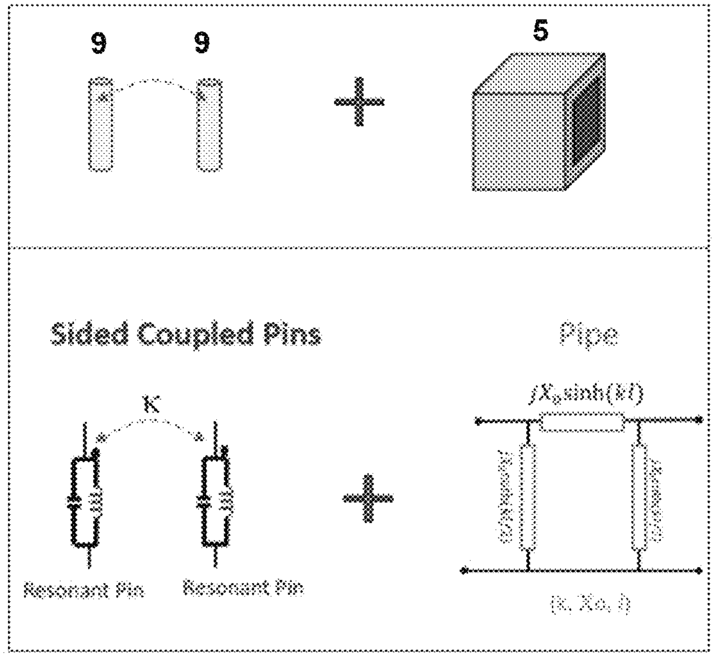
FIGURE 1C
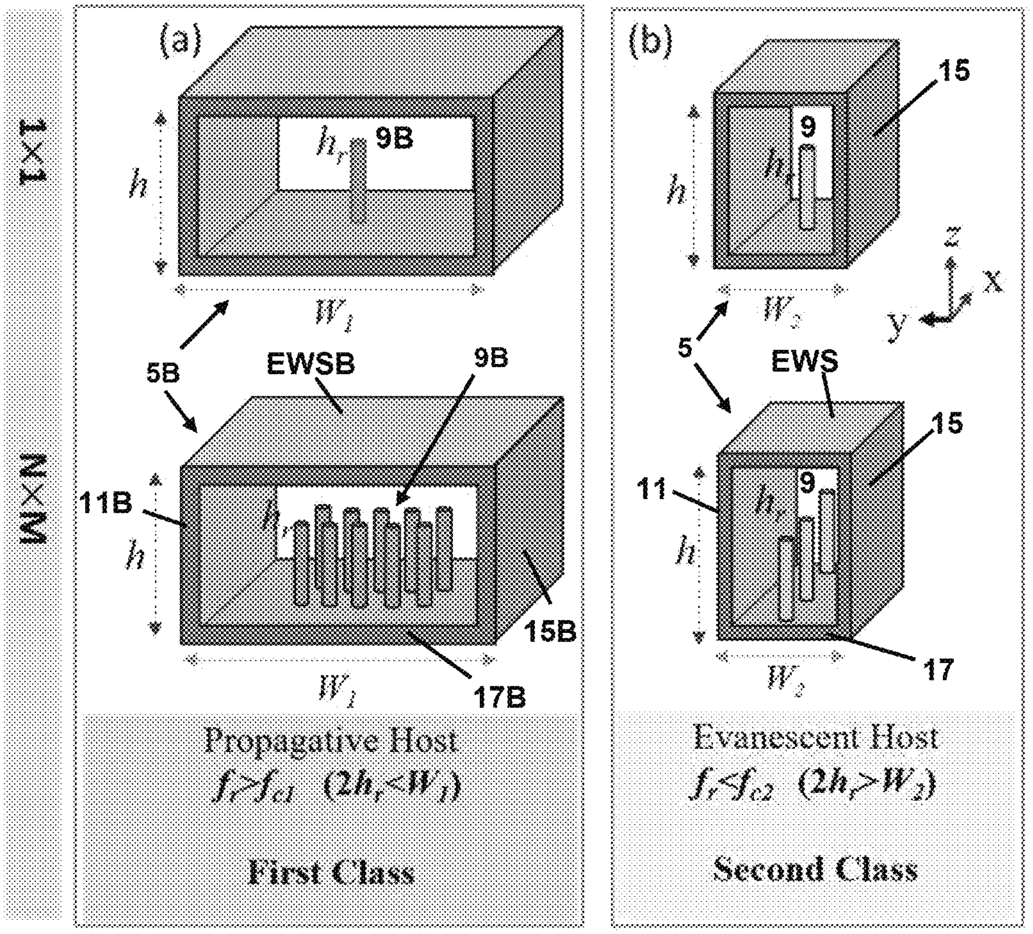
FIGURE 1D
FIGURE 1E

MICROWAVE OR MILLIMETER WAVE PASSIVE COMPONENTS OR DEVICES

CROSS-REFERENCE TO RELATED APPLICATIONS

This application is the U.S. national phase of International Application No. PCT/IB2021/052399 filed Mar. 23, 2021, which designated the U.S. and claims priority to international patent application PCT/IB2020/052819 filed on Mar. 25, 2020, the entire contents of each of which being herewith incorporated by reference.

FIELD OF THE INVENTION

The present invention relates to microwave or millimeter-wave passive components or devices and in particular to microwave or millimeter-wave waveguide components or devices such as microwave or millimeter wave filters, diplexers, and multiplexers. More particularly, the present invention concerns subwavelength or deep subwavelength microwave or millimeter-wave waveguide components or devices such as microwave or millimeter wave filters, diplexers, and multiplexers based on locally resonant materials or metamaterials.

BACKGROUND

Waveguide technology is widely used for construction of microwave passive devices such as filters, allowing for low loss and high-power handling capability. They are regularly used in satellite communications and radar systems, however, they are typically larger than the wavelength, leading to somehow bulky and heavy metallic components, which can be a problem in some applications, including embedded technologies. The next decade is likely to see a considerable rise in demand for small satellite communications, such as Cube/nano/micro/mini satellites, due to their low mass and small size that enables several satellites to be launched simultaneously from a single-vehicle launcher. Finding solutions for compact and lightweight microwave waveguide components is, therefore, a much-sought need in the development of these future technologies.

Conventional transmission media, regularly used for the implementation of Microwave/Millimeter-wave components, include rectangular waveguides, microstrip lines, coplanar waveguides, and substrate integrated waveguides. Researchers have been nonetheless looking for a solution to improve plenty of technological factors in the design of microwave components, such as lower cost, smaller size, less weight, increased system density, cross-talk suppression, and protected packaging [1]. However, while the microstrip and coplanar lines are known as robust and low-cost transmission lines, they suffer from potentially higher insertion loss due to the presence of lossy dielectric materials and low power-handling capabilities. Thus, in high-power applications, such as radars and space communication systems, microwave components are traditionally implemented based on waveguide technology [2]. Hollow rectangular waveguides, which are commonly used to realize low-loss antenna system components, are typically massive and bulky, due to the geometrical scaling governed by operating frequency [3][4] (at GPS frequency the typical waveguide width is 10 cm). Moreover, for realizing a filter or other microwave passive components, which operate based on wave interferences, the necessity of cascading several bulky waveguide cavities drastically increases the size of the components (a GPS frequency filter can be half a meter long). Therefore, compactions and low weight of microwave components have become critical issues, especially for small satellite systems. The demand for miniaturizing microwave passive components is evident when we consider cube/nano/micro satellites [5], with a remarkable growing demand, which is typically several kilograms and composed of cubic units with sizes around 10 cm×10 cm×11.35 cm. Therefore, the size of the connected microwave components, attached to the antenna feed, has to be less than the size of one unit [6].

For the design of waveguide passive devices, different topologies and techniques have been already proposed and implemented, mainly based on E-plane or H-plane irises, stubs, posts, and corrugation [2], [7], [8]. All the dimensions of these filters directly scale with the operating wavelength. The traditional strategies mostly use the direct coupled-cavity configuration, as a cascade connection of waveguide cavities with different cross-sections. For more complex filtering functions, canonical waveguide filters, involving couplings between nonadjacent cavities have also been studied, in which the multiport rectangular waveguide junctions need to be considered as additional basic blocks. Another method for the design of the filters is based on employing the evanescent modes [9]. In this technique, the filter is essentially composed of a hollow waveguide housing, which transmits the energy between standard waveguide access ports through shunt capacitive elements. Despite the width of these filters is slightly smaller than the conventional ones, and the operating frequency is below the cut off frequency of the dominant mode, there is no impressive length reduction that can be observed in this type of microwave filters[10]-[13].

Among all microwave passive components, diplexers and multiplexers have more complexity and are used to connect two or more channels to a common port. They are playing a vital role in the satellite systems. Diplexers enable two signals to be transmitted simultaneously on the same communications channel or allow transmitting one frequency while receiving another (in which case they are called duplexer). The receiver filters work with low power signals, while the transmitter filters need to handle high powers. Thus, duplexers are thus created based on waveguide technology. Besides, the design of diplexers and multiplexers depends on the type of channel filters, which can be in various topologies, such as waveguide manifold, T-junction, or a Y-junction [8], [14]-[17]. Steps need to be taken to prevent the filters from coupling to each other when they are at resonance. Therefore, different factors lead to the large electrical size of these systems, like the wavelength-scaled building blocks, the arrangement of the cavities, and the minimum space needed for minimizing the crosstalk.

SUMMARY OF THE INVENTION

Certain example embodiments address the above-mentioned limitations by providing a microwave or millimeter wave passive device and/or a method relating to same. Certain example embodiments may concern a microwave or millimeter wave passive device and/or component.

Other advantageous features can be found in the dependent claims.

To address the limitations of current microwave filters, here, an innovative approach is introduced that can be used as an alternative to conventional waveguide technology for creating filters and multiplexers, compatible with coaxial, standard waveguide flanges, and/or circular/rectangular antenna feeds. This innovative approach to filters, based on for example subwavelength resonant metallic elements (for example, pins) placed in a cut-off cavity or waveguide, is a miniaturized and different approach to waveguide technology that utilizes both the frequency selection properties of the resonant pins and the induced capacitive properties of the host cut-off rectangular cavity or waveguide. The electrical inclusions (resonant metallic elements (for example, pins or wires) can be for example realized by additive manufacturing techniques and are connected to, for example, the all-metal structure. Since the dispersion properties of the guided mode interestingly depend on the width of the host cut-off cavity or waveguide, the adjustable bandwidth (for example, 1%-30% or greater (up to 80%)) can be obtained without altering the shape and position of the resonant inclusions.

The invention of the present disclosure addresses crucial limitations in the design of ultra-compact microwave bandpass filters, diplexers, and multiplexers. According to the present disclosure, a locally resonant metamaterial (LRM) is, for example, enclosed in an all-metal structure, and composed of electrical resonant inclusions or elements, realized for example by a wire medium. All microwave systems that are used in radar systems, 5G communications, medical instruments, automotive radars, radio links, machine to machine systems radio astronomy, and especially satellite communications, can benefit from this invention in both hollow waveguide and planar structure.

The innovation of the present disclosure assures bandwidth adjustability permitting customizability and/or tunability. Customizability of the bandwidth enables to create custom filters based on requirements. Turnability assures reconfigurable filters. Moreover, since the possibility of simple bandwidth tunability is one particular feature of this disclosure, it can also pave a way for the design and implementation of reconfigurable subwavelength waveguide filters. Reconfigurable bandpass filters [18], [19], which are conventionally implemented based on evanescent-mode cavity resonators[9], [18]-[23], are the key enabling components of highly-versatile RF broad-band receivers [13], [23]. From a system perspective, an equally diverse pool of communication, radar, electronic warfare, and sensing systems need reconfigurable filters. Among the widespread applications and different frequency ranges, non-limiting and exemplary first prototypes of the proposed technology is implemented for the Ku-band (12-18 GHz) one of the most commercially used frequency bands in the satellite communication for the fixed-satellite service (FSS), the broadcast satellite service (BSS), as well as telecommunication broadband services [7]. The frequency range is not limited to this exemplary frequency band of the Ku-band used here solely for prototype purposes. The benefits of the device and methods of the present disclosure concern the microwave frequency range and the millimeter wave frequency range, for example, in general in the frequency range 100 MHz to 100 GHz, and for example, in particular the frequency range of 1 GHz to 100 GHz.

The invention introduces a new technique for realizing custom ultra-compact and tunable all-metal microwave passive components, such as bandpass filters, diplexers, and multiplexers. The proposed components can be created for example, from metallic boxes, containing for example one or more (substantially or near) quarter-wavelength wires attached to their walls. These wires or pins are working as coupled subwavelength resonators, separated by deep subwavelength distances. These resonators, by adjusting their geometry and arrangement, are used to guide and filter electromagnetic energy in subwavelength volumes. Beyond filtering, other functionalities like duplexing or multiplexing are also possible. Remarkably, filtering frequency does not scale with the transverse system size or pin diameter but mostly depends on the pin height.

Since the exemplary diminutive metallic waveguide bandpass filter can be used as an alternative for conventional waveguide technology, many systems, such as radar systems; 5G communications, medical instruments, automotive radars, radio links, machine to machine systems; radio astronomy; and particularly satellite communications, can take advantage of the compactness and lightweight enabled by the invention. The proposed bandpass filter, which can be easily designed to operate as both a narrowband and wideband filter, provides a basic element for the design of diplexers and multiplexers with a miniaturized architecture, that could be used in small satellites. Prototypes can be realized entirely using additive manufacturing, such as selective laser melting and lost cast waxing, which employs lightweight and low loss materials such as aluminum alloys (AlSi10Mg), Copper, Brass, and silver alloys. Therefore, the invention is compatible with existing high-speed and relatively low-cost manufacturing processes. To reduce the insertion loss and the risk of multipactor effect, silver/gold plating can be considered for the interior part or interior surface and/or the exterior part or surface of the devices or components of this present disclosure.

Some key advantages of this invention are fully explained later in this disclosure. Here, it is briefly mentioned the main benefits of the proposed components or devices in comparison with conventional technologies used for the implementation of microwave passive components.

In addition to the main feature of compactness, achieved by subwavelength LRM enclosed inside a waveguide, the proposed waveguide passive devices promises customizable bandwidth and also tunability which can be used for implementing narrow band or wideband devices with the desired bandwidths between for example 1% to 30% or greater (up to 80%). In order to obtain this tunability, one merely changes the width of the host waveguide, without the necessity of adjusting the subwavelength resonators or adding coupling parts. This characteristic opens a new way for the design of a reconfigurable filter using waveguide technology, whose quasi-elliptic-type transfer function is adjustable. Besides, the simplicity of the design procedure for the proposed bandpass filter, promises a customizable type of microwave filters, which is a significant key aspect of this invention. The design and modeling of the RF parameters of the filters are not based on the circuit model of the resonators, but it is performed using controlling the dispersion of the guided mode, based on tunneling through the cascaded subwavelength (sub-λ) resonators. Furthermore, due to the small mode profile of the guided mode, low crosstalk for adjacent waveguides is predictable, which is significantly leading to compact diplexers with close channels and miniaturized multiplexers in a small volume. On the other hand, the high level of rejection, caused by the hybridization bandgap (HBG) of LRMs, results in an improved stopband for bandpass filters and high isolation between the channels in diplexer and multiplexers.

As explained above, the invention uses the physics of locally-resonant metamaterials at microwave frequencies to introduce new technology for the design and synthesis of deep subwavelength filters, duplexers, multiplexers, or other microwave systems. The ability of locally-resonant metamaterials to guide energy at subwavelength scale or induce slow light has been reported [47], however, they have never been considered nor suggested for the practical realization of microwave filters or duplexers. These metamaterials are regularly studied under an effective medium approximation and mostly exploited for their high refractive indices [28]-[30], subwavelength imaging or focusing [31]-[34] or for their negative effective properties[33], [35]-[38].

Resonant metamaterials have been studied in two classes. Epsilon negative media (ENG), which display a negative permittivity ($\varepsilon_r$) while permeability ($\mu_r$) is positive; and Mu-negative media (MNG), which display a positive $\varepsilon_r$ and negative $\mu_r$[39]. While ENG metamaterials consist of electric resonant inclusions, conventionally used at optical frequencies, the MNG metamaterials, include magnetic resonant inclusion, have relatively easier design and fabrication at microwave frequencies. Due to the easy fabrication of MNG inclusion, such as split-ring resonators (SRRs) or complementary split rings resonators (CSRRs), researches have also been implemented some types of metamaterial microwave filters on microstrip and coplanar transmission lines [40]-[42]. The resonant inclusions on a microstrip host medium show strong interaction with electromagnetic waves and they can be used as a microwave filter when they are combined with other elements such as series capacitances or shunt inductances. It has been demonstrated that the resonant SRRs and CSRRs are useful particles for narrowband and wideband filters respectively [39], [41] [5]. Nevertheless, these prior examples of metamaterial filters proposed in the literature are based on microstrip or coplanar transmission lines and, as such, are incompatible with high-power applications (satellite payloads or radar systems) in connection with the antenna feeds, which require a technology compatible with the coaxial or rectangular waveguide. Our invention is different as it is based on a metallic cavity, making it compatible with high-power feeds.

Recently, the potential of controlling the wave in 2D locally resonant metamaterials (LRMs), based on electrical resonant inclusions at microwave frequencies, has been introduced in [43], which has demonstrated the ability of subwavelength wave manipulation in a wire medium[44]-[46]. In this approach, the physics of locally resonant metamaterials has been studied relying on the Fano interference between the local resonance of the unit cell and the continuum of plane waves, inducing a hybridization bandgap. Instead of being based on Bragg interferences due to the phase delay provided by wave propagation between two scattering planes, Fano-interferences in LRMs are caused by the out-of-phase response of subwavelength resonators near their resonance frequencies. The operating frequency of these systems is due to the properties of the resonators and not their specific arrangement and therefore decoupled from their overall sizes. Line defect waveguide in an LRM is a good and simple example of subwavelength LRM waveguides [47], which works based on the tunneling between resonators rather than Bragg interference in gratings and photonic crystal waveguides [48]. Although the line defect waveguides developed in the prior art demonstrate subwavelength waveguides, they have never been applied to construct filters, duplexers or multiplexers. These waveguides have demonstrated a very narrowband transmission and high group velocity dispersion (GVD) around the resonance frequency of the wires. Moreover, a guided mode in [47] is created inside the bandgap of the LRM limiting the passband/rejection band of the device to the bandgap of the LRM. In comparison, the device of the present disclosure does not suffer from such limitations and assures a guided-mode of larger bandwidth and low dispersion, with custom passband and larger rejection band. Moreover, the guided mode of the devices of the present disclosure is not a defect mode.

The above and other objects, features, and advantages of the present invention and the manner of realizing them will become more apparent, and the invention itself will best be understood from a study of the following description with reference to the attached drawings showing some preferred embodiments of the invention.

A BRIEF DESCRIPTION OF THE SEVERAL VIEWS OF THE DRAWINGS

FIG. 1A shows the propagation of an incident wave in a chain of subwavelength resonators near the resonance frequency of $f_r$. FIG. 1B shows a dispersion curve of the 1D locally resonant metamaterial. FIG. 1C shows that the guiding mechanism of the microwave or millimeter wave device or component of the present disclosure is dependent on both the hollow waveguide and the pins enclosed therein. FIG. 1D shows the innovate concept of the present disclosure that is a locally resonant metamaterial waveguide (LRW) implemented as an exemplary PPW (pin-pipe waveguide) structure which is made by one or several resonant pins inserted in a host pipe or waveguide supporting a propagating mode around the resonance frequency of the pin ($f_r>f_{c1}$).

Figure 1A:
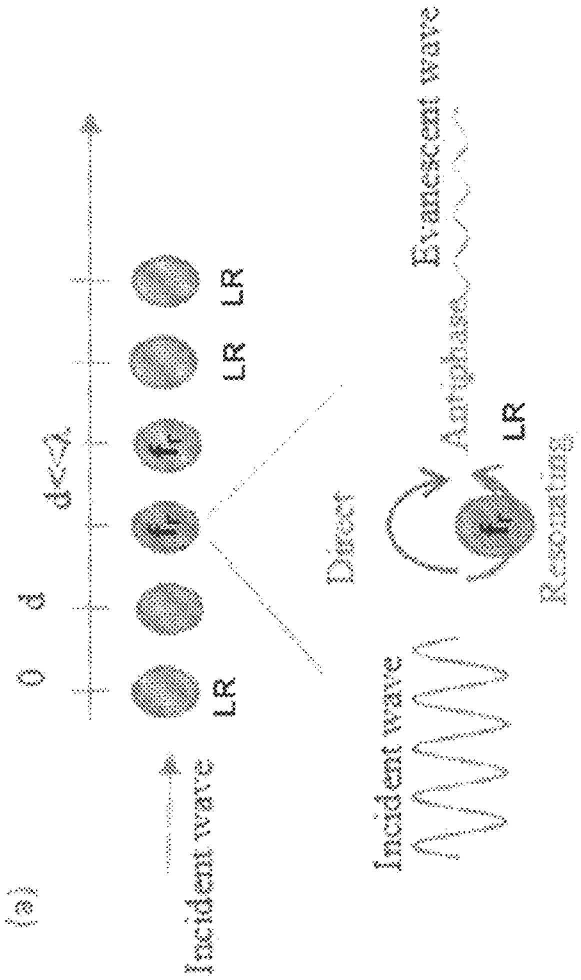
FIG. 1E shows a PPW structure which is made by one or several resonant pins inserted in a host waveguide and having a resonance frequency below the cut-off frequency of the waveguide ($f_r<f_{c2}$).
FIG. 1F shows (left) a pipe with cut off frequency of $f_c$, (middle) the 1D resonant metamaterial having resonance frequency $f_r$, and (right) the interaction of pins and the pipe to create a guided mode, where $f_r<f_c$.
Figure 1B:
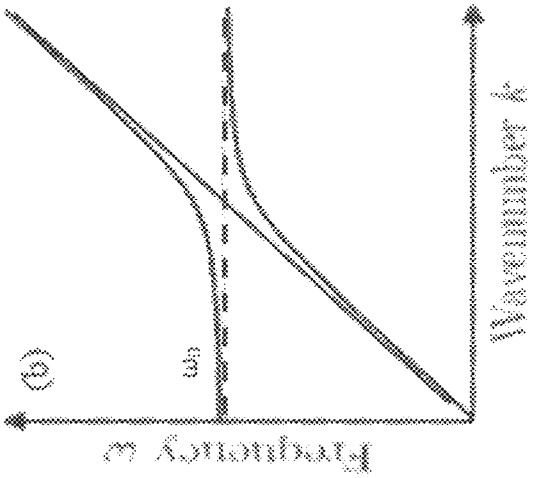
Figure 1F:
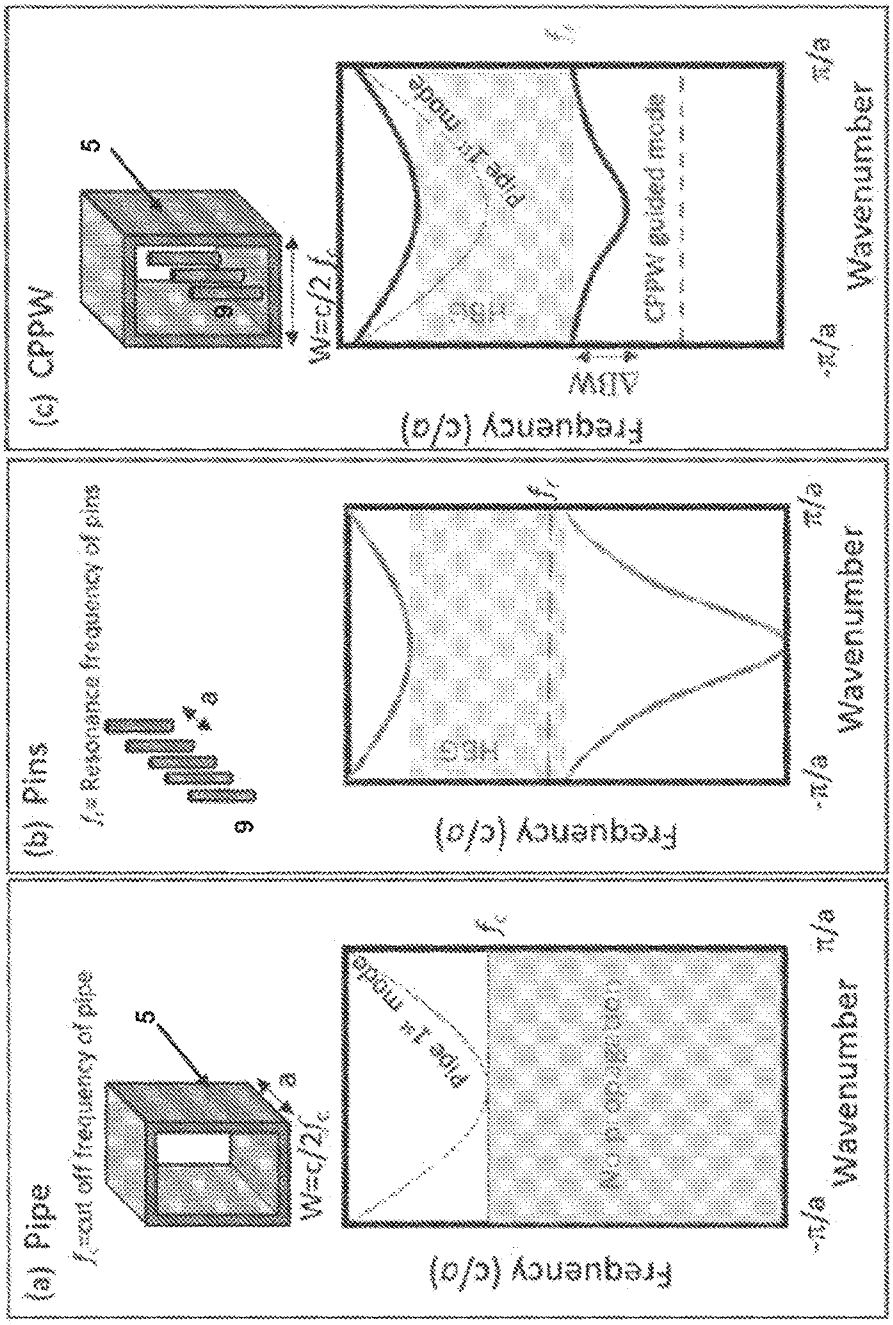
Figure 1G:
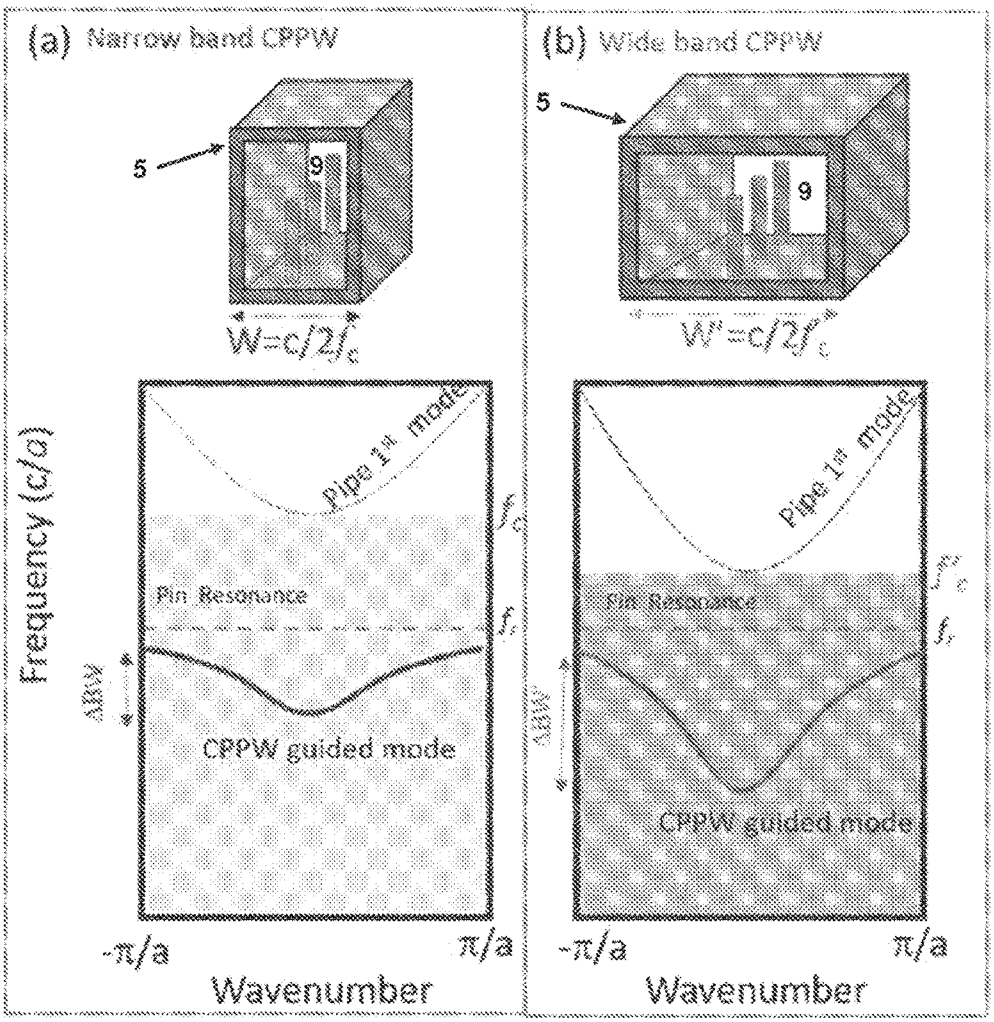
Figure 1H:
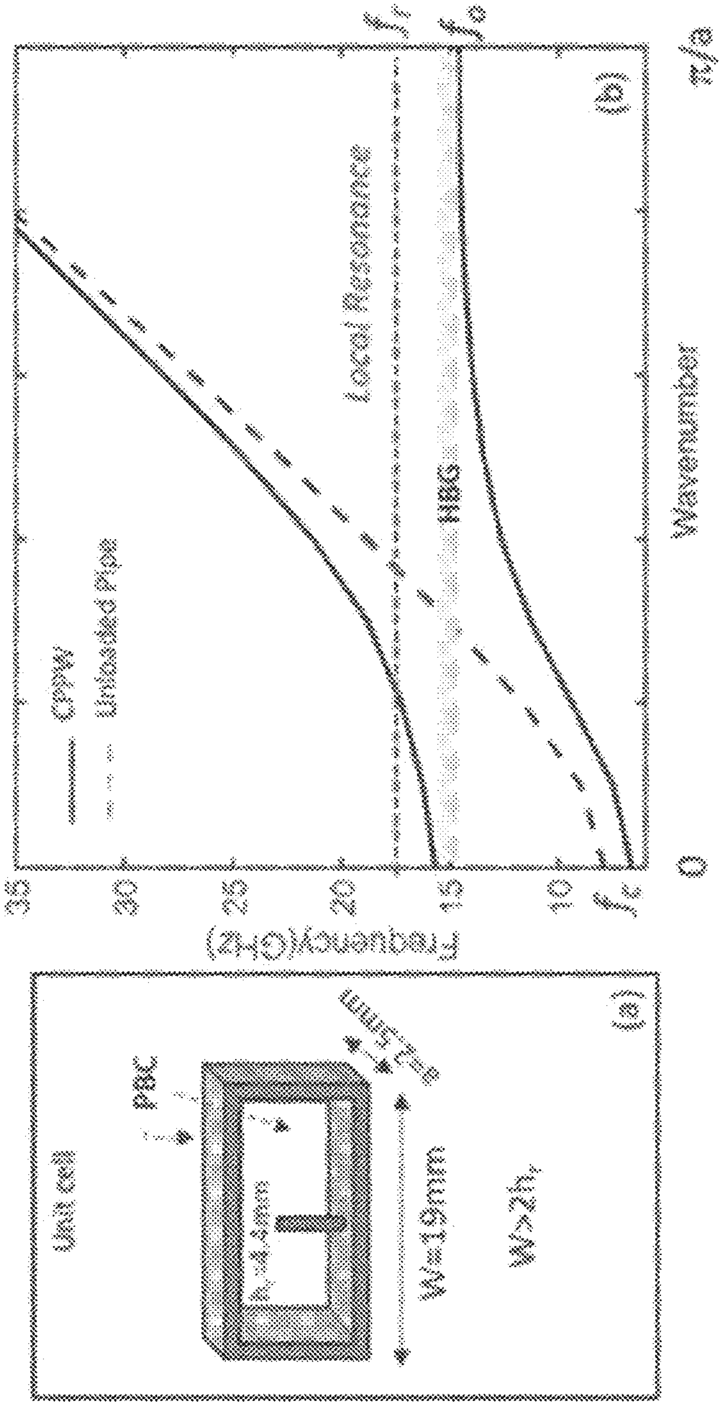

FIG. 1G shows pin-pipe waveguides operated below the pipe cut-off, with different widths of (a) W and (b) W', where W<W'. The dispersion curve of the sub-wavelength guided mode (solid line) of a PPW with an evanescent pipe is shown, where the dashed straight line shows the local pin resonance. The shaded region shows the cut-off region of the host pipe/hollow waveguide. FIG. 1H (left) shows the unit cell of the PPW with periodic boundary conditions (PCBs) along the host pipe direction, where $2h_r<W$. FIG. 1H (right) shows the band diagram of the structure, where the dashed line is the dispersion curve of the unloaded waveguide with cut-off frequency $f_c$, while individual local resonances are around $f_r$=17 GHz (first class $f_r>f_c$). The shaded region above $f_o$, (resonance frequency of the CPPW unit cell) features an HBG.

Figure 1I:
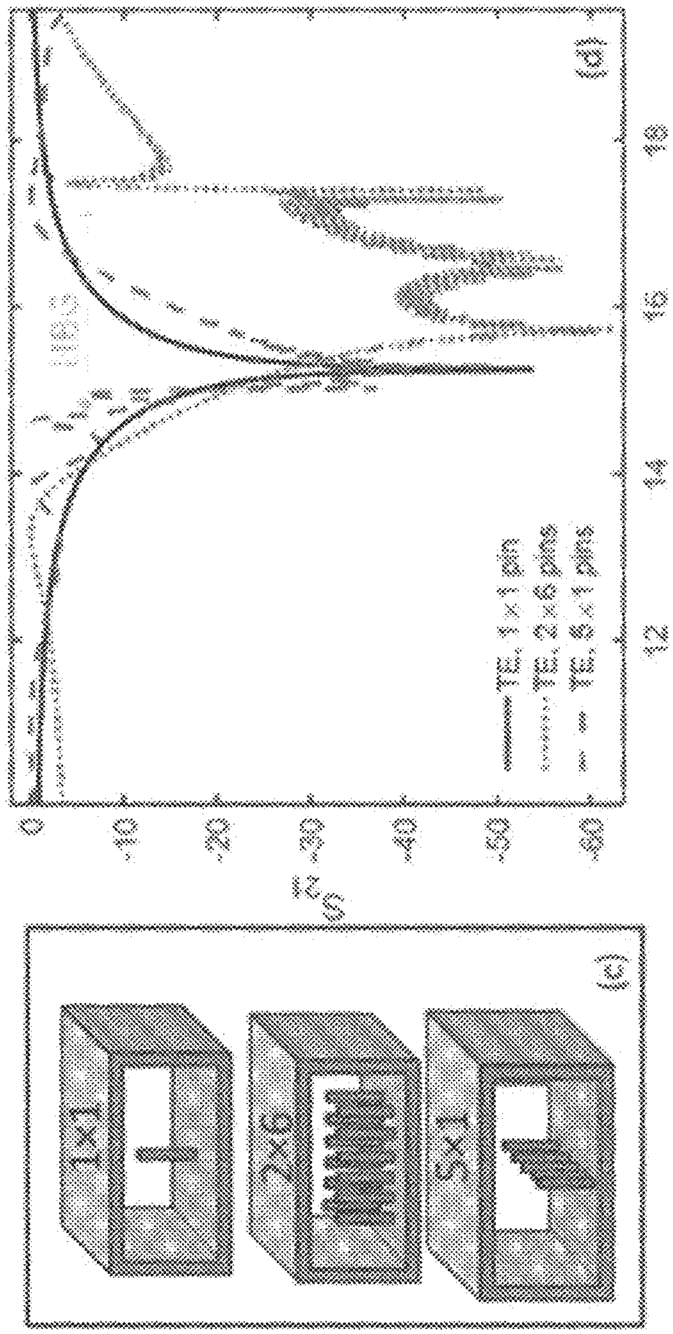

FIG. 1I shows (left) the propagative rectangular waveguides, loaded by different types of pin arrays, and (right) the transmission spectra of the different PPW structures (first class $f_r>f_c$).

Figure 2A:
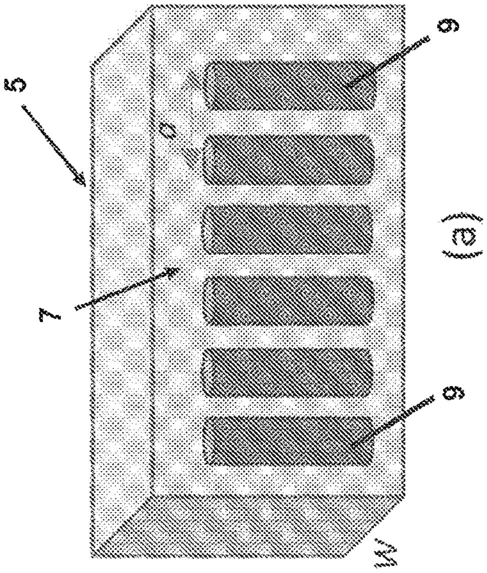
Figure 2B:
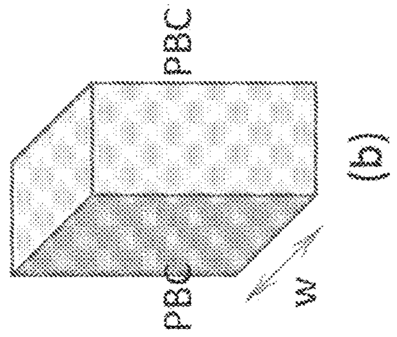
Figure 2C:
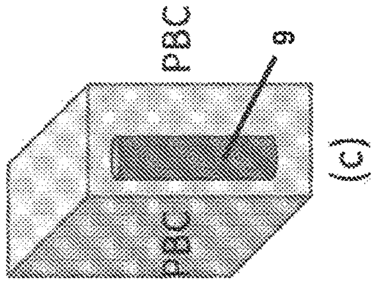

FIG. 2A schematically shows a chain or array of resonant pins in a hollow rectangular waveguide, where fr<fc or $2h_r>W$, FIG. 2B schematically shows a unit cell of an empty waveguide, and FIG. 2C schematically shows a unit cell of a locally resonant metamaterial (LRC) waveguide.

Figure 3:
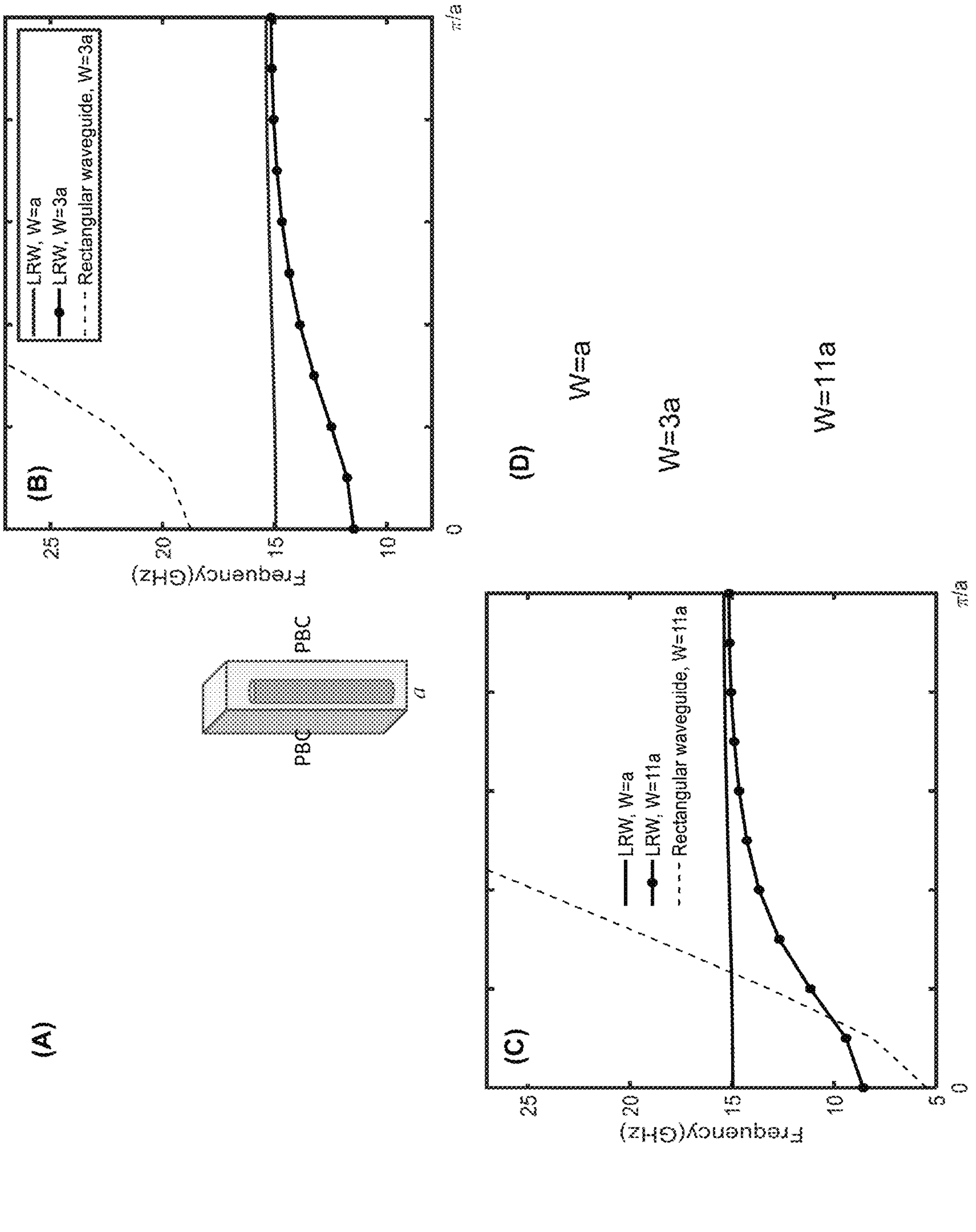

FIG. 3A shows a dispersion curve of an LRM waveguide (LRW) with an exemplary width of W=a=2.5 mm, FIG. 3B shows a dispersion curve of an LRM waveguide (LRW), for example a PPW, with exemplary widths of W=a=2.5 mm and W=3a=7.5 mm, FIG. 3C shows a dispersion curve of an LRM waveguide (LRW) with exemplary widths of W=a=2.5 mm and W=11a=27.5 mm, and FIG. 3D shows a dispersion curve of an LRM waveguide (LRW) with exemplary widths of W=a=2.5 mm, W=3a=7.5 mm, and W=11a=27.5 mm.

Figure 4A:
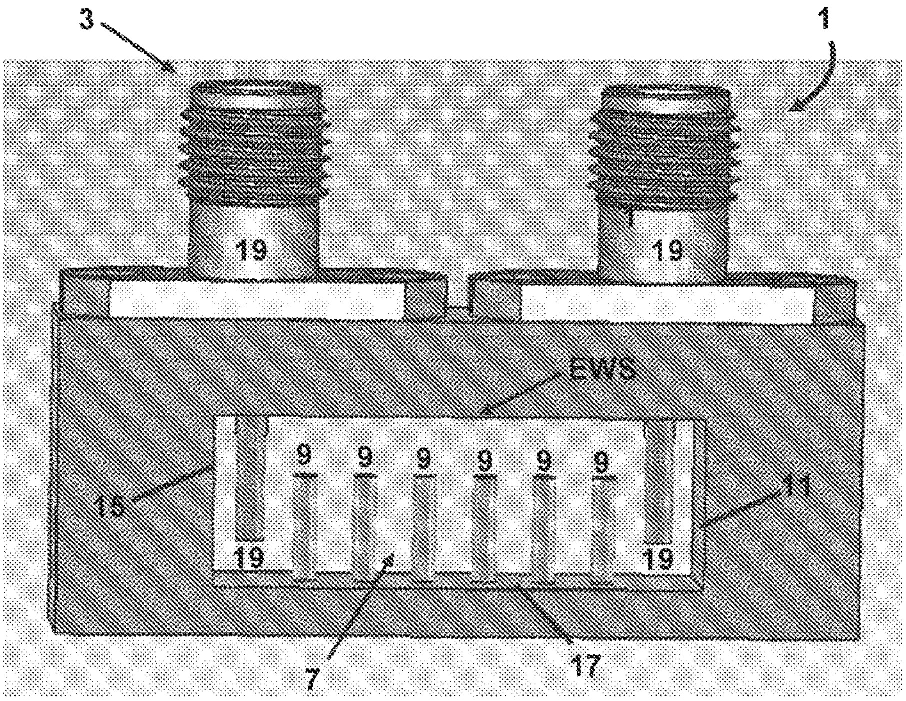
Figure 4B:
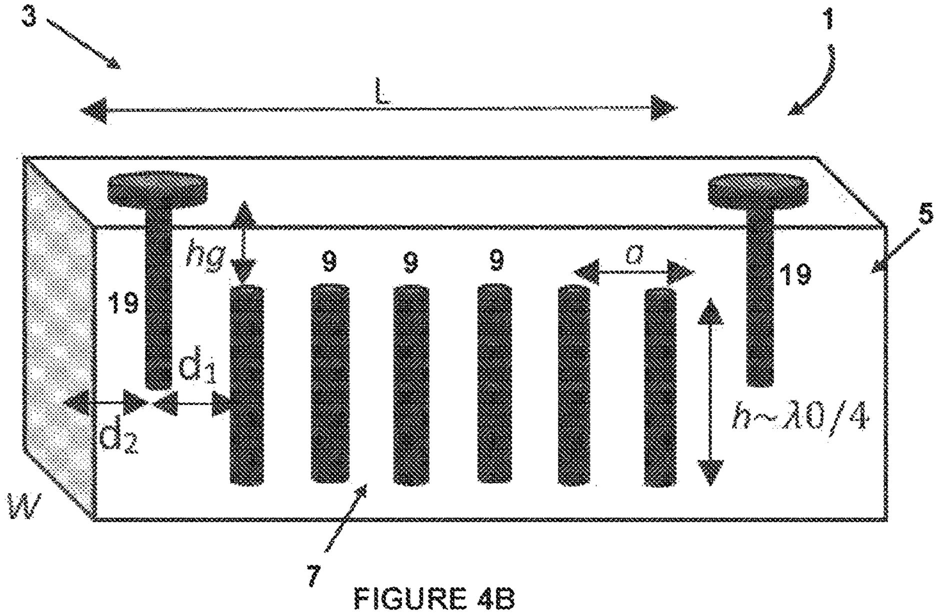

FIG. 4A shows an exemplary microwave component or device according to the present disclosure and more particularly shows an architecture including an exemplary connection that is a coaxial connection (coaxial ports) of an exemplary LRW filter or PPW filter. FIG. 4B shows main design parameters of the exemplary LRW filter that can be optimized for the best coaxial transition (high return loss), improved frequency selection, and less insertion loss.

Figure 5:
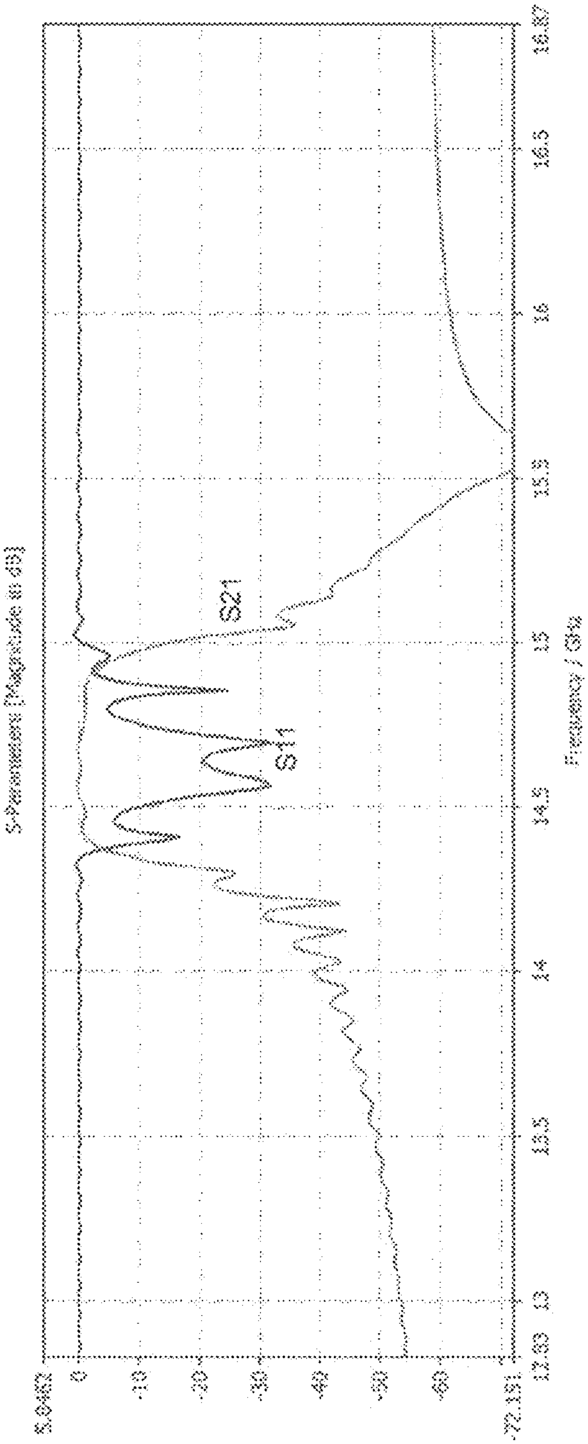

FIG. 5 shows the scattering spectra (S11 and S21) of an exemplary bandpass filter of the present disclosure for the optimized parameters of Table 1.

Figure 6:
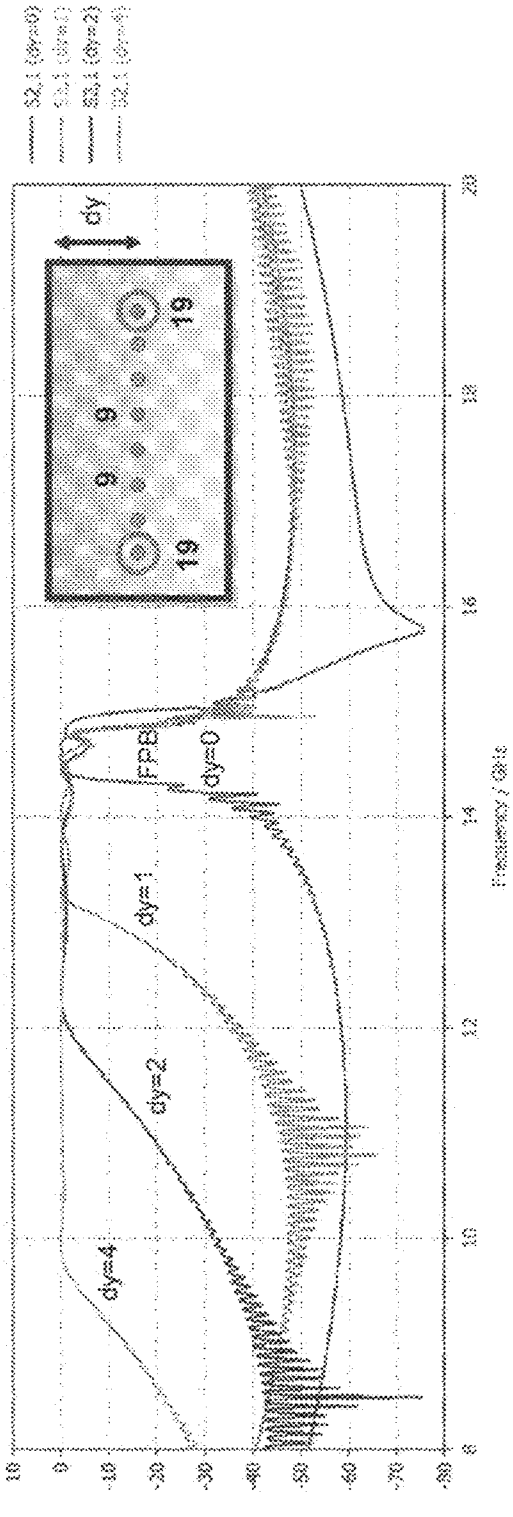

FIG. 6 shows $S_{21}$ scattering spectra of an exemplary bandpass filter for different values of $d_y$ (width of the waveguide).

Figure 7:
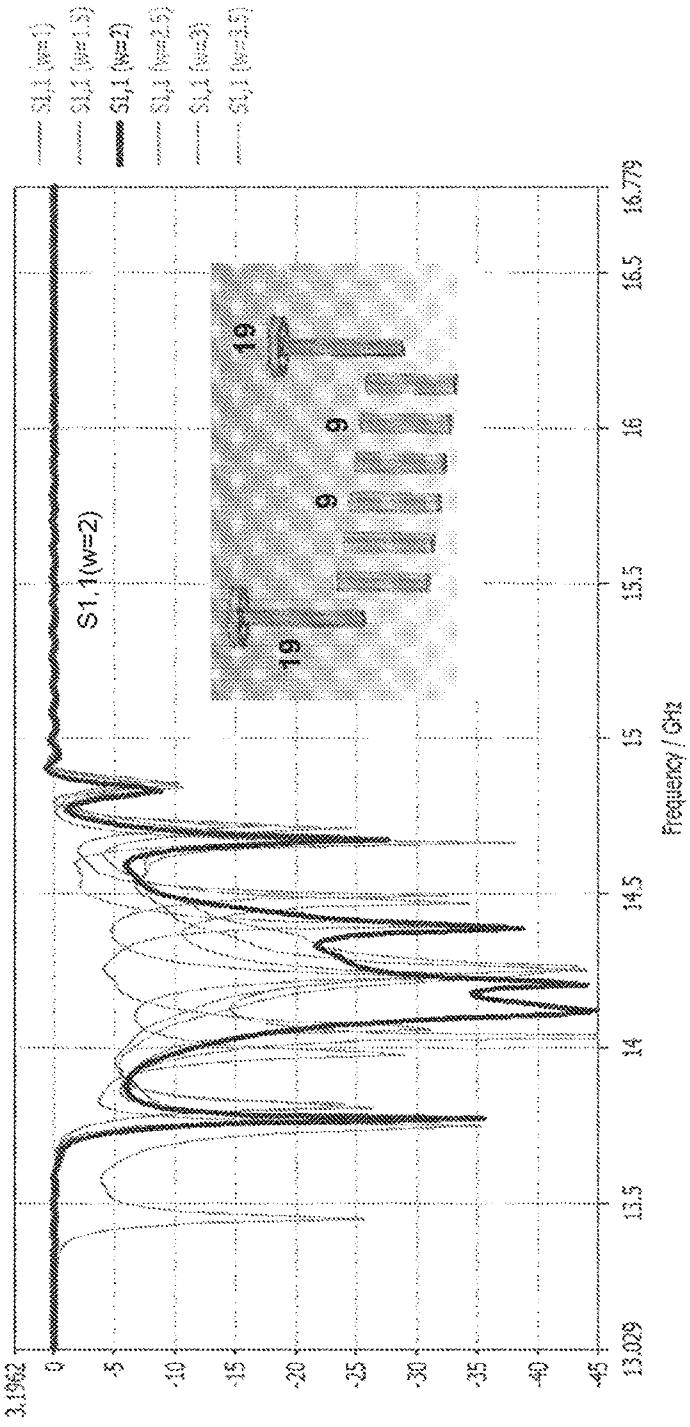

FIG. 7 shows a modified probe structure where a high return loss is obtained using, for example, strip antennas and, in this particular example, with a width of 2 mm.

Figure 8:
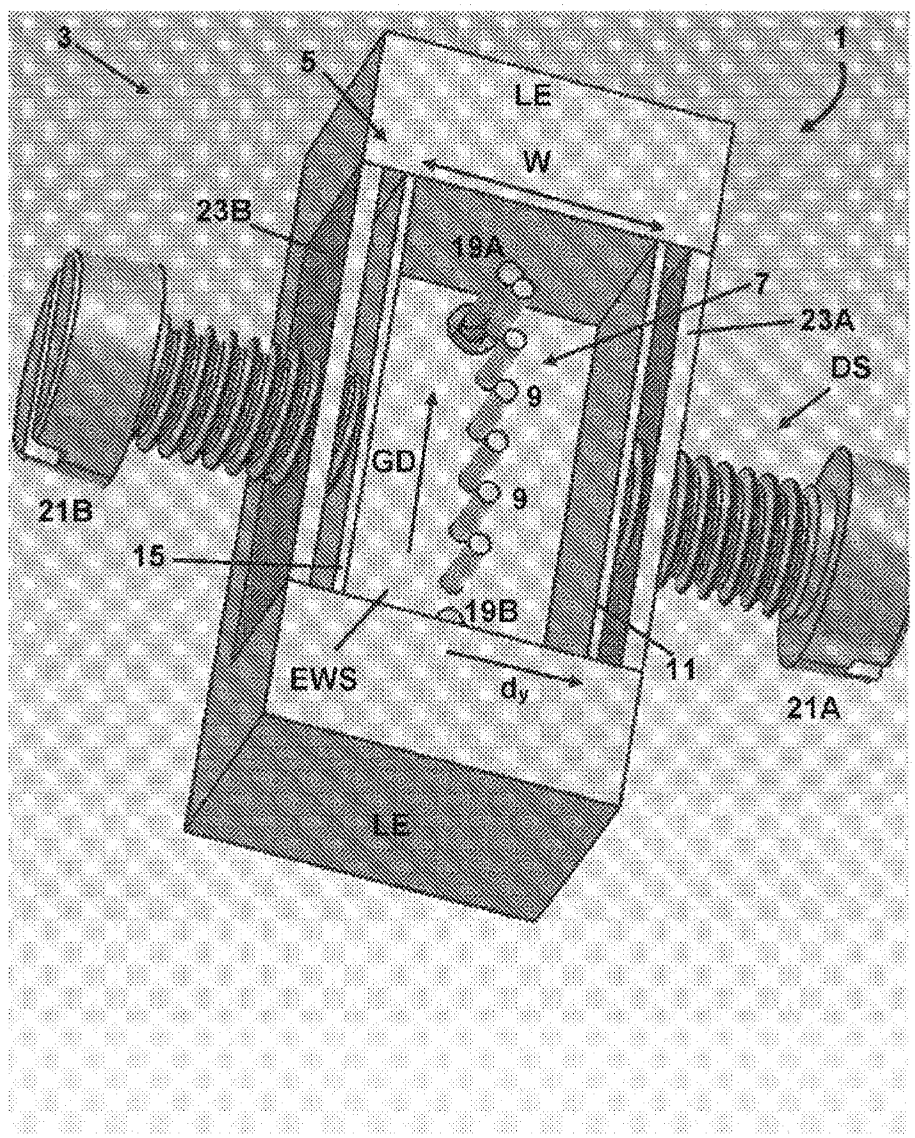

FIG. 8 shows an exemplary microwave or millimeter wave filter according to the present disclosure in which an exemplary simple structure is included for manual or automatic tuning of the bandpass filter bandwidth.

Figure 9A:
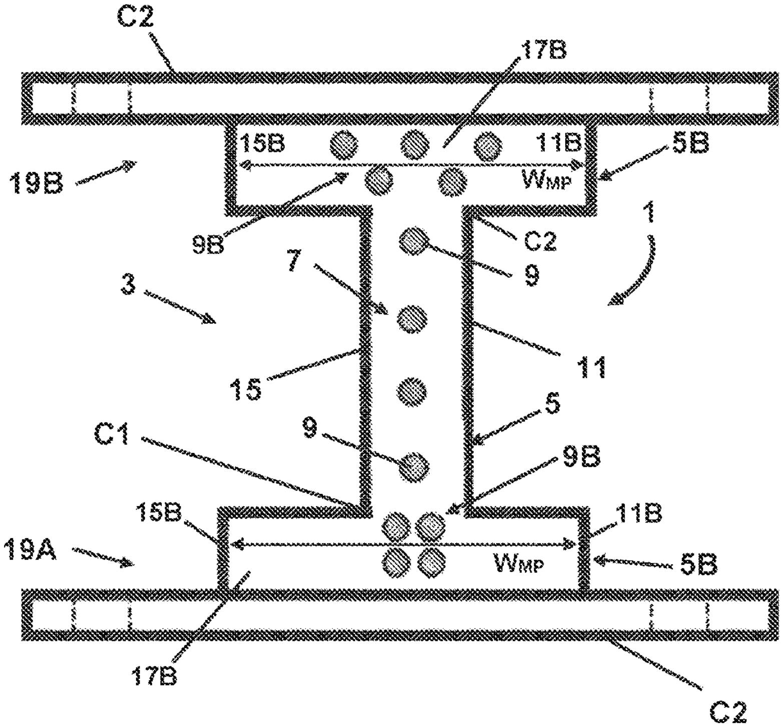
Figure 9B:
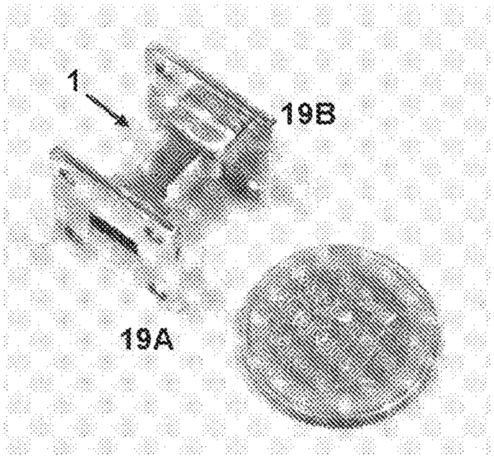
Figure 9C:
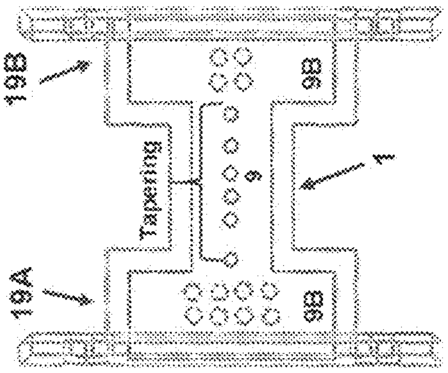
Figure 9D:
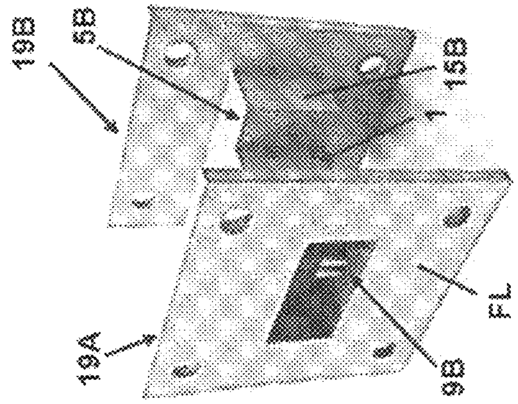
Figure 9E:
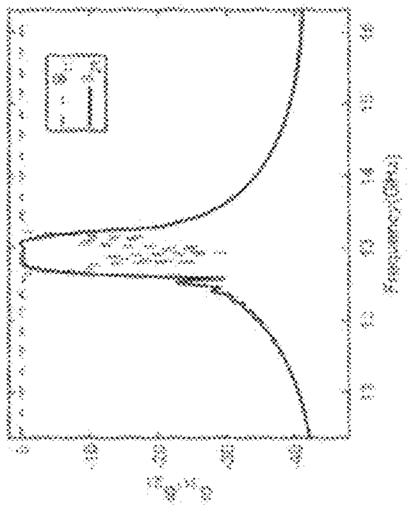

FIGS. 9A to 9D shows an exemplary microwave or millimeter wave bandpass filter according to the present disclosure that includes an input metamaterial port and an output metamaterial port (first class PPWs), FIG. 9E shows the passband or frequency response of the exemplary filter of FIG. 9D exploiting tapering a distance between pins of the hollow waveguide, and the advantages brought by the metamaterial ports.

Figure 10:
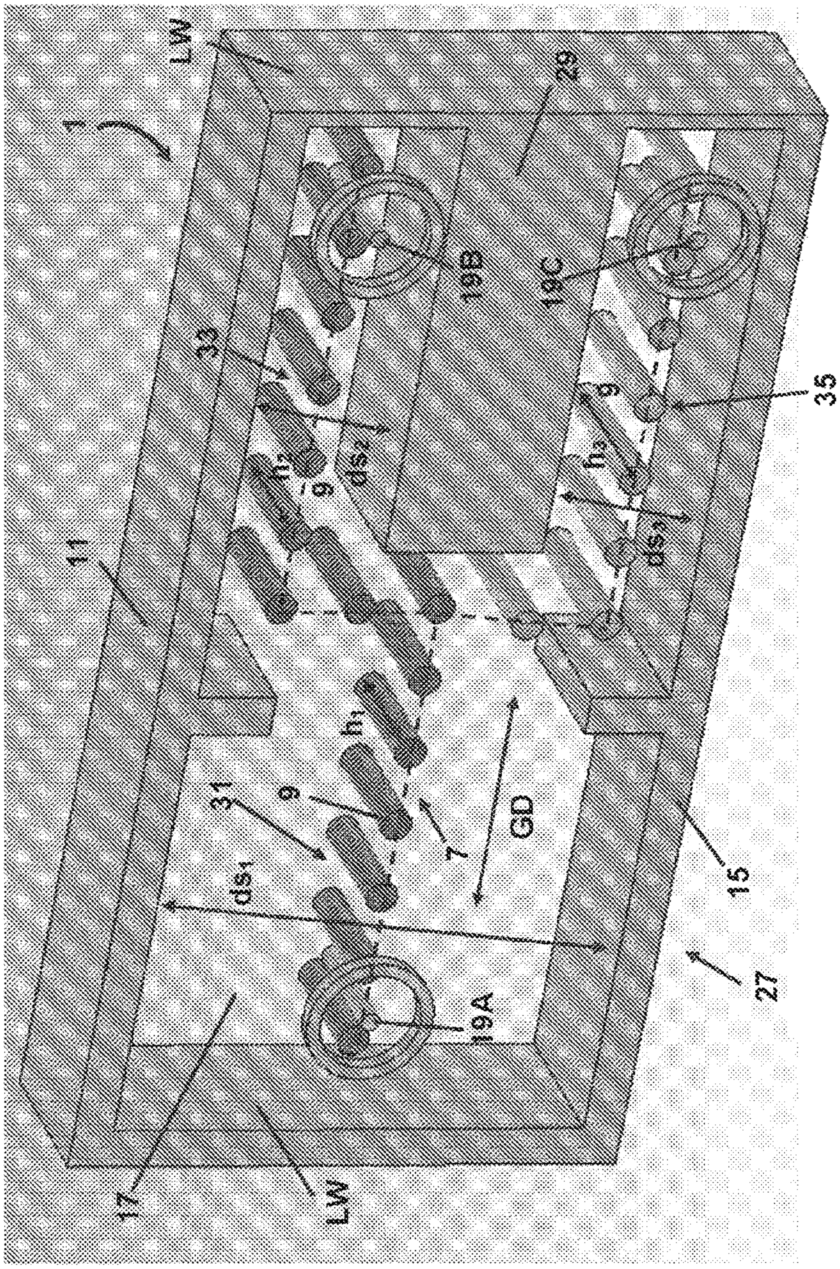

FIG. 10 shows an exemplary microwave component or device according to the present disclosure that is a diplexer comprising an exemplary Y-junction with a wideband filter as an input port, two narrowband channels and metallic walls.

Figure 11:
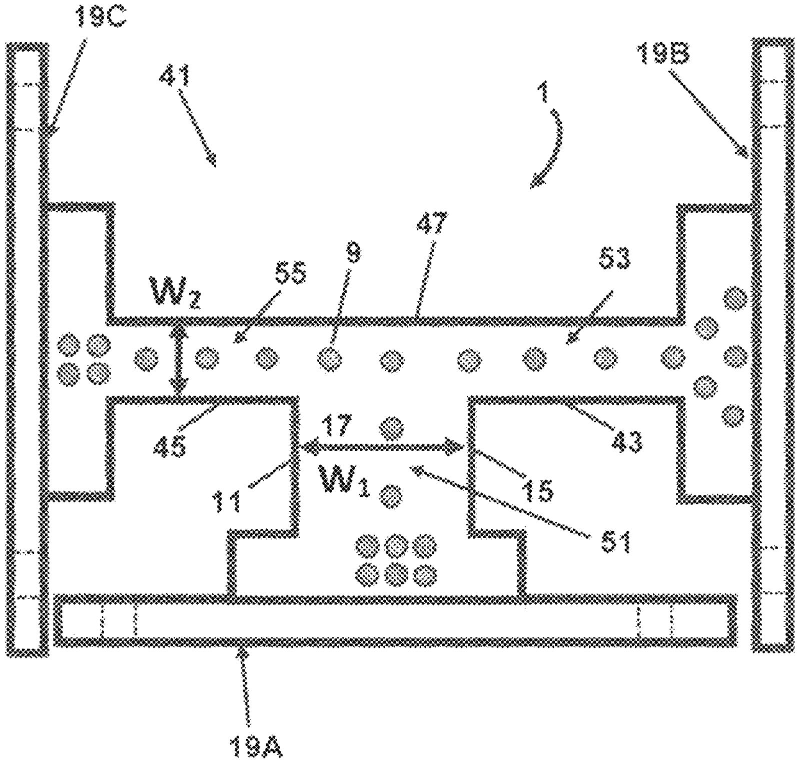

FIG. 11 shows another exemplary microwave component or device according to the present disclosure that is a diplexer including an input metamaterial port and a first and second output metamaterial port.

Figure 12A:
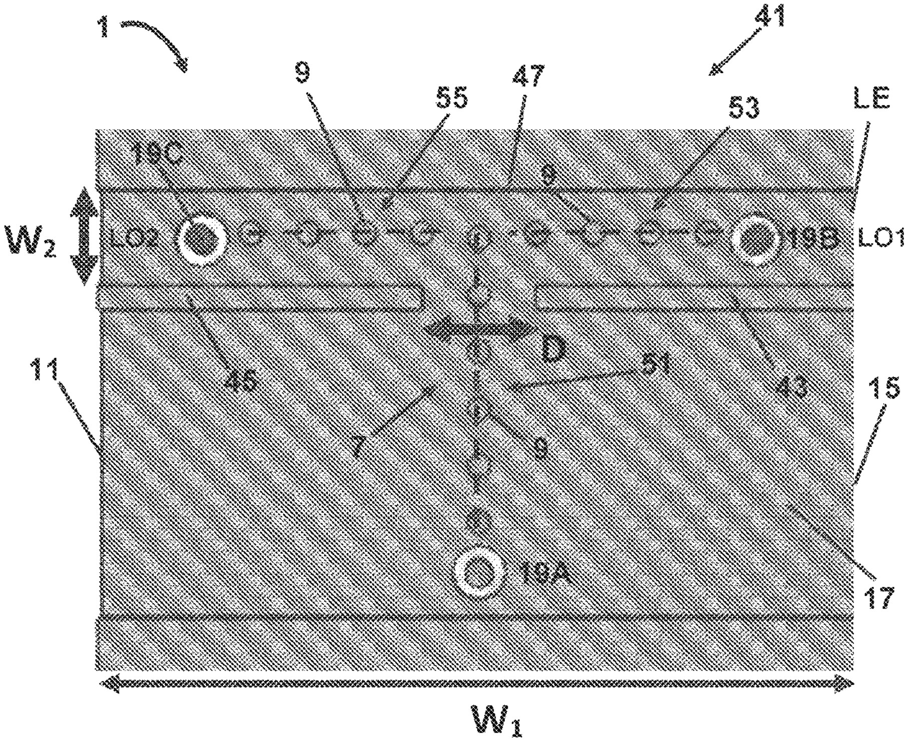

FIG. 12A shows another exemplary microwave component or device according to the present disclosure comprising or consisting of an exemplary T-junction diplexer using, for example, an LRW in an all-metal box, and with exemplary coaxial ports.

Figure 12B:
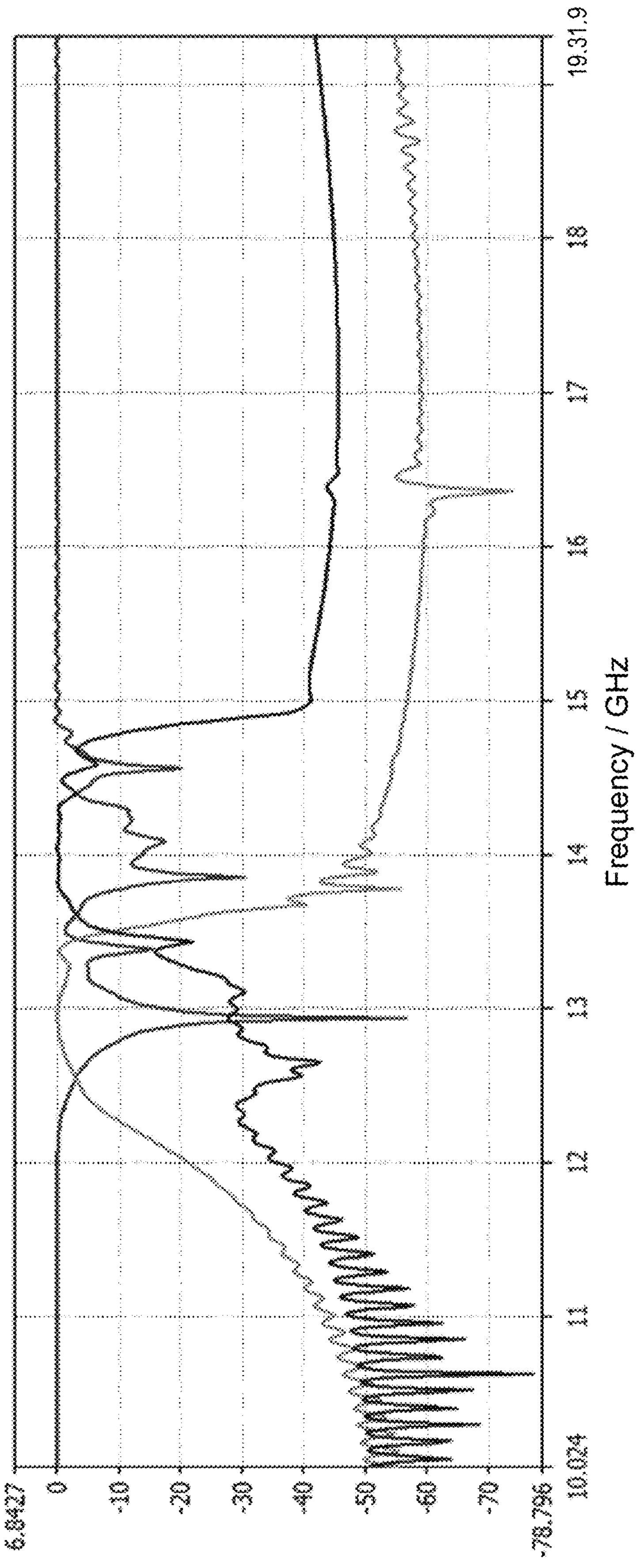

FIG. 12B shows the $S_{21}$, $S_{31}$, $S_{11}$ spectra of the exemplary diplexer of FIG. 12A.

FIGS. 13A to 13D show an exemplary microwave component or device according to the present disclosure that is a multiplexer, for example, a six-port multiplexer in, for example, the form of a small cylinder (e.g. 42 mm) with an input port in the middle and six radial output ports, where coaxial ports are shown in this example.

Figure 13A:
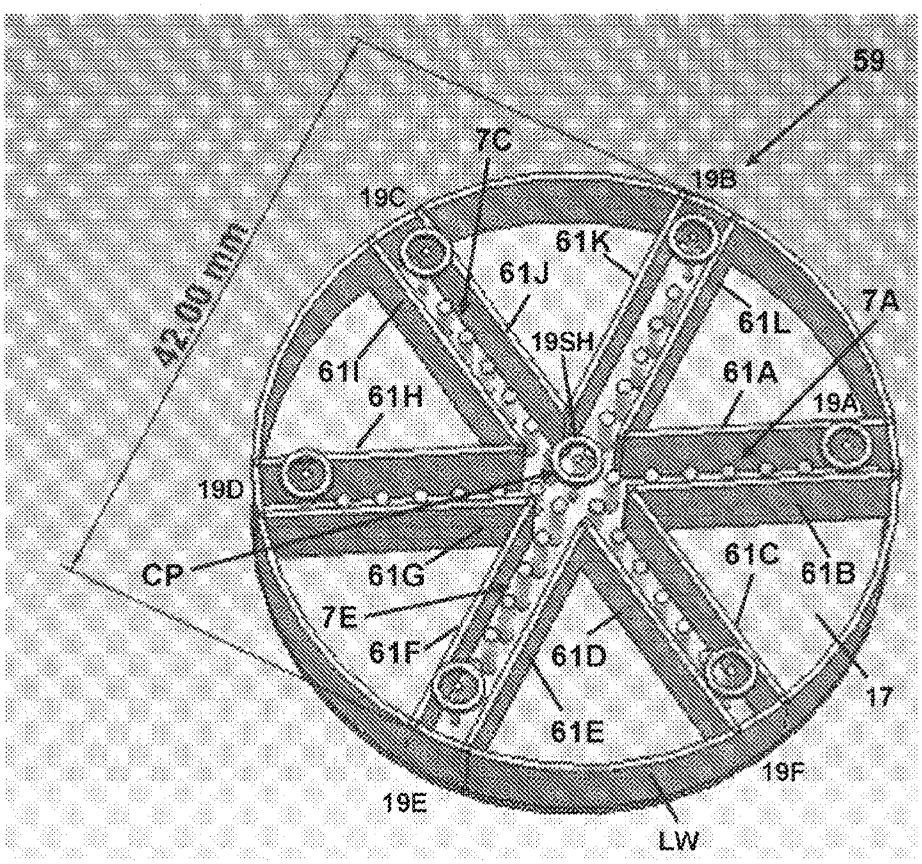
Figure 13B:
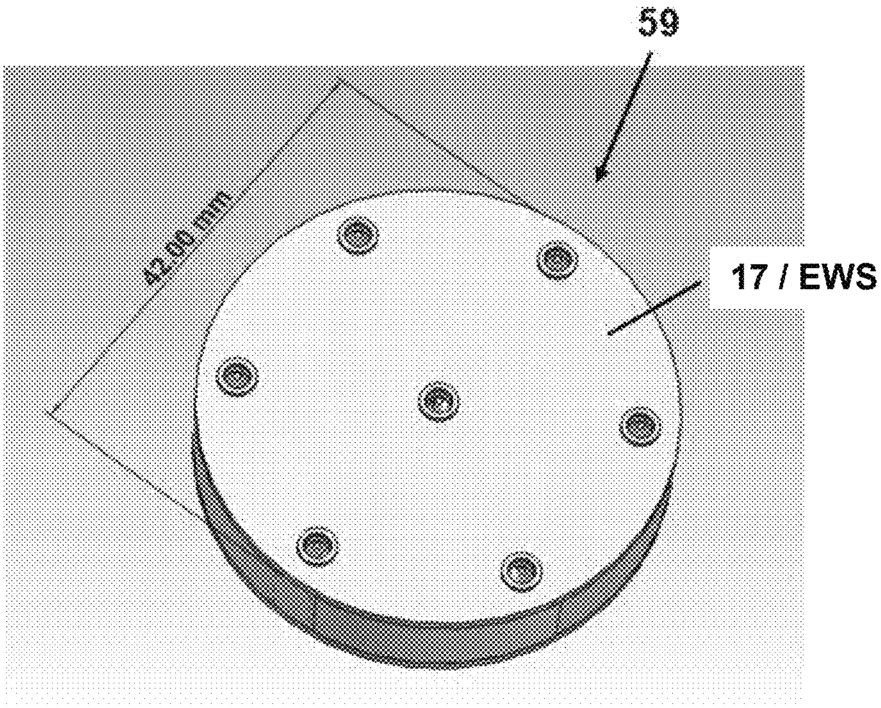
Figure 13C:
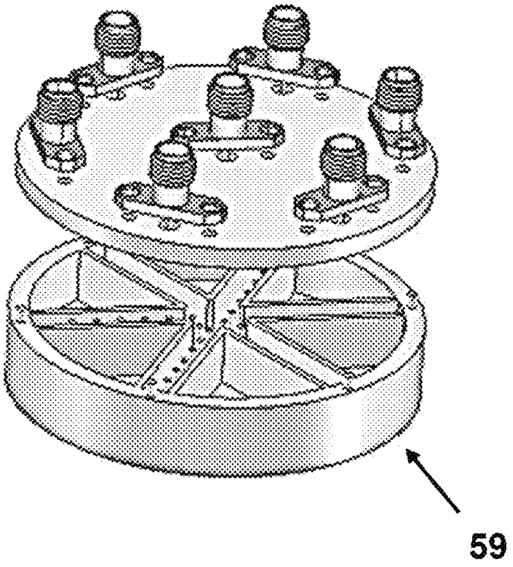
Figure 13D:
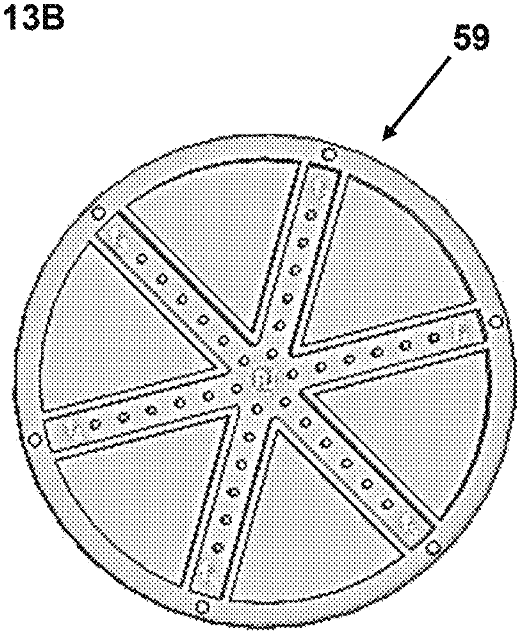
Figure 13E:
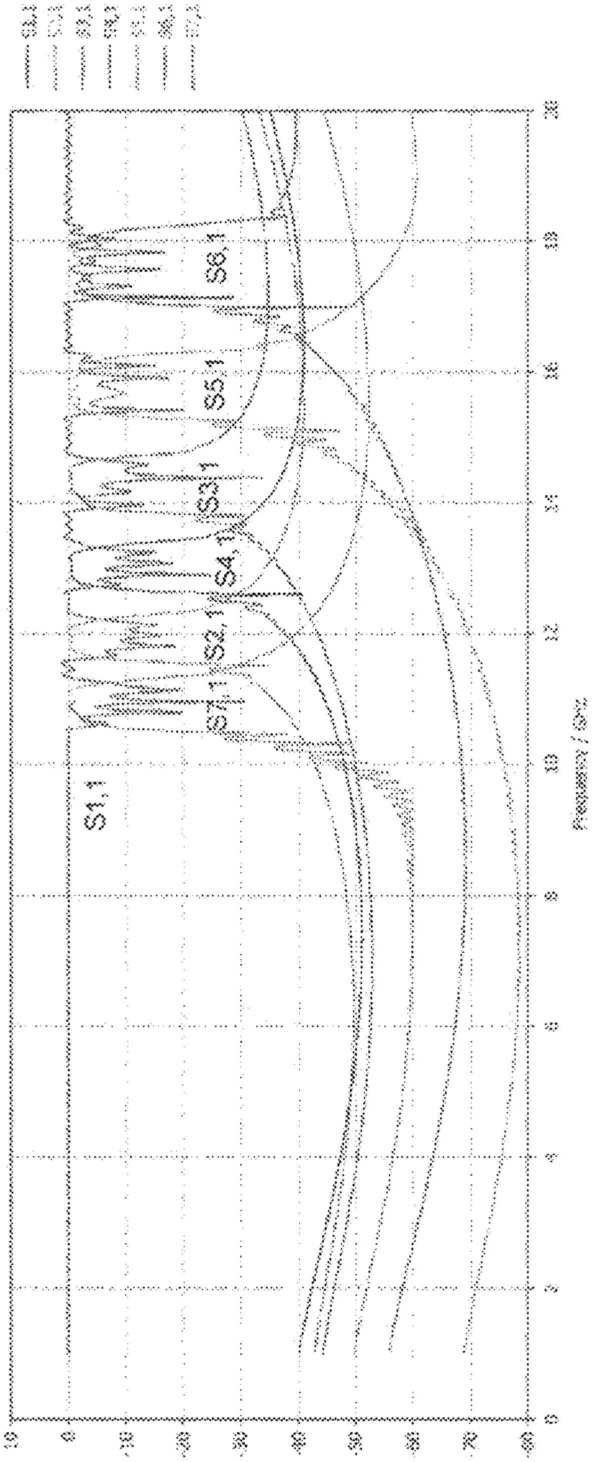

FIG. 13E shows the output spectra of six ports by exciting the middle coaxial port of the multiplexer.

Figure 13F:
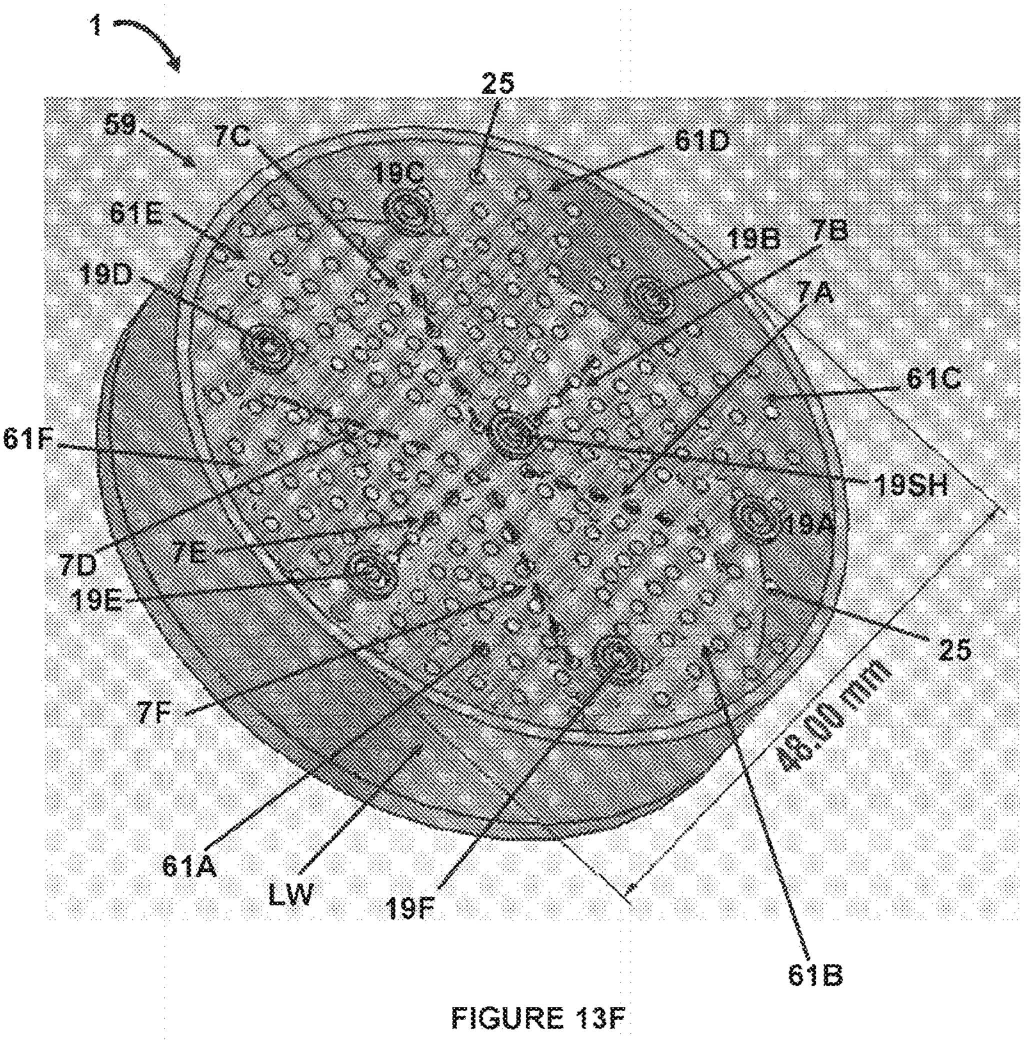

FIG. 13F shows an alternative multiplexer to that of FIG. 13A.

FIGS. 14A and 14B show the transmission spectra of the six outputs by exciting the middle coaxial input of a demultiplexer for a change in height $\delta h = h_j - h_i$, for example$= h_3 - h_2$, where $\delta h$=0.5 mm and $\delta h$=0.3 mm respectively.

Figure 15A:
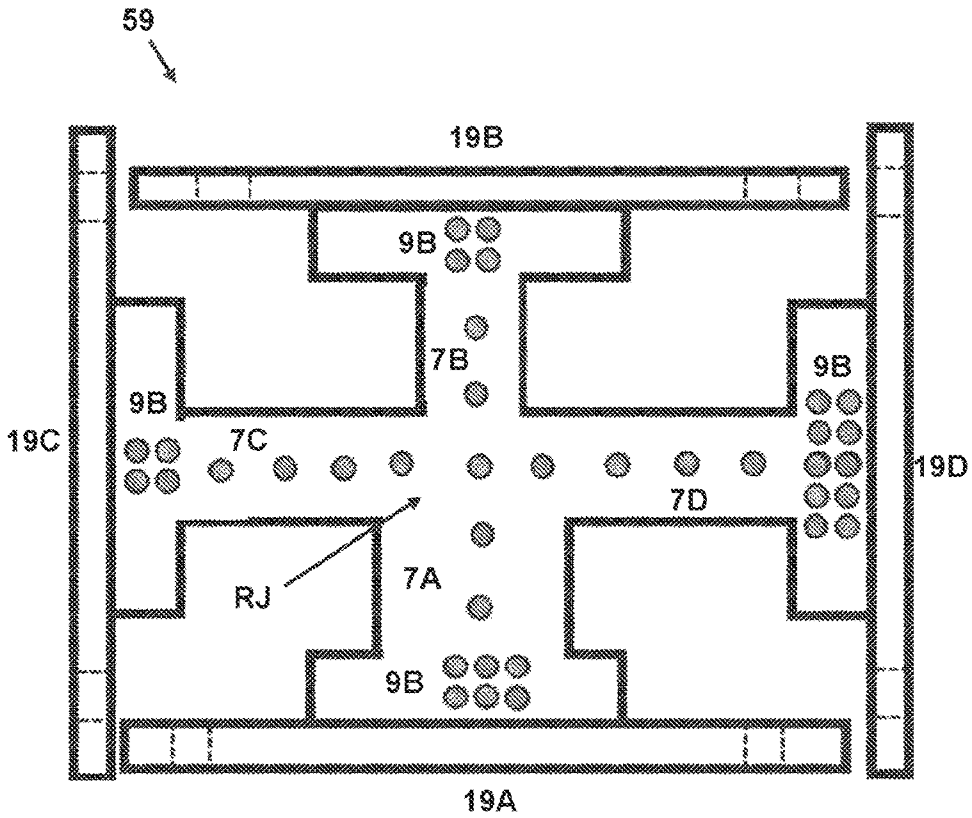
Figure 15B:
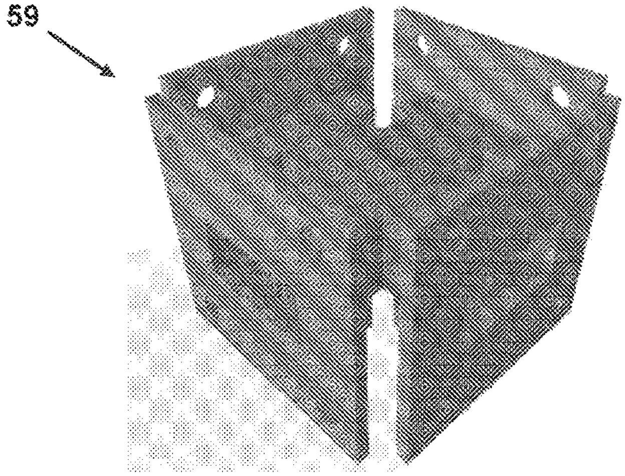

FIGS. 15A and 15B shows another exemplary microwave component or device according to the present disclosure that is a multiplexer, for example, a four-port multiplexer comprising an input metamaterial port and three output metamaterial ports, thus forming an exemplary triplexer.

Figure 16:
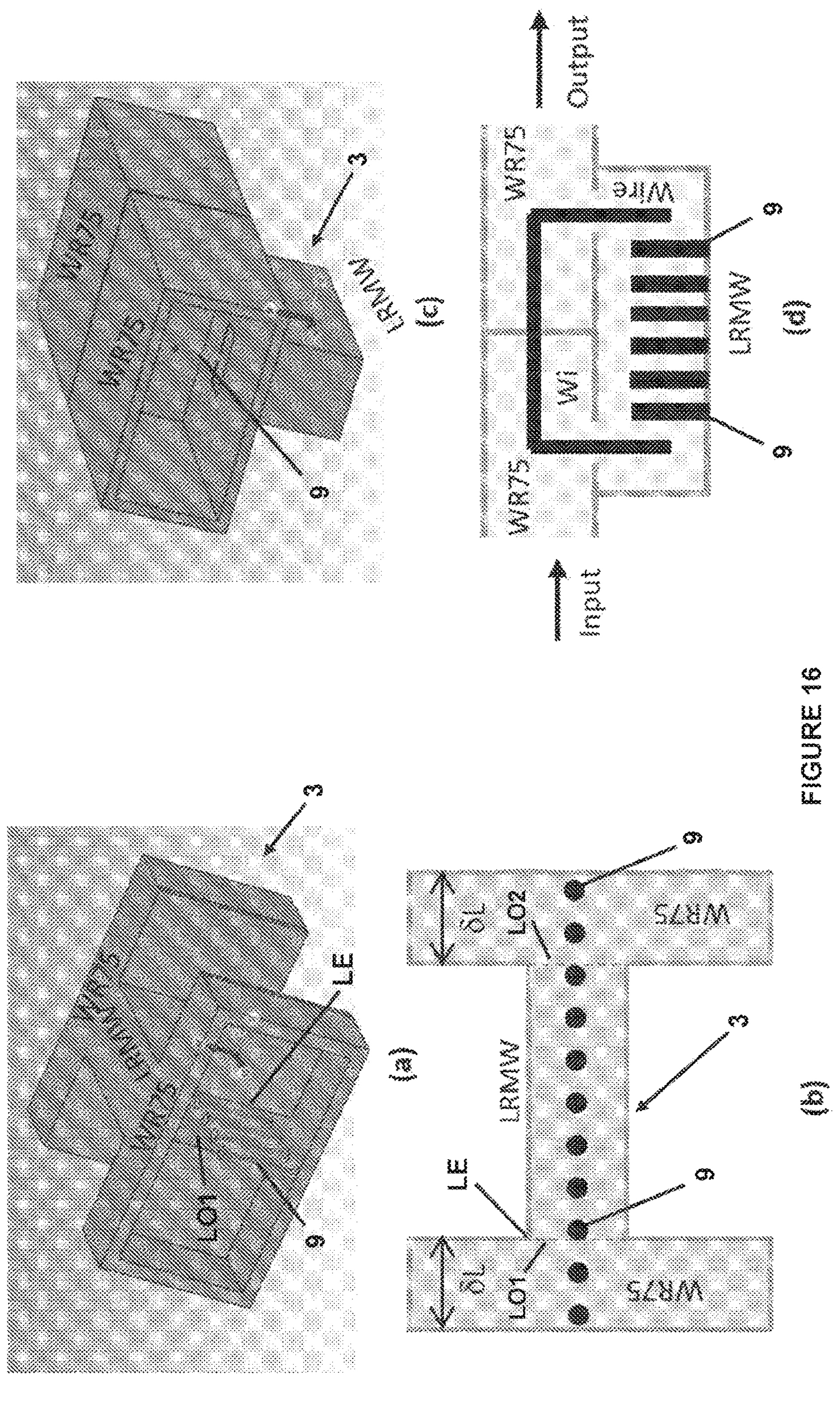

FIGS. 16A and 16B show a direct side and top connection of the LRW or any PPW structure to waveguides with the same operating frequency range (for example, WR75 for Ku band), and FIGS. 16C and 16D show coupling of the electromagnetic wave from a slot on the top of the waveguides, using coaxial wires.

Figure 17A:
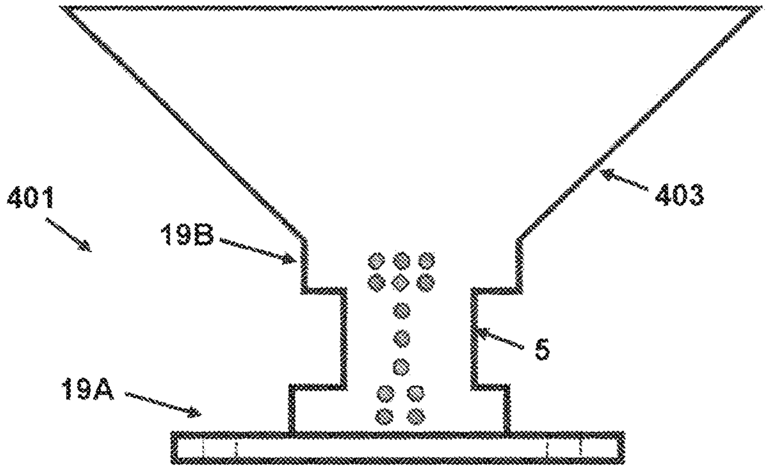
Figure 17B:
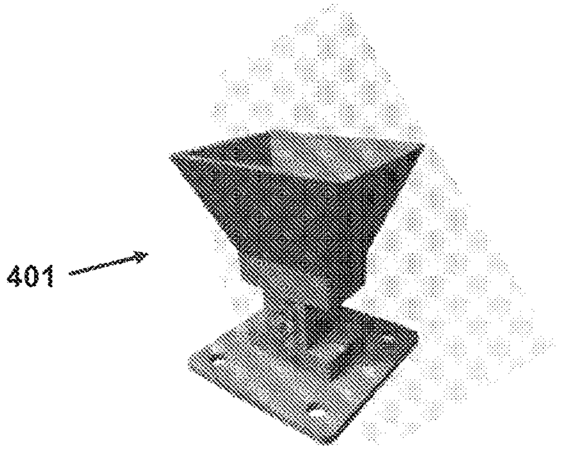

FIGS. 17A and 17B show another exemplary microwave component or device according to the present disclosure that comprises an antenna feed and a bandpass filter with input and output metamaterial ports.

Figure 18A:
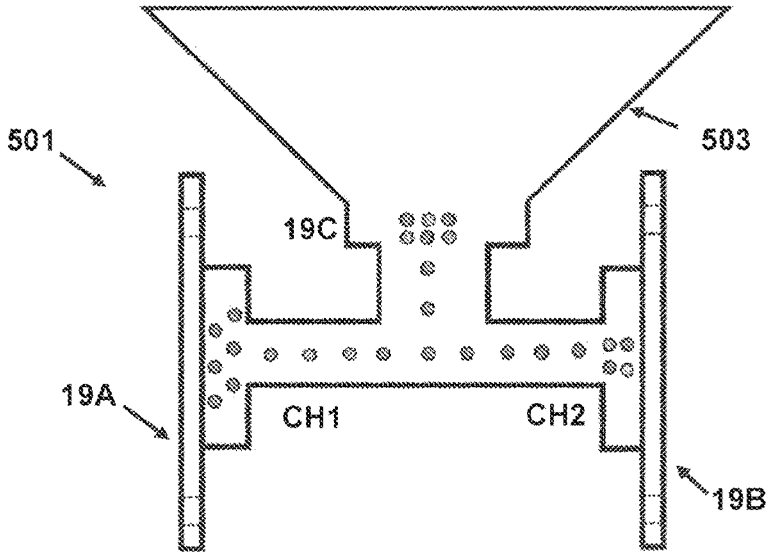
Figure 18B:
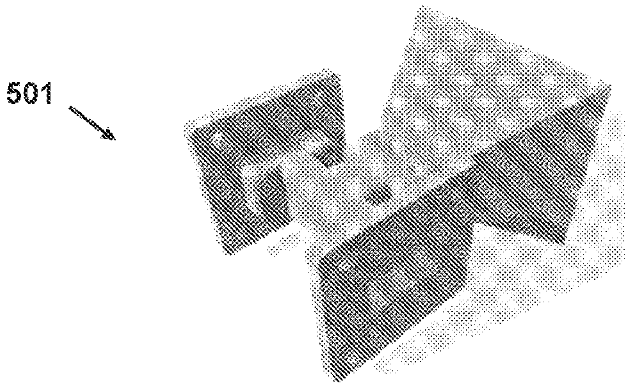

FIGS. 18A and 18B show another exemplary microwave component or device according to the present disclosure that comprises an antenna feed, a duplexer and metamaterial ports.

Figure 19:
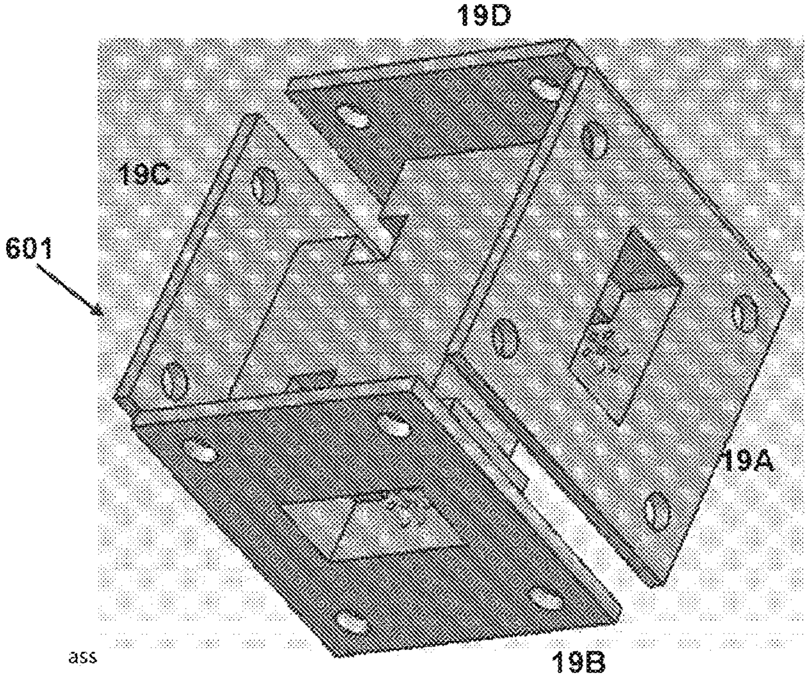

FIG. 19 shows another exemplary microwave component or device according to the present disclosure that comprises or consists of a power divider comprising, for example, one input and three outputs.

Figure 20:
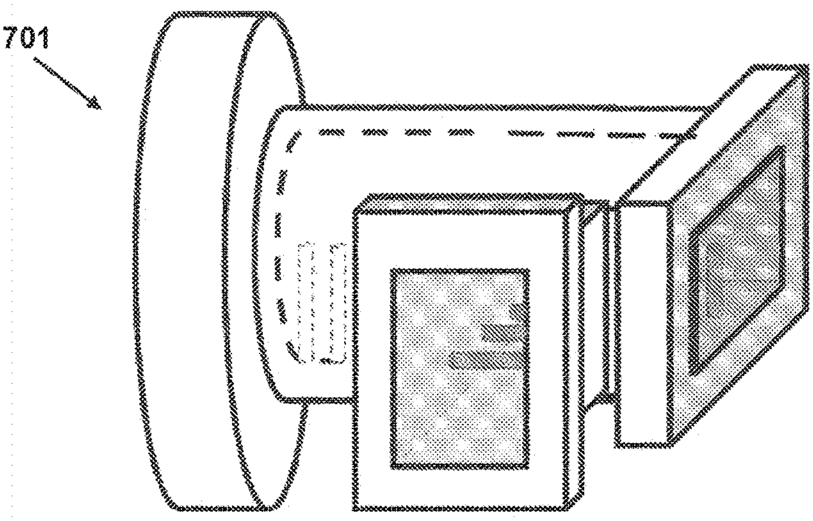

FIG. 20 shows another exemplary microwave component or device according to the present disclosure that comprises or consists of an orthogonal Mode Transducer (OMT) including metamaterial ports to combine and split two channels with different polarization.

Figure 21A:
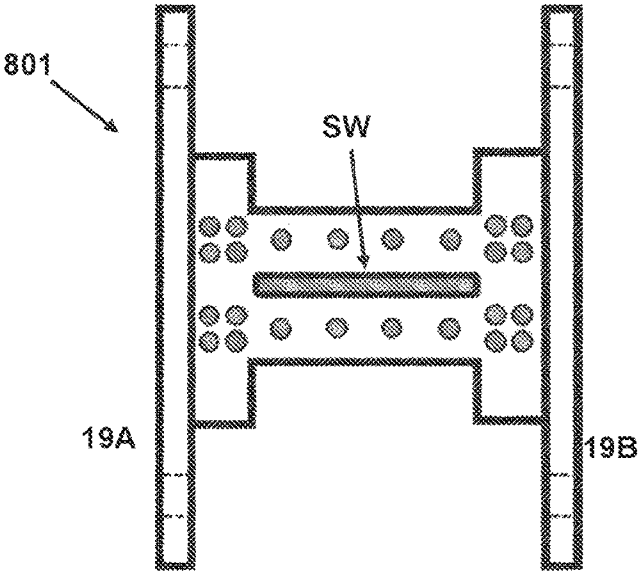
Figure 21B:
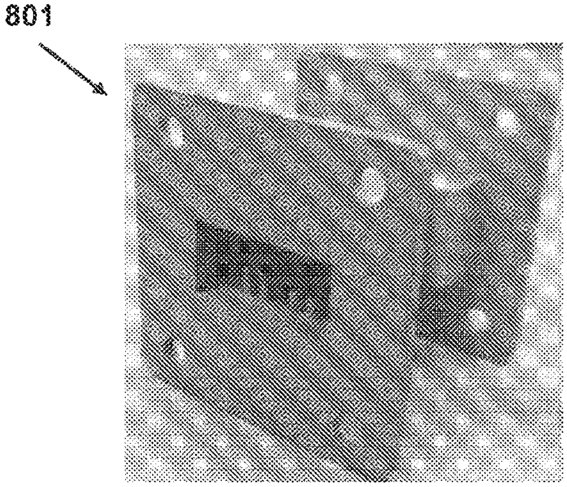

FIGS. 21A and 21B show another exemplary microwave component or device according to the present disclosure that comprises or consists of a dual-band filter including metamaterial ports to route two channels in one waveguide with a high channel level isolation. A separation member or wall SW is included between the channels and separates the arrays of resonant structures.

Figure 22A:
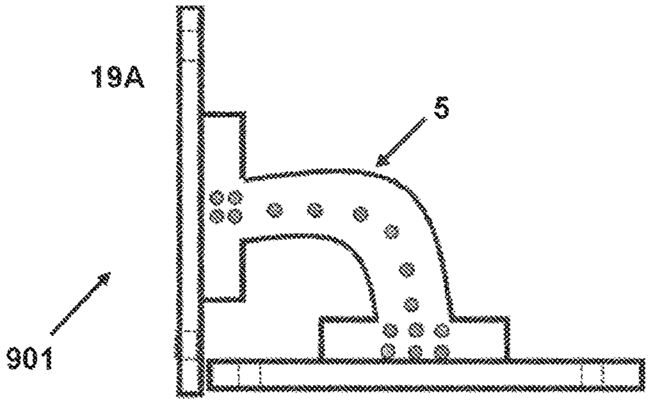
Figure 22B:
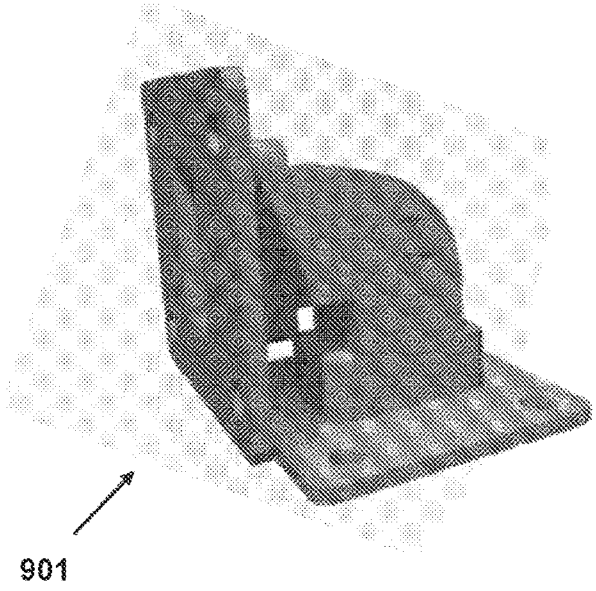

FIGS. 22A and 22B show another exemplary microwave component or device according to the present disclosure that comprises or consists of a compact sharp bend filter.

Figure 23A:
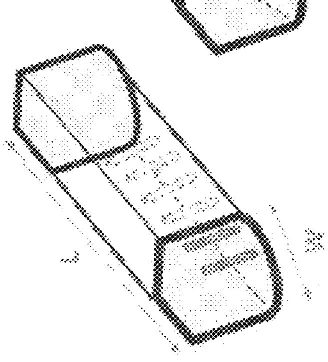

FIG. 23A shows an exemplary device or assembly according to the present disclosure showing that the waveguide may have an arbitrary-cross-sectional shape.

Figure 23B:
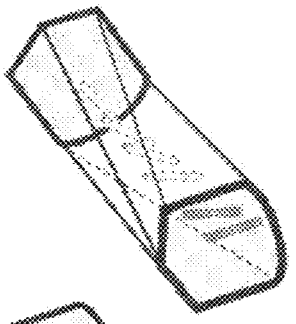

FIG. 23B shows an exemplary device or assembly according to the present disclosure in which the waveguide may be twisted and the array of resonant structures may gradually incline along a guiding direction of the waveguide.

Figure 23C:
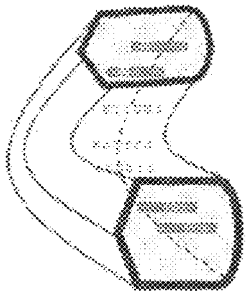

FIG. 23C shows an exemplary device or assembly according to the present disclosure in which the waveguide includes a sharp bend.

Figure 23D:
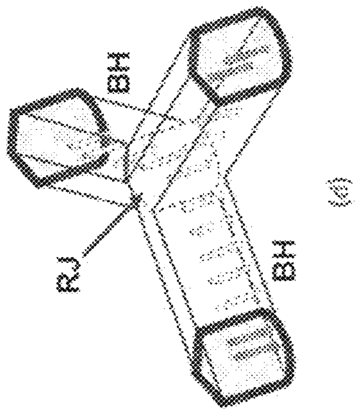

FIG. 23D shows an exemplary device or assembly according to the present disclosure including resonant junctions and branches.

Figure 24:
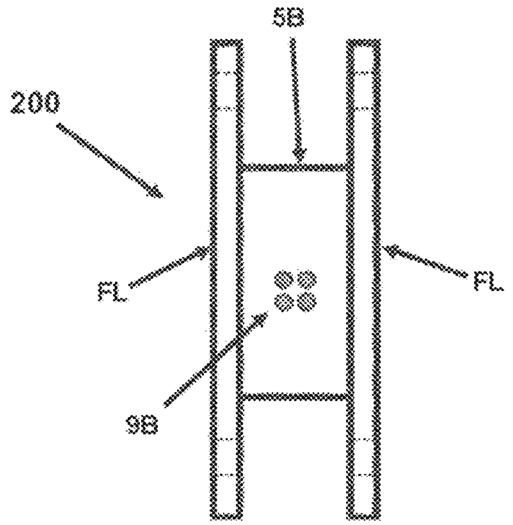

FIG. 24 shows another exemplary microwave component or device according to the present disclosure that comprises or consists of a notch filter.

Figure 25:
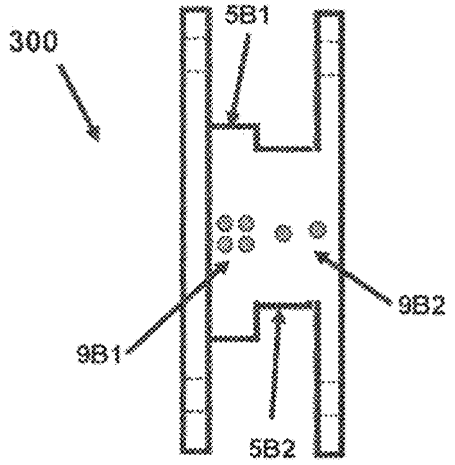

FIG. 25 shows another exemplary microwave component or device according to the present disclosure that comprises or consists of a bandstop filter.

Figure 26:
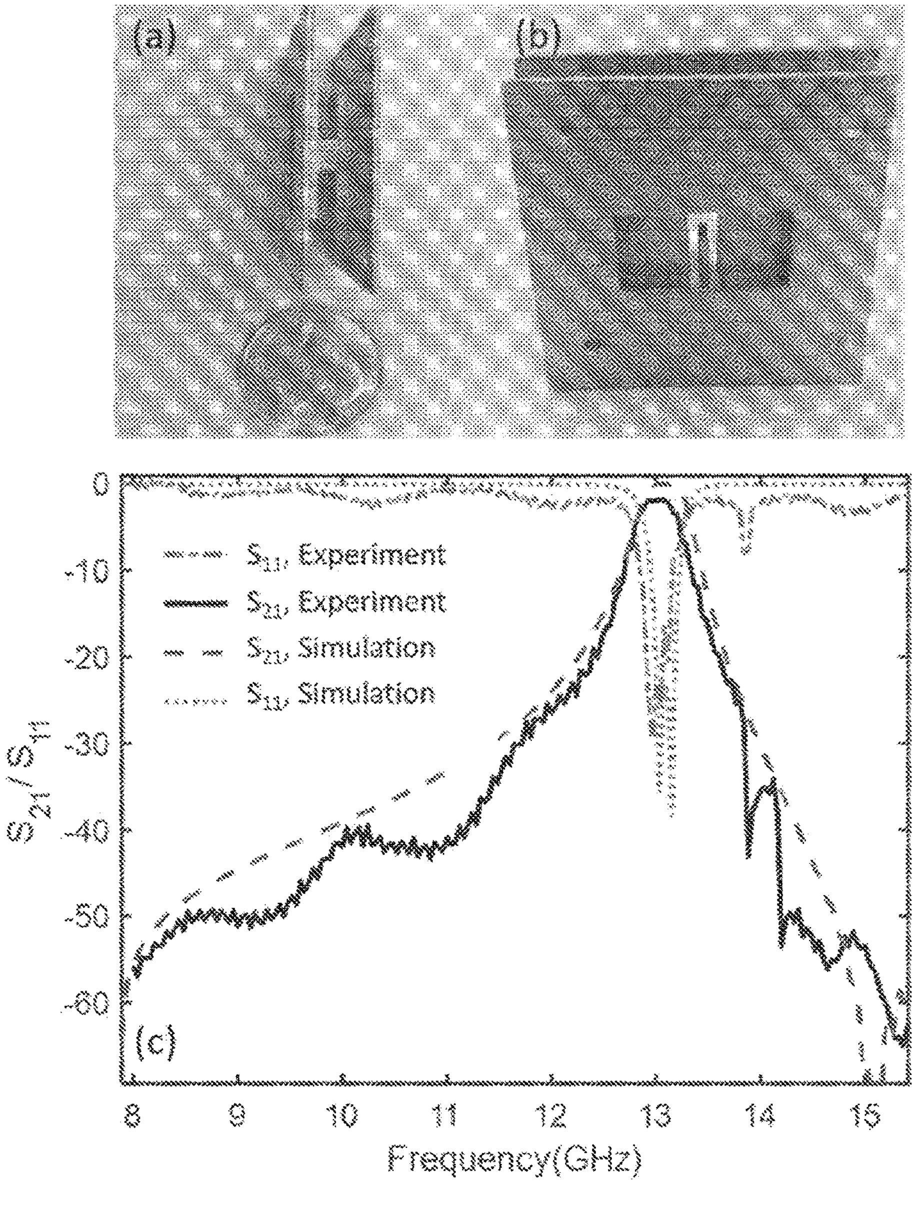

FIG. 26 shows a (left) Top and (right) front view of the compact WR75 filter having two pins, and (bottom) the measured and simulation results (S21 and S11).

Figure 27:
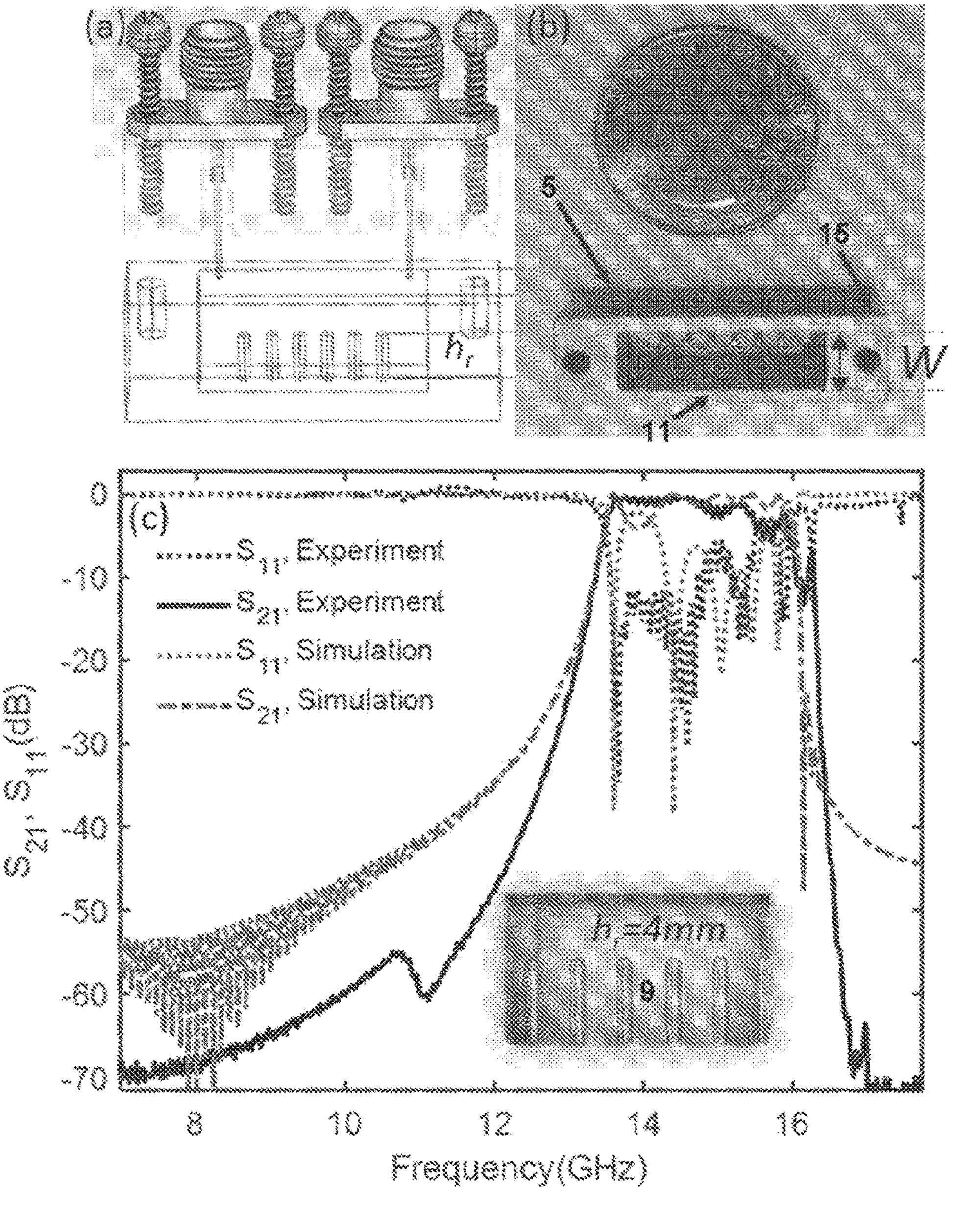

FIG. 27 shows (a) The simulation model and (b) the fabricated sample of a 6th order PPW filter, with two coaxial ports on the top, having $h_r$=4 mm and W=4 mm, and (c) the S-parameters, extracted from time-domain full-wave simulation and experiment.

Figure 28:
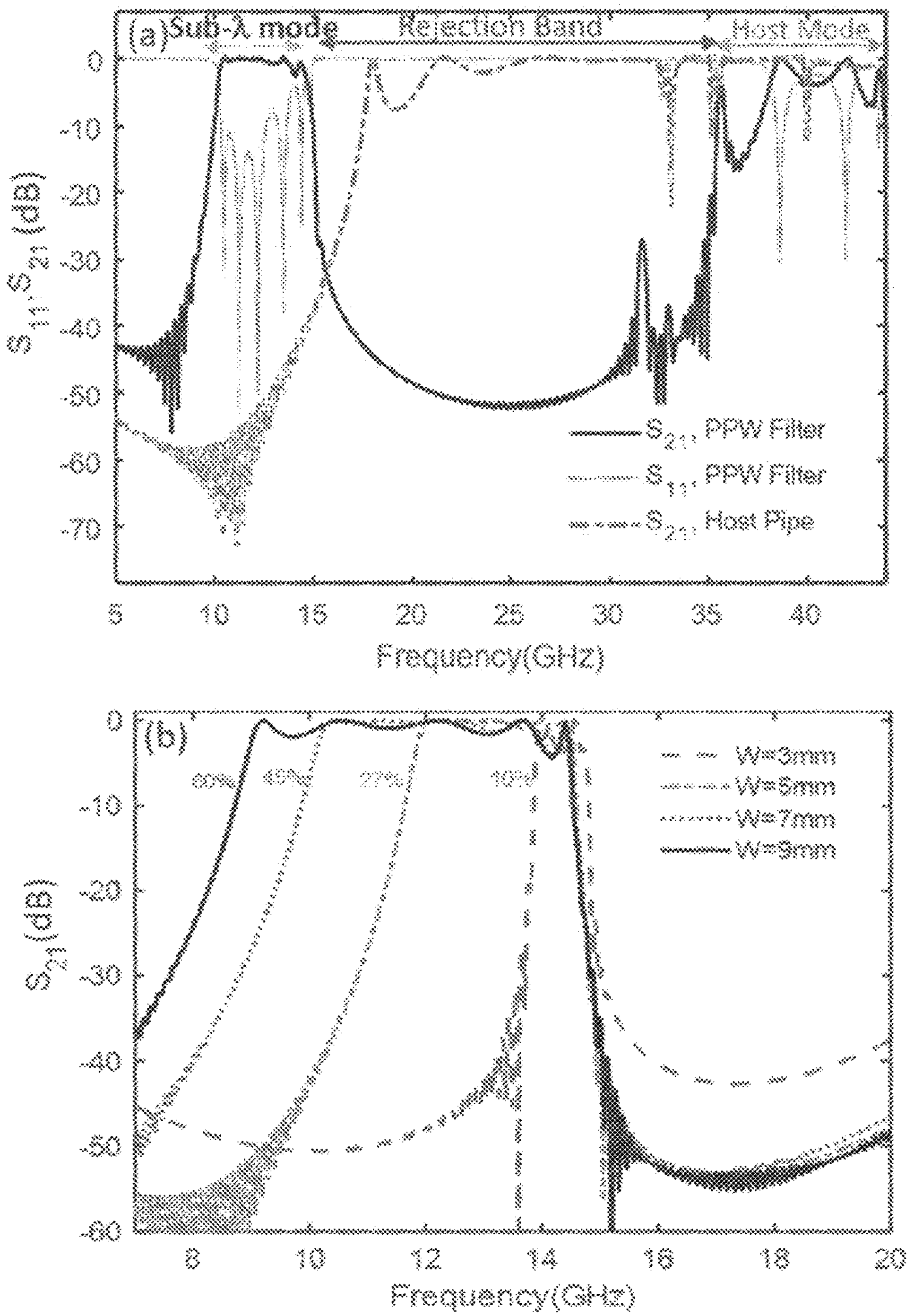

FIG. 28 shows (a) simulation results of the unloaded pipe and the PPW filter, which indicate three main parts of i) the sub-wavelength mode, ii) the rejection band, and iii) the host mode, (b) the S21 for various values of W, implying different bandwidths.

Figure 29:
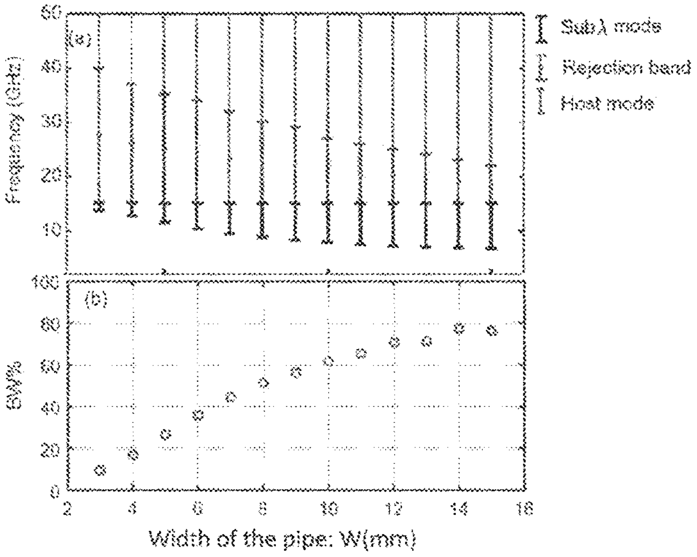

FIG. 29 shows (a) the mode map of the structure versus W, and (b) the variation of the fractional bandwidth of the sub-wavelength mode (passband) versus W.

Figure 30:
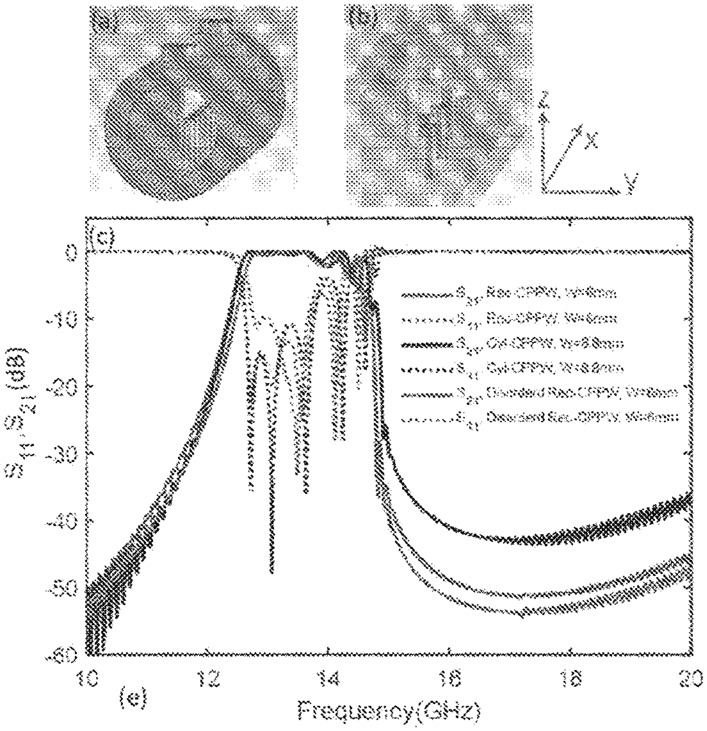

FIG. 30 shows (a) a cylindrical PPW with a diameter of 8.8 mm, (b) a rectangular PPW with a disorder in lateral position, (c) the transmission scattering ($S_{21}$) spectra of a rectangular and cylindrical PPWs with a width of 6 mm and 8.8 mm, respectively, and the disordered rectangular PPW, whose pins are positioned randomly in the y-axis.

Figure 31:
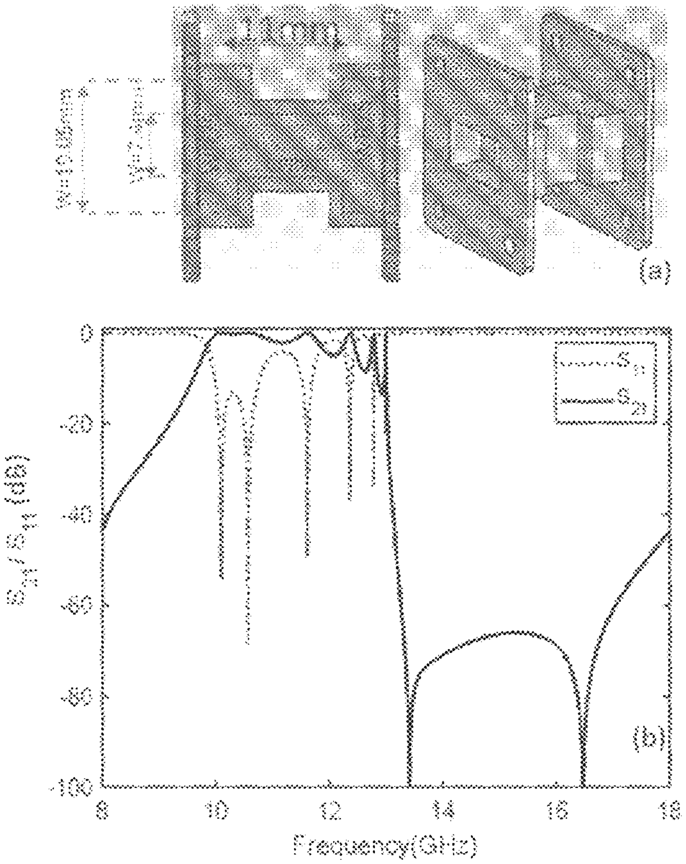

FIG. 31 shows (a) a direct connection of PPW to the standard waveguides, and (b) scattering spectra of the PPW with waveguide ports.

Figure 32:
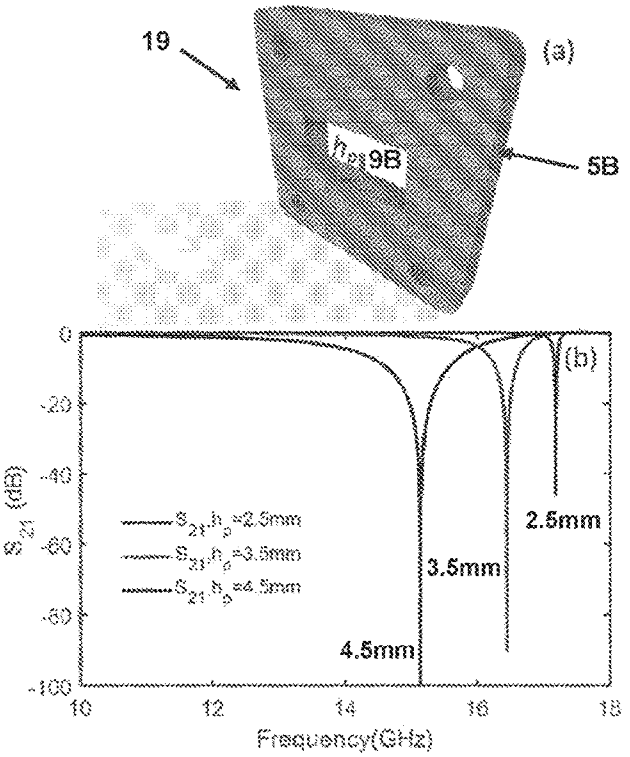

FIG. 32 shows (a) a waveguide port, loaded by a resonant pin, (b) the transmission spectrum, S21, for various values of pin height $h_p$.

Figure 33:
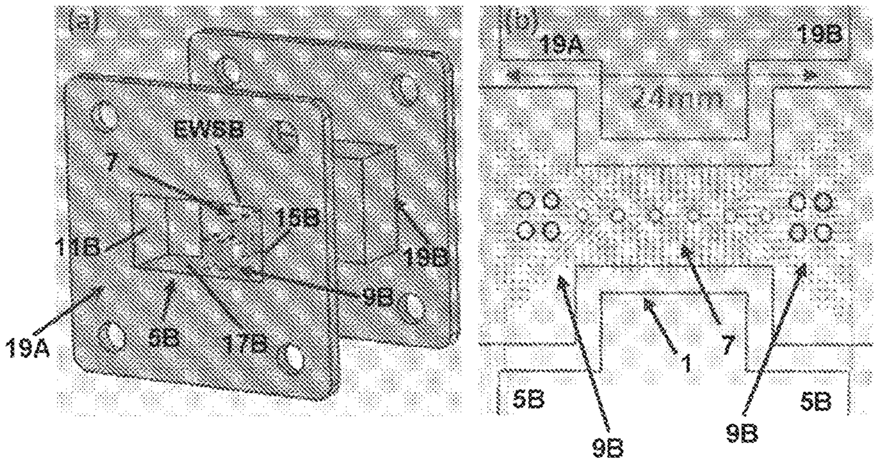

FIG. 33 shows (a) the CPPW filter including 4-pin meta-ports, and (b) electrical field distribution at 12 GHz.

Figure 34:
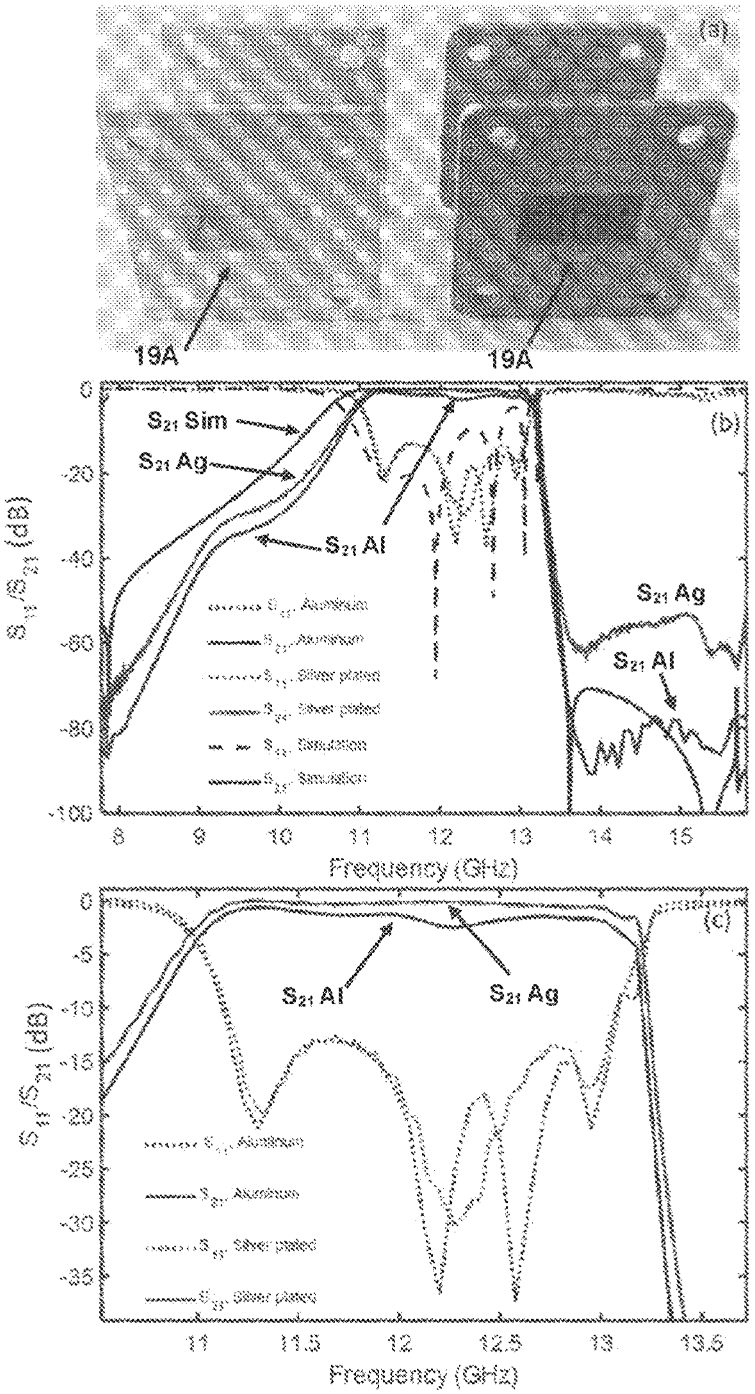

FIG. 34 shows (a) a fabricated PPW filter, including metamaterial-port, using aluminum 3D printing on the right, and the silver-plated sample on the left, (b) the scattering spectra of the PPW filter, and (c) reduced insertion loss after silver plating.

Figure 35:
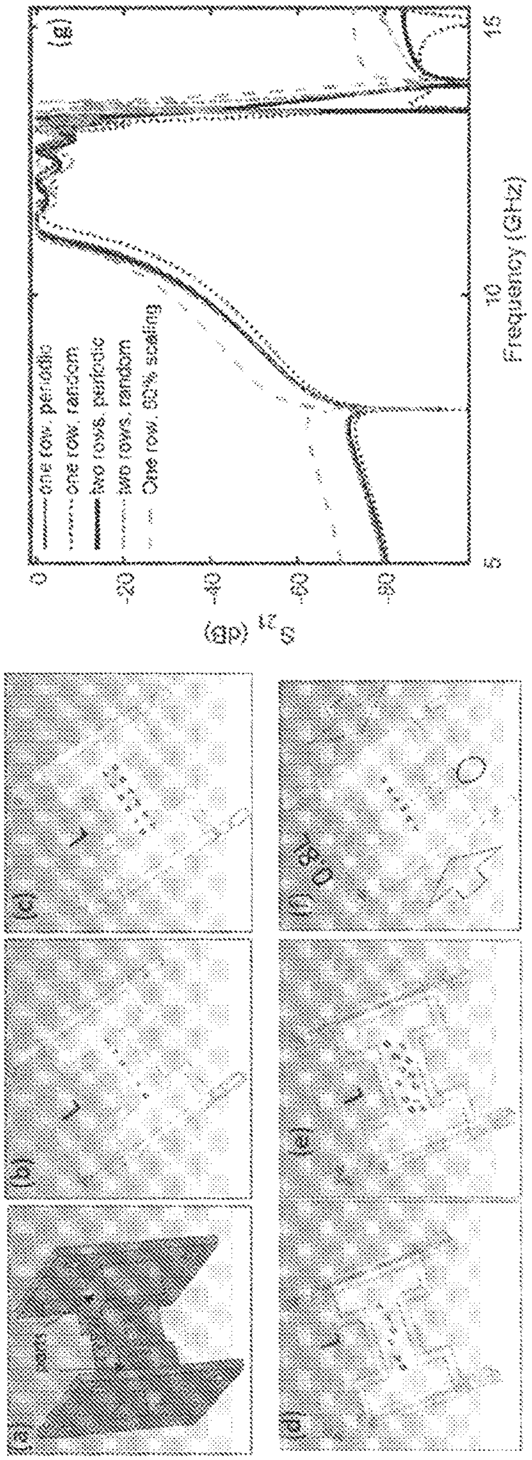

FIGS. 35(*a*) to 35(*f*) shows filter devices according to the present disclosure in which pins have different arrangements. FIGS. 35(*a*) to 35(*c*) show periodically arranged arrays of pins, FIGS. 35(*d*) to 35(*e*) shows pins randomly positioned or grouped in a random ordering, FIG. 35(*f*) shows pins that are reduced in size in one direction and FIG. 35(*g*) shows the resulting transmission characteristics.

Figure 36A:
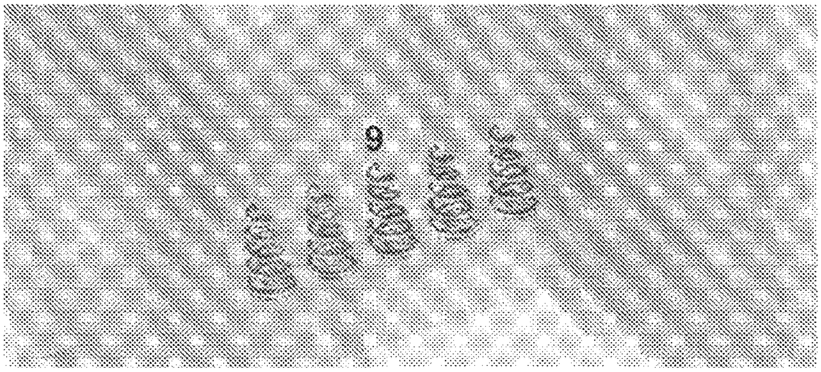
Figure 36B:
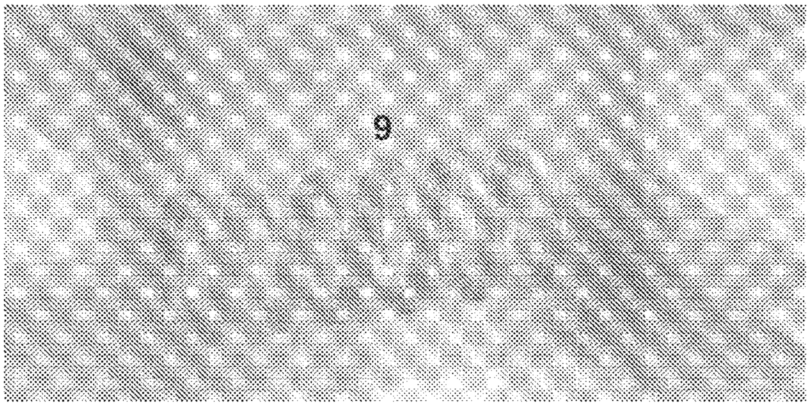
Figure 36C:
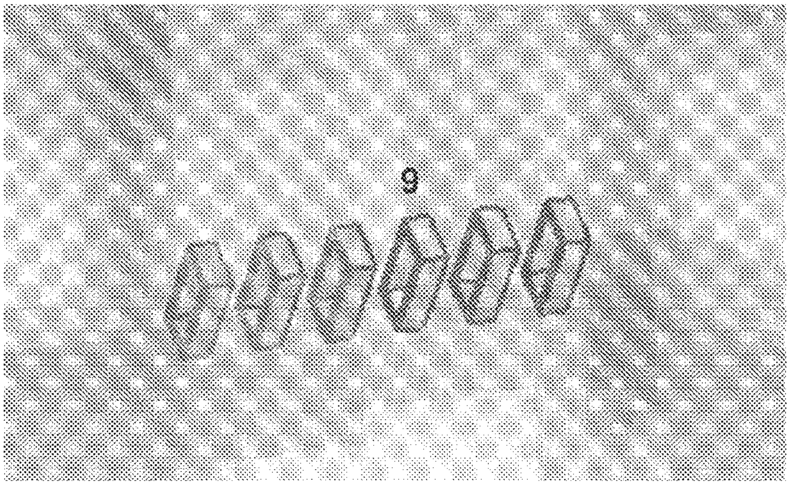
Figure 36D:
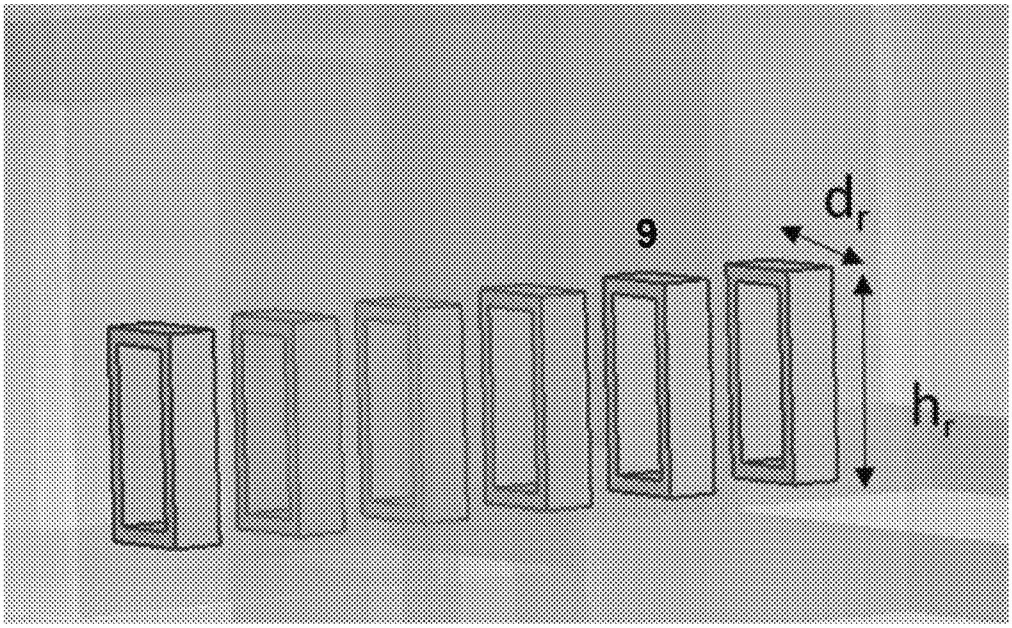
Figure 36E:
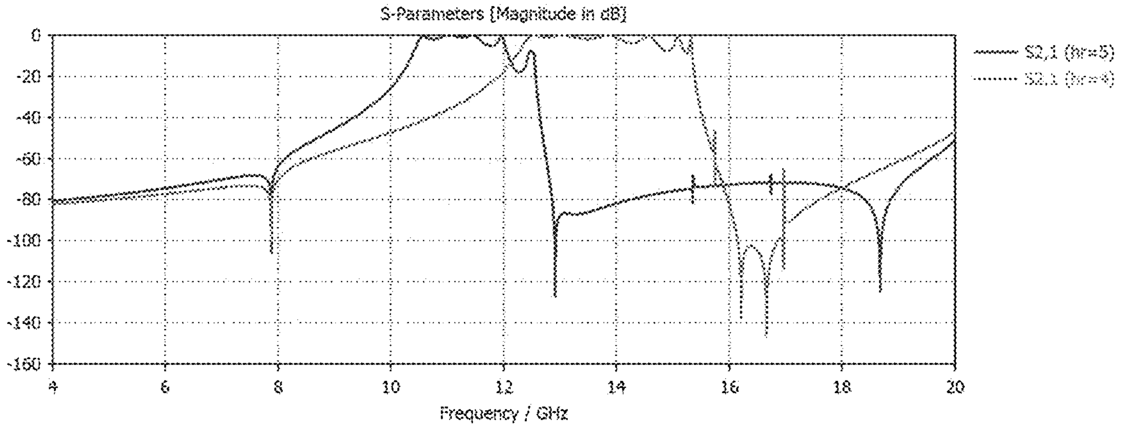

FIGS. 36A to 36D show that the resonant structures may take on many different forms or profiles and are not limited to a pin form, and FIG. 36E shows transmission characteristics for a resonant structure shown in FIG. 36D having different heights $h_r$.

Figure 37:
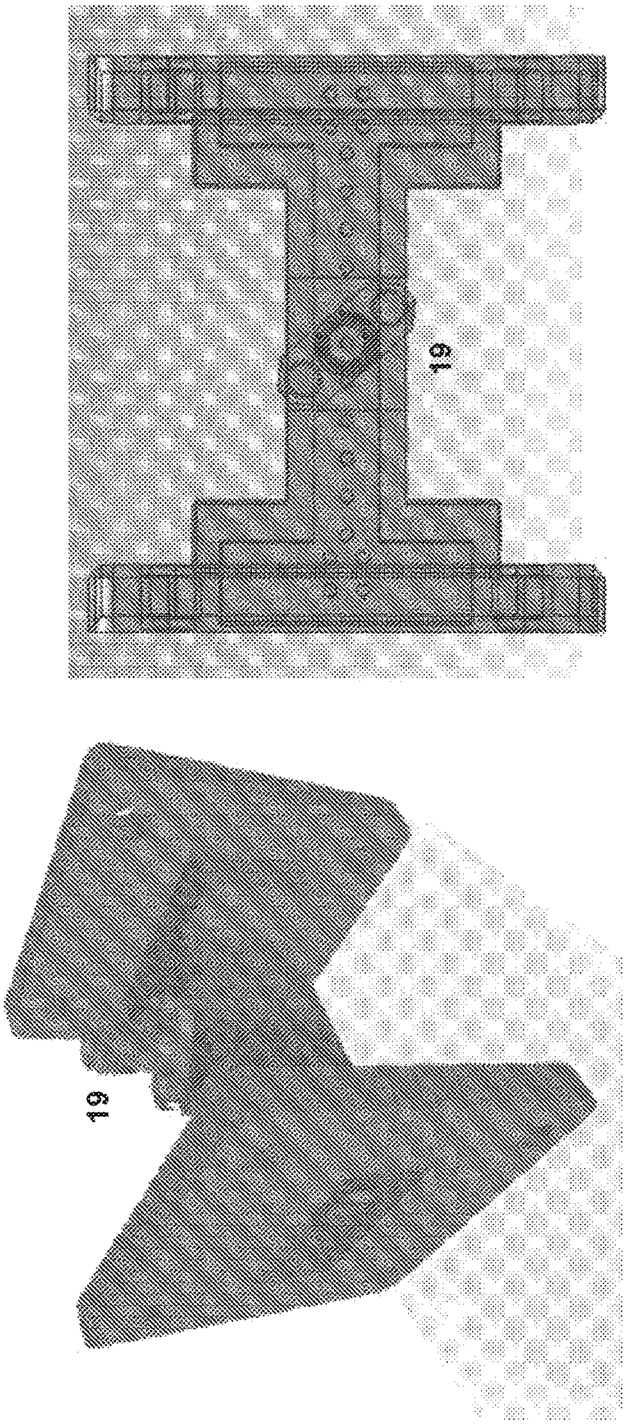

FIG. 37 shows a further exemplary filer device according to the present disclosure including a coaxial terminals or probes between a plurality of metamaterial ports or connectors.

Figure 38:
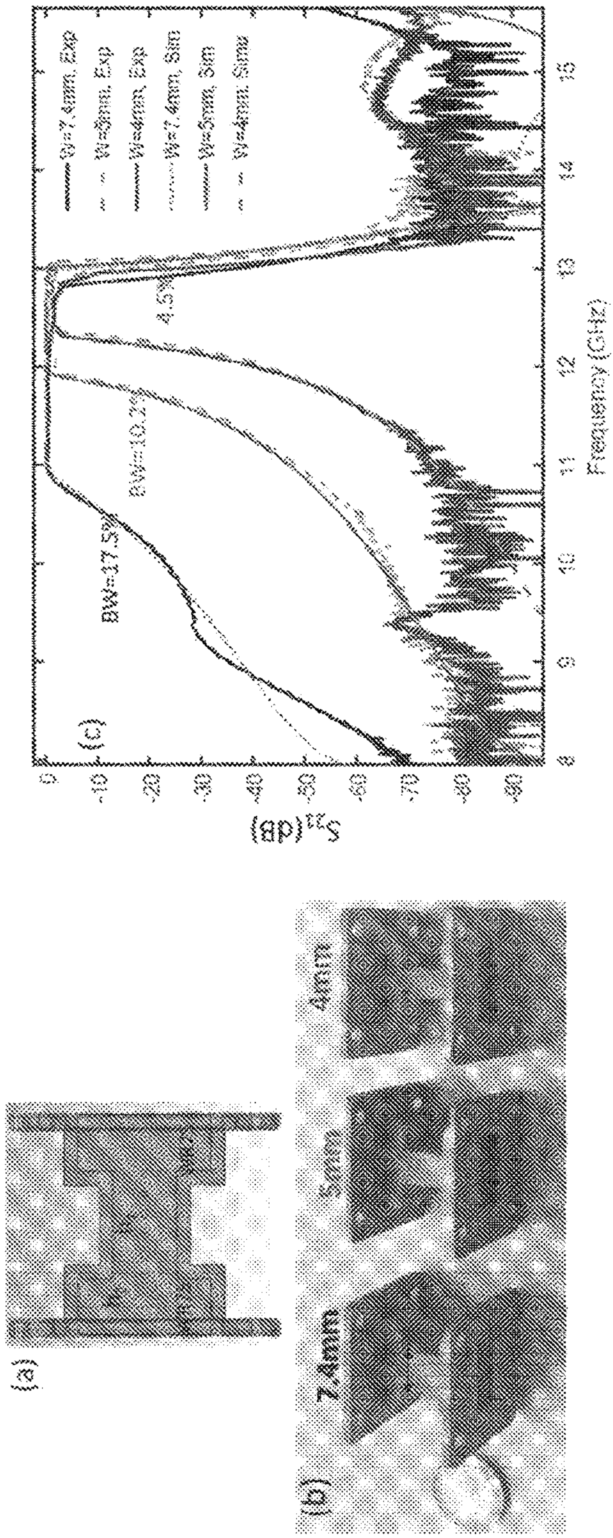

FIGS. 38(*a*) to 38(*b*) show filter devices having different hollow waveguide widths and FIG. 38(*c*) shows the resulting transmissions characteristics for these devices.

Figure 39:
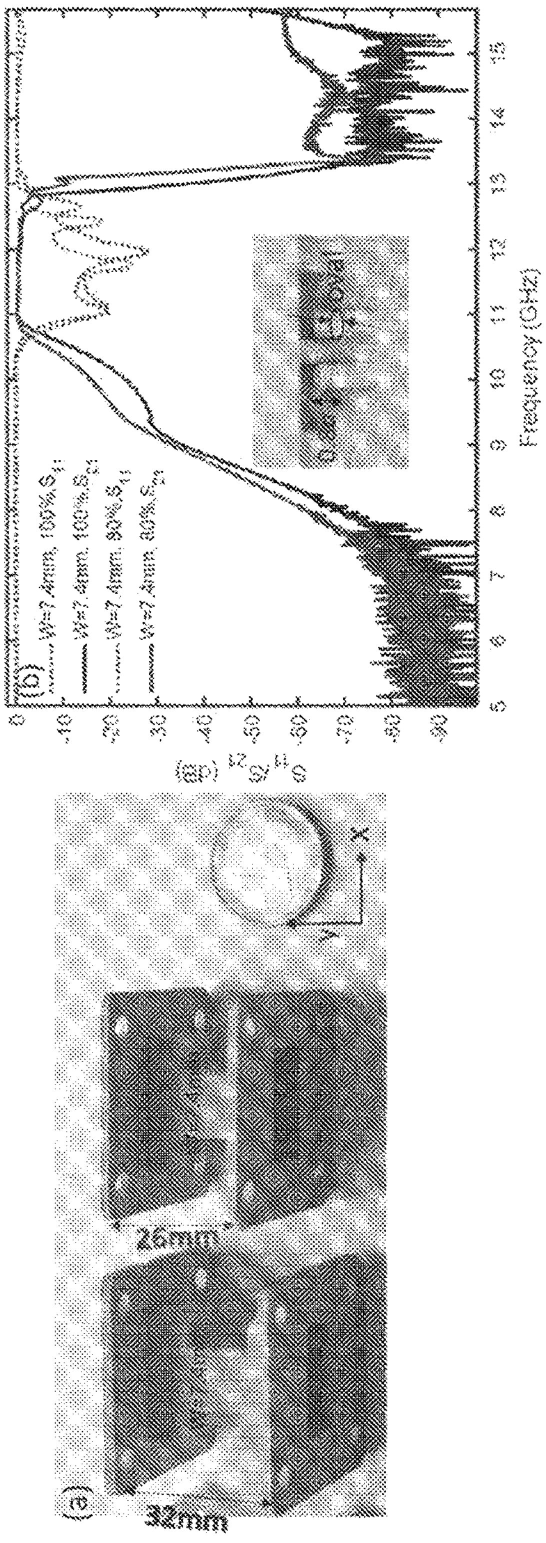

FIG. 39(*a*) show filter devices having different lengths where the element of a second filter device are compressed in the lengthwise direction resulting in a shorter the hollow waveguide length and oval shaped resonant pins, and FIG. 39(*b*) shows the resulting transmissions characteristics for these devices showing a large tolerance to length change.

Herein, identical reference numerals are used, where possible, to designate identical elements that are common to the Figures.

DETAILED DESCRIPTION OF SEVERAL EMBODIMENTS

Figure 14:
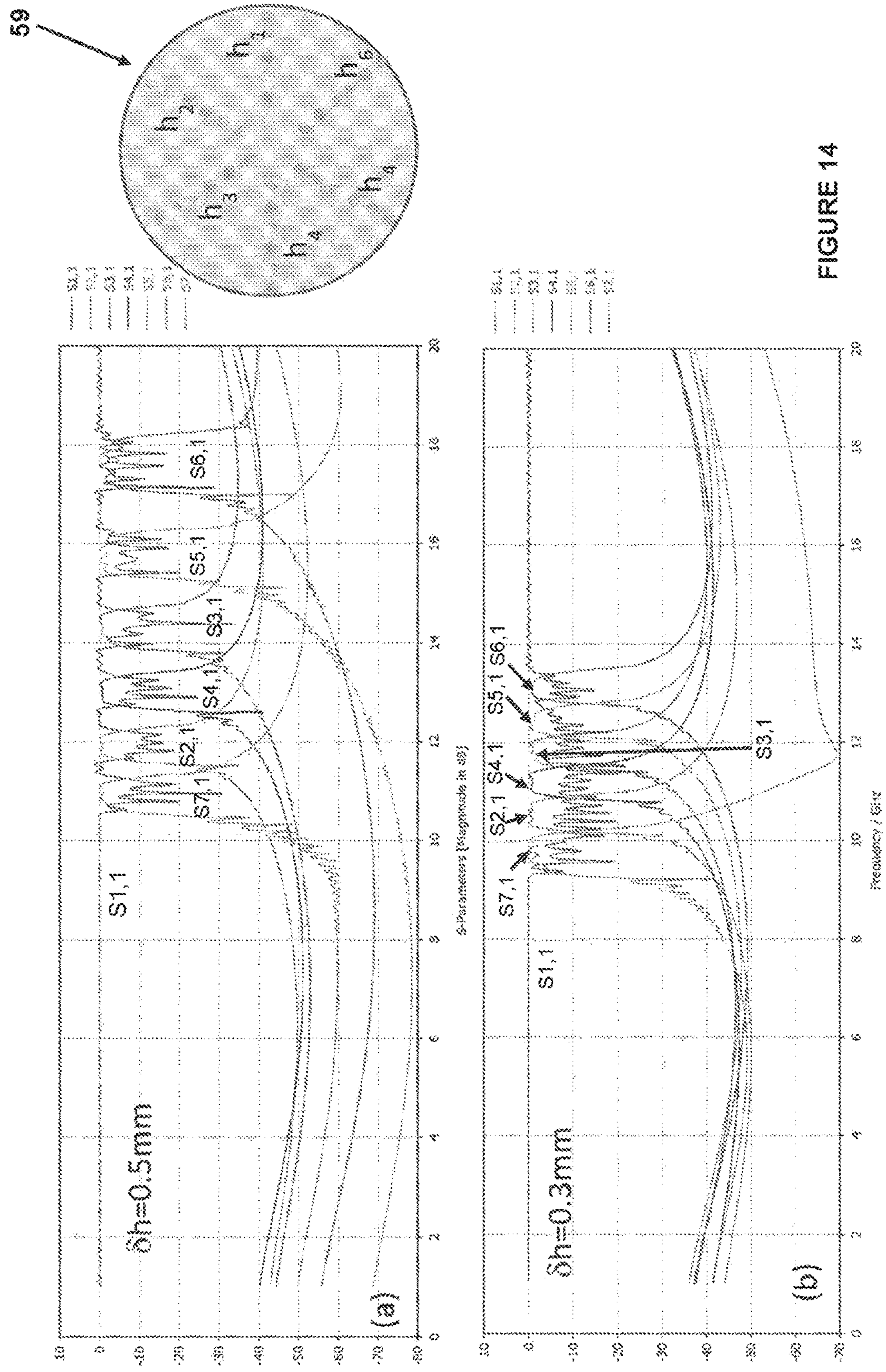

FIGS. 4 and 6 to 25 show exemplary passive microwave or millimeter wave components or devices 1 according to the present disclosure. FIGS. 4 and 6 to 9 show exemplary microwave or millimeter wave filters, FIGS. 10 to 12 show exemplary diplexers and FIGS. 13 to 15 show exemplary multiplexers.

FIGS. 4, and 6 to 9 show an exemplary microwave or millimeter wave passive component or device 1 that is a microwave or millimeter wave bandpass filter 3.

The benefits of the device and methods of the present disclosure concern the microwave frequency range and the millimeter wave frequency range, for example, devices operating in the frequency range 100 Mhz to 100 GHz, or for example in the frequency range 1 GHz to 50 GHz, or for example satellite communications frequency range.

As seen, for example, in FIG. 8, the microwave or millimeter wave passive device or component 1 or microwave or millimeter wave bandpass filter 3 comprises a microwave or millimeter wave waveguide, for example, a hollow or planar waveguide 5 and also comprises at least one or a plurality of arrays 7 of resonant structures 9 or coupled resonant structures 9.

The resonant structures 9, are for example, radiatively coupled resonant structures.

The resonant structures 9 (or adjacent resonant structures 9) are coupled via electric and magnetic fields generated by these resonant structures (or modal electric and magnetic fields). Energy is coupled between or from one resonant structure 9 to another by this coupling.

The hollow waveguide 5 is configured to support evanescent modes or waves of microwave or millimeter electromagnetic radiation. The hollow waveguide 5 is, for example, a single-mode hollow waveguide. The hollow waveguide 5 has a waveguide cut-off frequency $f_c$ below which the hollow waveguide 5 does not support a propagating mode or wave. For example, no transverse electric TE mode of microwave or millimeter electromagnetic radiation is propagated in the hollow waveguide 5 below the cut-off frequency $f_c$.

The cut-off frequency $f_c$ is, for example, the lowest cutoff frequency of the hollow waveguide 5. The structure or dimensions of the hollow waveguide 5 determine the cut-off frequency $f_c$. The cut-off frequency $f_c$ of the hollow waveguide 5 being that of the hollow waveguide 5 when empty or in the absence of any resonant structures 9 inside the waveguide 5.

A resonance frequency $f_r$ of the resonant structures 9 or the array 7 or of each of the resonant structures 9 of the array 7 is below or less than the cut-off frequency $f_c$ of the hollow waveguide 5.

The hollow waveguide 5 can be considered to define a pipe or pipe structure 5. The passive device or component 1 can thus be considered to comprise or be made of a host hollow (metallic) pipe 5 loaded with resonant structures or pins 9, which can be designated as a pin-pipe waveguide PPW. Reference will be made to a pin-pipe waveguide PPW herein when discussing the passive device or component 1, these terms being interchangeable. It is noted that the pipe or pipe structure 5 is not limited to a cylindrical shape.

Each of the resonant structures 9 is configured to provide or generate at least one local resonator LR. The local resonator LR (or resonators) of each resonant structure 9 are radiatively coupled or directly electric-magnetic coupled to each other. The local resonator LR is local to the resonant structure 9.

The resonator LR can, for example, consist of charges or charged particles that oscillate or resonate in the resonant structures 9 in the presence of microwave or millimeter wave electromagnetic radiation or microwave or millimeter electromagnetic waves.

The array 7 provides, for example, an array or plurality of radiatively coupled local resonators LR or direct electric-magnetic coupled local resonators LR.

The hollow waveguide 5 is configured to support at least one or a plurality of evanescent modes or waves of microwave or millimeter electromagnetic radiation that couple or interact with the local resonators LR of the resonant structures 9 to provide a subwavelength guided mode SWGM in the microwave or millimeter wave passive device 1. The evanescent modes or waves of the hollow waveguide 5 permit or play a role in the coupling of energy from one resonant structure 9 to another.

The subwavelength guided mode SWGM of the device 1 defines a microwave or millimeter wave frequency passband FPB (see for example, FIG. 6) of the microwave or millimeter wave passive device 1.

The resonant structures 9 are radiatively coupled and/or coupled by direct electric-magnetic coupling. That is, the resonant structures 9 are direct electric-magnetic coupled resonant structures 9. Electric and magnetic fields (or modal electric and magnetic fields) of the resonant structures 9 (or adjacent resonant structures 9) have direct coupling (or directly coupled to each other). There is direct electric and magnetic coupling of the resonant structures 9.

By direct coupling, the coupling occurs between resonant structures 9 (for example, open resonators) which are placed close or in proximity to each other (for example, at a subwavelength distance) and their electric and magnetic fields can be directly coupled.

As mentioned further below, the resonant structures 9 are, for example, open resonators permitting direct coupling.

The coupling can be exploited or influenced to adjust the bandwidth of the device via, for example, the evanescent mode of the waveguide 5.

The hollow waveguide 5 includes a first wall structure 11 and a second wall structure 15 both extending in a guiding direction GD. The hollow waveguide 5 also includes an interconnecting base or wall structure 17 extending between the first and second wall structures 11, 15. The first and second wall structures 11, 15 and the interconnecting wall structure 17 enclose the array or arrays 7. The first and second wall structures 11, 15 extend out from the interconnecting wall structure 17 to enclose the array 7. A height or extension of the first and second wall structures 11, 15 is, for example, greater than a height h of the resonant structures 9. The first and second wall structures 11, 15 extend, for example, substantially perpendicular to the interconnecting wall structure 17 to enclose the array 7.

The passive microwave or millimeter wave device 1 also includes an enclosure or ceiling EWS (see for example, FIGS. 4A and 8) extending between the first and second wall structures 11, 15. The enclosure EWS is located opposite the interconnecting base 17.

The first wall structure 11 and/or the second wall structure 15 may define fixed immobile structures. The first wall structure 11 and/or the second wall structure 15 may, for example, be attached to the interconnecting wall structure 17. Alternatively, the first wall structure 11 and/or the second wall structure 15 are mobile and configured to be displaced relative to the array 7. The first wall structure 11 and/or the second wall structure 15 are, for example, mobile or displaceable relative to the array 7 to increase or decrease a distance between the wall structure 11, 15 and the array 7 or the local resonant structures 9.

The first wall structure 11 and the second wall structure 15 may, for example, be portions of a continuous wall or surrounding wall that surrounds the array 7. The first wall structure 11 and the second wall structure 15 are interconnected by other portions of the continuous wall or the surrounding wall.

A width W of the hollow waveguide 5 is less than two-times a height $h_r$ of one or each resonant structure 9 of the array. The width W of the hollow waveguide 5 being for example the width between the first wall structure 11 and the second wall structure 15.

The width W of the hollow waveguide 5 may be, for example, tapered or gradually changes along the guiding direction GD. A height h of the hollow waveguide, between the enclosure EWS and the interconnecting base 17, may also be tapered or gradually changes along the guiding direction GD. Tapering permits to improve the matching, reduce the insertion loss, and obtain a sharp roll-off in the frequency passband profile.

The array 7 (or arrays) of resonant structures 9 is enclosed inside the hollow waveguide 5 or contained spatially inside the hollow waveguide 5. The array 7 (or arrays) of resonant structures 9 is enclosed by or surrounded by the wall structures 11, 15, the interconnecting base 17 and the enclosure or ceiling EWS. The enclosure EWS, the interconnecting base 17 and the first and second wall structures 11, 15 define a host cavity in which the array 7 of coupled resonant structures 9 is located. The enclosure EWS, for example, physically contacts the first and second wall structures 11, 15 to define the host cavity. The interconnecting base 17, for example, physically contacts the first and second wall structures 11, 15 to define the host cavity. For example, the enclosure EWS, the interconnecting base 17 and the first and second wall structures 11, 15 fully enclose or surround the array 7 of coupled resonant structures 9.

The first wall structure 11, the second wall structure 15, the interconnecting base 17 and the enclosure or ceiling EWS may, for example, define a continuous enclosure or surrounding, or a fully closed enclosure or surrounding that enclose or surround the at least one array 7 or resonant structures 9. The enclosure or surrounding is, for example, continuous or fully closed in a direction (substantially) perpendicular or non-parallel to the direction of extension of the at least one array 7. The continuous enclosure or surrounding, or the fully closed enclosure or surrounding define an inner cavity or chamber in which the at least one array 7 is located. The first wall structure 11, the second wall structure 15, the interconnecting base 17 and the enclosure or ceiling EWS may, for example, define a fully laterally closed body.

The continuous or fully enclosed enclosure may, for example, define at least a first opening and/or at least a second opening configured to receive (or to which is attached) a port, terminal or connector 19A such as metamaterial port or metamaterial connector discussed further below.

The array 7 (or arrays) of resonant structures 9 (and the array or plurality of coupled local resonators LR) enclosed inside the hollow waveguide 5 is configured to provide or generate the at least one microwave or millimeter wave frequency passband FPB (see, for example, FIG. 6) of the passive microwave or millimeter wave device 1.

The frequency passband FPB for example provides or generates at least one selected microwave or millimeter wave signal that can be outputted from or by the filter 3. The selected microwave or millimeter wave signal is, for example, filtered or selected from a broader microwave or millimeter wave signal inputted to, propagating in or passing through the device 3 at microwave or millimeter wave frequencies, for example, broader or wider than the passband FPB frequency range.

The array 7 extends inside the waveguide 5. The array 7 extends, for example, in a direction of extension of the waveguide 5 or in the guiding direction GD. The guiding direction GD may, for example, be the direction of extension of the waveguide 5 or a portion of the waveguide 5. The array 7 may extend, for example, in a direction substantially perpendicular to the direction of extension of the waveguide 5. The array 7 may extend towards the first and/or second wall structures 11, 15.

The array 7 is located between the first and second wall structures 11, 15. Each resonant structure 9 extends from the interconnecting wall structure 17 into the microwave waveguide 5 to define a microwave subwavelength resonant structure or deep subwavelength resonant structure.

The resonant structures 9 of the array 7 can extend periodically or non-periodically inside the hollow waveguide 5. The periodicity, radius, or height $h_r$ of the resonant structures 9 can, for example, be tapered or gradually changes along the guiding direction GD. The functioning of the device 1 is largely tolerant to changes in the periodicity, radius, or height $h_r$ between resonant structures 9 facilitating manufacturing of these devices. The resonant structures 9 of the array 7 can be arranged in a linear or a curved manner, and/or in one row or multiple rows.

The plurality of resonant structures 9 can, alternatively or additionally, be randomly positioned or grouped in a random ordering. FIGS. 35(*d*) and 35(*e*) show exemplary and non-limiting random arrangements.

The array 7 can be or define, for example, a 1D array or linear array. The 1D array or linear array may extend and branch out into a plurality of 1D array or linear arrays (or at least a first and second 1D array or linear array) extending in a direction different to the initial direction of extension of the initial array 7.

The array 7 of resonant structures 9 may, for example, define an achiral array of resonant structures 9 and of coupled local resonators.

The resonant structure 9 defines or has dimensions much smaller than the free-space wavelength of the applied microwave or millimeter wave electromagnetic radiation. For example, a height $h_r$ of the structure of the local resonant structure 9 extending into the waveguide 5 from the interconnecting wall structure 17 is smaller than the wavelength of applied microwave or millimeter wave electromagnetic radiation or of the predetermined operation frequency range of the device 1. The cross-sectional diameter $d_{cs}$ (or cross-sectional thickness and width) of the structure 9 is also, for example, smaller than the wavelength of applied microwave electromagnetic radiation. All constituent elements of the resonant structure 9 are, for example, of sub-wavelength dimension.

The resonant structures 9 (and locally radiatively-coupled resonator or resonators therein) are configured to couple with an inputted microwave or millimeter wave electromagnetic field or signal that is provided into the waveguide 5, for example, via a port or terminal 19. The sub-wavelength height $h_r$ may, for example, have an extension value (substantially) λ/4, λ/6, λ/8, λ/10 or smaller. The sub-wavelength diameter $d_{cs}$ (or cross-sectional thickness and width) may (substantially) be, for example, λ/16, λ/24, λ/32, λ/40 or smaller.

The resonant structures 9 are configured to be coupled with each other. The adjacent or successive resonant structures 9 are, for example, separated by a microwave or millimeter wave subwavelength distance. The successive resonant structures 9 are, for example, separated by a distance that is of value λ/4, λ/6, λ/8, λ/10 or smaller.

The resonant structure 9 is, for example, a passive resonant structure 9. The local resonator LR is a local passive resonator.

The resonant structure 9 may comprise or consist of a metallic resonant element.

Each resonant structure 9 comprises or consists of, for example, an elongated conductive element of subwavelength extension or length $h_r$ (as is the case for all resonant structures 9). Each resonant structure 9 may comprise or consist of a resonant metallic material or a resonant metamaterial configured to generate at least one or a plurality of local resonators LR or comprising at least one or a plurality of local resonators LR.

The resonant structures 9 (and local resonators LR) can be, for example, configured to generate at least one bandgap or hybridization bandgap in the frequency characteristic or dispersion curve characterizing microwave or millimeter wave propagation in the device 1. The array 7 of coupled resonant structures 9 is configured to provide a microwave or millimeter wave frequency stopband FSB, and the frequency of the subwavelength guided mode SWGM of the device 1 is outside or below (less than) this frequency stopband FSB.

The resonant structures 9 inside the hollow waveguide are also configured to provide or generate the at least one microwave or millimeter wave frequency passband FPB (see, for example, FIG. 6). The resonant structure or structures 9 are configured to provide or generate local resonators 9 having or defining a resonance frequency $f_r$. The resonance frequency $f_r$ of each local resonator LR is defined by the length or elongated extension $h_r$ of the resonant structure 9. A cut-off frequency of the device 1 or microwave bandpass filter 3 is defined by the length or elongated extension h of the resonant structure 9.

Changing the elongated extension $h_r$ of the resonant structure 9 located inside the hollow waveguide changes the spectral location of the frequency stopband FSB generated by the microwave passive device 1 (or the spectral location of the subwavelength guided mode SWGM of the device 1).

A bandwidth of the frequency stopband FSB and the subwavelength guided mode SWGM of the microwave passive device 1 is also defined by a length or elongated extension $h_r$ of the resonant structure 9. The subwavelength guided mode SWGM of the device 1 is at a frequency below or less than the resonance frequency $f_r$ of the resonant structures 9 of the array 7.

As previously mentioned, the resonance frequency $f_r$ of the resonant structures 9 is below or less than the cut-off frequency $f_c$ of the hollow waveguide 5. The frequency difference between the cut-off frequency $f_c$ and the resonance frequency $f_r$ is set or determined so that propagating modes or waves of the hollow waveguide 5 affect the local resonances LR of the resonant structures 9 to determine or modify the frequency passband or bandwidth of the device 1. The relative values of $f_c$ and $f_r$ are determined so as to shape the dispersion curve of the subwavelength guided mode of the device 1.

The resonant structure or each resonant structure 9 may, for example, comprise or consist of an elongated conductive wire or pin. The elongated conductive wire or pin may comprise or consist of at least one metal, for example, brass, copper, silver, or aluminum.

The resonant structure 9 may, for example, comprise or consist of a conductive or metallic resonant structure. The resonant structure 9 may, for example, comprise or consist of a (small) electrical open resonator, such as that defined or provided by a straight wire, a spiral wire, or helical. The resonant structure 9 defines, or is an open resonator, comprising or consisting of a wire or a solid conductive/metallic body extending to define a particular shape, non-limiting examples of which can be seen in FIGS. 36A to 36D. The resonant structure 9, for example, is not a closed resonator such as cubic cavity or cylinder.

The resonant structure 9 is not limited to straight rods, pins or wires and may take on or define many different shapes. The resonant structure 9 may, for example, define a helical, spiral, annular, tubular or ring structure or form. Exemplary forms are shown in FIGS. 36A to 36D. The resonant structures 9 may comprise or consist of a solid conductive or metal body extending from a surface of the hollow waveguide 5 to define, for a loop such as a circular or rectangular loop or a spiral or helicoidal prolongation (FIGS. 36A to 36D).

The resonant structures 9 may, for example, be tilted or orientated as shown, for example, in FIG. 36C.

The resonant structure 9 may comprise or consist of a solid element or body (non-hollow/cavity-less element or body) that extends to define a desired form, such as those exemplary shapes mentioned above.

The array (or grouping) 7 may, for example, include resonant structures 9 of a plurality of different shapes.

The resonant structure 9 (for example, the rods, pins or wires) may, for example, have or define different cross-sectional shapes. FIG. 35(*f*) shows, for example, an oval or elliptical cross-sectional shape. The solid conductive or metal body extending from a surface of the hollow waveguide to define a desired form of the resonant structure 9 may have different cross-sectional shapes, for example, circular or elliptical as shown in FIG. 36B, or rectangular as shown in FIGS. 36C and 36D.

The array 7 (or sub-arrays thereof) may, for example, comprise of a number N of resonant structures 9, for example, $2 \leq N \leq 20$, for example, N=5, 6, 7 or 8.

The waveguide 5 may also comprise or consist of at least one metal, for example, brass, copper, silver, copper, silver, or aluminum. The microwave waveguide 5 may, for example, comprises or consists of a hollow waveguide or hollow metallic waveguide. The microwave waveguide 5 may, for example, define a rectangular waveguide or a cylindrical waveguide. These waveguide forms are provided as non-limiting examples.

A width W of the waveguide 5 as defined by the first and second wall structures 11, 15 or a distance $d_y$ between the array 7 and the first wall structure 11 and/or the second wall structure 15 defines a bandwidth of the microwave or millimeter wave passband FBP of the filter 3. The microwave bandpass filter 3 is configured to define a bandwidth of the microwave or millimeter passband FPB by changing a cut-off frequency of the hollow waveguide 5.

This is, for example, achieved by the first wall structure 11 and/or the second wall structure 15 being mobile and configured to be displaced relative to the array 7 as mentioned above.

FIG. 8 shows a non-limiting example of a displacement system DS including screw 21A and an outer member 23A for manually or automatically setting or reconfiguring a bandwidth of the microwave or millimeter wave passband FPB and filter 3 by changing a cut-off frequency of the hollow waveguide 5. The outer member 23A is held in a fixed position on the device 3 and the first wall structure 11 is displaceable relative to the outer member 23A and the interconnecting wall structure 17. The displacement system DS may also include at least one spring (not shown) interconnecting and located between the outer member 23A and the first wall structure 11 to maintain the first wall structure 11 in position and to permit the first wall structure 11 to move back towards the outer member 23A when the screw 21A is rotated outwards.

The exemplary embodiment of FIG. 8 shows the interior parts of the device 1 by removing a bottom plate/cover (the interconnecting wall structure 17). Although the pins 9 seems to be suspended in air, they are connected to the ground plane (the interconnecting wall structure 17), which is not shown in the Figure for illustrative purposes only. The enclose EWS is as a result visible in FIG. 8.

The screw 21A is, for example, threaded through the outer member 23A to contact the first wall structure 11. Rotation of the screw 21A increases or decreases the distance between the array 7 and the first wall structure 11 permitting the bandwidth of the microwave or millimeter passband FPB and filter 3 to be changed. The displacement system DS may additionally include a further screw 21B and further outer member 23B (and spring) arranged in an identical manner to displace the second wall structure 15. The screws can, for example, be connected to the walls 11 and 15 by small balls or bearing at the end of the screws. Bearings and balls allow the screws to turn and pull the movable walls.

The displacement or tunning can be performed manually or by using an electrical or mechanical methods. The first wall structure 11 and the second wall structure 15 may, for example, comprise or consist of continuous or planar metallic walls or plates as for example shown in FIG. 8. The surface of the wall structure facing the array 7 may be planar or non-planar. The surface of the wall structure may, for example, extend to define a non-flat or surface whose profile is varying.

Optionally, the passive microwave or millimeter wave device 1 may additionally include resonant meta material is located between the array 7 of coupled resonant structures 9 and the first wall structure 11 on one side of the hollow waveguide 5, and resonant metamaterial located between the array 7 of coupled resonant structures 9 and the second wall structure 15. The resonant metamaterial is configured to provide or generate locally resonators.

The resonant metamaterial may comprise or consist of a plurality or a bed of elongated conductive bodies. The elongated conductive bodies define microwave subwavelength elongated conductive bodies. The conductive bodies are, for example, attached to and extend from the interconnecting wall structure.

The conductive body defines a microwave subwavelength structure (height and cross-section). A height of the body extending into the waveguide 5 is, for example, greater than the height h of the resonant structures 9.

The elongated conductive bodies extend (substantially) in the same direction as the resonant structures 9. The plurality of elongated conductive bodies can, for example, be randomly positioned or grouped in a random ordering.

The elongated conductive bodies may comprise or consist of at least one metal, for example, brass, copper, silver, or aluminum.

The inclusion of resonant metamaterial between the array 7 and the hollow waveguide walls is optional. The hollow waveguide 5 may, for example, be resonant metamaterial-free or artificial wall-free between the hollow waveguide walls. The hollow waveguide 5 may, for example, be resonant metamaterial-free or artificial wall-free between the at least one array 7 of coupled resonant structures 9 and the first wall structure 11, and can be resonant meta material-free or artificial wall-free between the at least one array 7 of coupled resonant structures 9 and the second wall structure 15.

The microwave or millimeter passive component 1 and filter 3 may include, for example, a first terminal or probe 19A and a second terminal or probe 19B permitting microwave electromagnetic fields or signals to be inputted and outputting to and from the waveguide 5 and filter 3.

The array 7 is, for example, located fully or partially between the first and second terminals 19A, 19B. The first terminal or probe 19A and/or the second terminal or probe 19B may comprise or consist of coaxial terminals or probes, or alternatively may comprise or consist of a strip terminal or probe. The terminals 19 may alternatively comprise or consist of a waveguide or waveguide port, for example, a rectangular waveguide. As mentioned previously, the microwave or millimeter passive component or device 1 of the present disclosure or the waveguide 5 further includes the enclosure or enclosing wall structure EWS (see, for example, FIGS. 4A and 4B) located, for example, opposite the interconnecting wall structure 17. The enclosing wall structure EWS extends between the first and second wall structures 11, 15. The terminals 19 may, for example, extend into the waveguide 5 from enclosing wall structure EWS. The enclosing wall structure EWS may define or include openings extending fully through the enclosing wall structure EWS and through which the terminals 19 extend and enter the waveguide 5 (as for example shown in FIGS. 4A and 4B), or to which (rectangular) waveguides are attached to provide and receive microwave signals.

Alternatively, the terminals 19 may be provided through the interconnecting wall structure 17 in the same manner.

The device 1 may include at least one or a plurality of lateral openings LO1, LO2 for coupling with a terminal or port for providing a microwave or millimeter wave signal into the device 1 or taking a microwave or millimeter wave signal out of the device 1 (see, for example, FIGS. 12A, 16A, 16B). Waveguides may, for example, be connected to the lateral openings LO1, LO2, for example, an input and output waveguide.

The lateral opening (or port) LO1, LO2 may, for example, be defined by the enclosure EWS, the interconnecting base 17 and the first and second wall structures 11, 15 (or any one of the enclosure EWS, the interconnecting base 17, or the wall structure 11, 15) and be located in front of or opposite the at least one array 7 of resonant structures 9.

The lateral opening (or port) LO1, LO2 may also, for example, be defined by a lateral extremity LE (see, for example, FIGS. 12A, 16A, 16B) of the device 1. For example, in an embodiment, the coaxial input and output 19A, 19B of the device 1 of FIG. 8 can be replaced by input and output terminals connected to openings defined in the lateral extremities LE of the device 1 of FIG. 8.

The device 1 may include connection means for connecting input and output terminals/ports to the device 1. The device 1 may, for example, include flanges and fastening means such as screws for attached to a corresponding flange of input and output terminals/ports. The input and output terminals/ports may alternatively be integrally attached to the device 1.

In one embodiment, the microwave or millimeter wave passive device 1 includes at least one connector or coupler 19A, 19B (as, for example, shown in FIGS. 9A to 9D) that comprises resonant metamaterials 9B. This signal connector or port is designated a metamaterial port or metamaterial connector 19A, 19B. The microwave or millimeter wave passive device 1 includes at least one metamaterial port or metamaterial connector 19A, 19B. FIGS. 32 to 34 show non-limiting exemplary embodiments of the meta material port or metamaterial connector.

The metamaterial port or connector 19A, 19B comprises a hollow waveguide 5B enclosing a plurality of resonant structures 9B or coupled resonant structures 9B. The coupled resonant structures 9B are, for example, radiatively coupled resonant structures 9B or direct electric-magnetic coupled resonant structures 9B (as previously explained in relation to the resonant structures 9 of the hollow waveguide 5). The plurality of coupled resonant structures 9B form a cluster or grouping of coupled resonant structures 9B. The hollow waveguide 5B is, for example, a single-mode hollow waveguide, or alternatively a multi-mode hollow waveguide.

The metamaterial port 19A, 19B includes a first connection means or interface C1 attached to, or integral or integrated with the hollow waveguide 5 of device 1, and a second connection means or interface C2 configured to be attached to a further component, device or object. The connection means C1, C2, for example, comprise or consist of a waveguide flange FL. The waveguide flange FL may, for example, include bores permitting attachment via fastening means such as screws, or nuts and bolts, for example.

The hollow waveguide 5B encloses a plurality of coupled resonant structures 9B located therein so as to be facing or adjacent the array 7 of the device 1 when the meta material port 19A, 19B is attached to the device 1.

At least one or multiple resonant structures 9B of the metamaterial port 19A, 19B are, for example, separated by a microwave or millimeter wave subwavelength distance from the array 7 of resonant structures 9 when the metamaterial port 19A, 19B is attached to the device 1. The separation is, for example, of a distance that is of value $\lambda/4$, $\lambda/6$, $\lambda/8$, $\lambda/10$ or smaller.

The resonant structures 9B are identical to those previously described in relation to the device 1, however, the resonant frequency $f_r$ of the resonant structure 9B is, for example, different to that of the resonant structure 9 of the array 7 of the device 1.

The metamaterial port 19A, 19B permits to improve a matching efficiency with the device 1 compared to other couplers/connectors such as a standard waveguide (WR75, for example). The hollow waveguide 5*b* is loaded (for example, at a location in that will be in proximity to the array 7 of device 1) with the plurality of resonant structures 9B, as, for example, shown in FIGS. 9A to 9D. The resonant structures 9B function as a locally resonant metamaterial, and have a resonant frequency $f_r$ higher or greater than the resonance frequency $f_r$ of the resonant structures 9 of the microwave or millimeter wave passive device 1. The resonant structures 9B also have a resonant frequency $f_r$ higher than a cut-off frequency of the host hollow waveguide 5B of the metamaterial port 19A, 19B. A height of the resonant structure 9B of the metamaterial port is, for example, less than a height of the resonant structure 9 of the device 1. This allows a desired frequency range or band to be passed to the device 1.

The resonance frequency $f_r$ of the resonant structures 9 is for example in the frequency range in which the waveguide 5B supports the propagating transverse electric TE mode or single propagating transverse electric TE mode.

The metamaterial port 19A, 19B assures filtering of a microwave or millimeter wave signal passing or propagating through it and functions to implement a low pass or bandpass filter. The metamaterial port 19A, 19B allows to efficiently couple an electromagnetic wave from, for example, a standard waveguide (e.g. WR28) to the filter 3 or passive device 1. The metamaterial ports 19A, 19B implement a low pass or bandpass filter that tailors the frequency profile of the signal to assure a low insertion loss and a sharp roll-off (sharp slope of passband at both sides) as can be seen in FIG. 9E.

The metamaterial port 19A, 19B provides a transition medium, that induces some poles (transmission band peak) in the passband and some zeros (transmission band minimum) in the rejection band. Near or around the poles' frequency, the energy efficiently couples from, for example, a standard waveguide to the device 1 via the metamaterial port 19A, 19B. The size of the pins 9 and their inter-distances are adjusted to make one or more poles at the desired frequency to be passed through and zeros in the rejection band to filter out non-desired frequencies.

As shown in FIGS. 9A to 9D, the numbers of pins/resonant structures 9B can vary, and their relative arrangement can be arranged in different patterns. The arrangement may be at periodic or nonperiodic. The size (height and/or cross-sectional thickness) of the pins/resonant structures 9B and/or their inter-distance or separation is adjusted and determined to define a filtering profile in frequency that passes frequency values of the frequency passband FPB of the device 1 and induces a zero or minimum at a frequency value for example above or higher than the frequency passband FPB of the device 1. A zero or minimum is induced at the frequency located in a rejection band of the device 1.

The resonant structures 9B can be arranged in a linear or a curved manner, and/or in one row or multiple rows.

The arrangement of the plurality of resonant structures 9B in the propagative host waveguide 5B is determined in correspondence with the frequency passband FPB of the passive device 1 (or the frequency of the subwavelength guided mode of the passive device 1) so as to filter out or remove frequencies higher or above the frequency passband FPB of the passive device 1 (or the frequency range of the subwavelength guided mode of the passive device 1), and allow frequency values of the frequency passband FPB to pass through to the device 1. The arrangement of the plurality of resonant structures 9B is thus varied to tailor the filtering profile to obtain a desired matching efficiency with the device 1 as well as a low insertion loss and a sharp roll-off.

As shown, for example in FIGS. 9A to 9D, the device 1 includes the first metamaterial port 19A including the plurality of coupled resonant structures 9B enclosed inside the hollow waveguide 5B and configured to couple or transfer an electromagnetic wave into the hollow waveguide 5 of the microwave or millimeter wave passive device 1. The device 1 also includes the second meta material port or connector 19B similarly including a plurality of coupled resonant structures 9B configured to transfer an electromagnetic wave out of the device 1. The array 7 of the device 1 is located between the first and second metamaterial ports 19A, 19B. The second metamaterial port or connector 19B similarly functions to implement a low pass or bandpass filter to provide a desired matching efficiency, a low insertion loss and a sharp roll-off in relation to the signal coupled from the device 1 to a subsequent component connected to the device 1, for example, a standard waveguide. The arrangement of the plurality of resonant structures 9B in the propagative host waveguide 5B of the second metamaterial port 19B may, for example, be different to that of the first meta material port 19A as shown in FIG. 9A, for example, to obtain a sharp roll-off in the outputted signal.

The hollow waveguide 5B of the metamaterial port 19A, 19B is configured to support a (or at least one) transverse electric TE mode of microwave or millimeter electromagnetic radiation. The hollow waveguide 5B of the metamaterial port 19A, 19B is, for example, configured to support a single propagative transverse electric TE mode.

The hollow waveguide 5B includes a first wall structure 11B and a second wall structure 15B, an interconnecting base or wall 17B extending between the first and second wall structures 11B, 15B, and an enclosure or ceiling EWSB extending between the first and second wall structures 11B, 15B. The enclosure EWSB is located opposite the interconnecting base 17B.

The plurality of coupled resonant structures 9B, enclosed inside the hollow waveguide 5B, are configured to provide coupled local resonators LR and at least one frequency stopband FSB. The plurality of coupled resonant structures 9B are located between the first and second wall structures 11B, 15B. Each resonant structure 9B extends from an interconnecting base 17B of the hollow waveguide 5B into the hollow microwave waveguide 5B to define a subwavelength resonant structure. The successive resonant structures are separated by a subwavelength distance.

The enclosure EWSB and the interconnecting base 17B physically contact the first and second wall structures 11B, 15B to define a host cavity in which the plurality of coupled resonant structures 9B are located.

A resonance frequency $f_r$ of the resonant structures 9 of the array 7 of the device 1 is lower than a resonance frequency $f_r$ of the resonant structures 9B of the plurality of coupled resonant structures 9B of the first and/or second metamaterial port 19A, 19B. A resonance frequency of the resonant structures 9B of the plurality of coupled resonant structures 9B of the first and/or second metamaterial port 19A, 19B is higher than a cut-off frequency of the hollow waveguide 5B of the first metamaterial port 19A, and/or first metamaterial port 19B.

The resonance frequency $f_r$ of the resonant structure 9B is, for example, in a frequency range in which the hollow waveguide 5B supports a transverse electric TE mode of microwave or millimeter electromagnetic radiation.

A width $W_{MP}$ of the hollow waveguide 5B of the first and/or second metamaterial ports is greater than two-times a height $h_r$ of the resonant structures 9B or of each resonant structure 9B of the first metamaterial port. The width $W_{MP}$ extends between the first and second wall structures 11B, 15B. The height $h_r$ of the resonant structures 9B extends between the enclosure EWSB and the interconnecting base 17B. The height $h_r$ of the resonant structure(s) 9B of the first metamaterial port 19A, a cross-sectional width/thickness of the resonant structure(s) 9B, a distance between resonant structures 9B and the grouping pattern/arrangement of the resonant structures 9B define a frequency or frequency range at or in which a selected microwave or millimeter wave signal is admitted into the microwave or millimeter wave passive device 1.

The height $h_r$ of the resonant structures 9B of the second metamaterial port, a cross-sectional width/thickness of the resonant structure(s) 9B, a distance between resonant structures 9B of the second metamaterial port 19B and the grouping pattern/arrangement of the resonant structures 9B define a frequency or frequency range at or in which a selected microwave or millimeter wave signal is transferred out of the microwave or millimeter wave passive device 1. The size, dimensions, and arrangement of the resonant structures inside the hollow waveguide 5B allows to define the size of the rejection band and level of rejection.

As previously mentioned, the coupled local resonant structures 9B may be arranged in a periodic or aperiodic pattern, or arranged randomly inside the hollow waveguide 5B.

General physical phenomena occurring in artificial systems composed of far-field coupled local resonators LR can be understood in a simple way by considering two coupled oscillators with similar individual resonance frequency. The main consequence of the radiative coupling is the splitting of the modal frequencies of the two-oscillator system. One can, therefore, imagine that when more than two oscillators are considered, a frequency window is opening where no waves propagate. In contrary to photonic crystals, this forbidden band is not a result of destructive interferences of the Bragg type, but it stems from the anti-phase response of the unit cells near their resonance frequency ($f_r$), exactly like a mechanical mass-spring that cannot follow a too fast excitation, and also similar to the polariton phenomenon in quantum mechanics. A schematic of a system with coupled local resonances LR is shown in FIG. 1A and the frequency splitting, which cause a hybridization bandgap [56], [57] is depicted in FIG. 1B.

Accordingly, the bandgap frequency $f_r$ is not dictated by the spacing of the periodic array, but by the frequency of the local oscillators and one can thus manipulate the propagation of the wave in the vicinity of $f_r$, by coupling the wave to a local resonance LR with the frequency $f \approx f_r$. A resonant wire medium 9 composed of electrical inclusions with the resonance frequency of $f_0$, shows the dispersion curve such as depicted in FIG. 1B.

In contrast to locally resonant metamaterial line defect waveguides [47], the present disclosure concerns a new mechanism of waveguiding that provides a design framework for a wide range of passive devices with adjustable frequency passbands and stopbands. The structure of device 1 includes a host hollow waveguide or metallic pipe 5 loaded with small metallic resonant elements, for example, with (thin) resonant pins 9, to form a pin-pipe waveguide PPW or composite pin-pipe waveguide CPPW, as shown schematically in FIGS. 1C to 1F. The guiding mechanism of the device 1 is affected or determined by both the pins 9 and the pipe or waveguide 5 hosting the pins 9. The height $h_r$ of pins and the size/dimensions of the pipe (width W, height h) determine zeros and poles of the system, i.e., the passband FPB and stopband, of the device 1.

Two parameters that play a significant role in the PPW engineering are $h_r$ and width W of the pipe 5, which determine the operating frequency $f_o$ and the bandwidth BW of the device 1, respectively.

The diameter (D=2r) of pins 9 and their inter-distances a can be shrunk down, as much as fabrication allows. The diameter D and inter-distances a are much smaller than the wavelength Λ of the millimeter wave or the microwave electromagnetic wave for which device operation is foreseen. The subwavelength size of the diameter D enables the creation of miniaturized microwave or millimeter wave devices 1. The guiding mechanism in the PPW is based on direct electric-magnetic coupling of the pins 9 (as subwavelength resonators) affected or influenced by a cutoff frequency and propagating properties of the host pipe 5.

The pin-pipe waveguides PPW can be categorized into two classes shown in FIGS. 1D and 1E. In the first class (FIG. 1D), the waveguide or pipe 5A is or defines a propagating medium and is a propagative host, and in the second class (FIG. 1E), the waveguide or pipe 5 is an evanescent host attenuating around the resonance frequency of the pin 9. This classification implies that we have $2h_r < W$ and $2h_r > W$, for the first and second classes, respectively.

In the first class, occurring when the resonance frequency $f_r$ of the pins 9B falls into the frequency range in which the waveguide 5B supports a single propagating transverse-electric (TE) mode, the inclusions 9B create a stopband or hybridization band gap. In the second class, when the resonance frequency $f_r$ of the pins 9 is below the cut-off frequency of the host waveguide 5, the inclusions 9 create a passband FPB.

An exemplary model of the bandpass filter 3 of the present disclosure consists of a wire medium 9 in a host metallic cavity or waveguide 5, shown in FIG. 2A. The propagation properties of this transmission medium 5 is influenced by the dispersion of the coupled resonators 9 as well as the dominant mode of the host medium 5. Therefore, the dispersion curves of the guided modes of the device 1 are shaped by the interaction of both the polariton-like dispersion of the LRM 9 and also the capacitance of the host rectangular waveguide 5. In this way, it is shown that the bandwidth of the filter 3, directly depends on the size, in particular, the width W of the host medium 5.

For a fixed width of the host waveguide, by increasing the distance between the pins (LR), which means reducing the coupling coefficient, the bandwidth can be slightly decreased.

A larger waveguide 5, with a lower cut-off frequency, results in a guided mode with wider bandwidth and subsequently, a narrower waveguide 5 causes a narrower bandwidth. Both the waveguide 5 and the wires 9 provide independent tuning of the bandwidth and center frequency, respectively.

In order to compute the dispersion curve of this waveguide 5, one assumes a unit cell with periodic boundary conditions (PBCs) in both the right and left sides of the unit cell and PECs for the other sides. The cutoff frequency $f_c$ of the rectangular waveguide 5 is determined by $f_c = c/2 \times W$, where W is the width of the waveguide 5 and the resonant frequency of wires ($f_r$) depends on the length of the wires 9.

The inventors demonstrate that according to the relative situation of $f_c$ and $f_r$, the dispersion curve of the guided mode of the device will be shaped. For example, a chain 7 of wires 9 with a length of h=4.4 mm ($f_r$~17 GHz) and inter-distance of a=2.5 mm, embedded in a rectangular metallic waveguide 5 with W=a=2.5 mm ($f_c$=59 GHz), will create a narrow band transmission with flat shape dispersion curve, shown in FIG. 3(*a*). This is due to the fact that the local resonances LR have occurred well below the cutoff frequency of the hollow waveguide 5 and are less affected by its dominant propagating modes. By increasing the width W of the rectangular waveguide 5 to W=3a, its cut off frequency shifts down, and as it is illustrated by the dashed line in FIG. 3(*b*), with a cut off frequency near to 18.5 GHz.

The dispersion curve of the guided modes in LRM waveguide (LRW) with W=3a, shown by closed circles, covers a wider bandwidth when compared to LRW with W=a. Based on the information achieved by the dispersive properties of the guided modes, the Inventors determined that this subwavelength structure can play a role of a bandpass filter 3 with adjustable bandwidth and the high level of rejection in stopband (above $f_r$), due to the induced HBG. Therefore, the order of the system, which can be interpreted as the number of zeros in the stopband, is determined by the number of wires 9.

FIG. 1G also illustrates the influence of the width W of the host waveguide 5 on the guided mode of the device 1 according to the present disclosure. Before presenting the subwavelength, guided mode SWGM illustrated in FIG. 1G, the constituent components of the device 1 or pin-pipe waveguides PPW are discussed with reference to FIGS. 1D to 1F.

FIGS. 10 to 1F show the pin-pipe waveguide PPW, which are artificial transmission lines composed of a host waveguide 5, 5B, for example in the form of a hollow metallic pipe, loaded by a set of small locally-resonant inclusions arranged at the subwavelength scale along the propagation direction GD, and implemented for example with resonant pins 9, 9B. FIGS. 1D and 1E show PPWs composed of a single-mode hollow metallic pipe, with height h and width W, loaded by a set of locally-resonant inclusions 9, 9B arranged at the subwavelength scale, and implemented, for example, with pins 9, 9B. The pins 9, 9B have a height of $h_r$, which determines their resonance frequency $f_r$, estimated by the quarter-wavelength resonance condition $f_r$=c/4$h_r$. The cut-off frequency $f_r$ of the host pipe 5, 5B is the other main parameter with $f_c$=c/2 W. The two different regimes or classes exist when i) $f_r>f_c$ (FIG. 1D) and ii) $f_r<f_c$ (FIG. 1E), in which the host pipe supports either a single propagative TE mode, or only evanescent modes. In a non-limiting exemplary embodiment, the size of the pins 9, 9B are set so that they resonate in the Ku band (10-18 GHz), which is widely used for satellite communications. From the manufacturing standpoint, this choice allows geometries compatible with standard fabrication sizes and accuracy, with RF/mechanical design advantages. The diameter of the pins 9, 9B is set to 2r=1 mm, which is the minimum thicknesses that can be fabricated by selecting laser melting (SLM) using a low-loss aluminum alloy of AlSi10Mg, according to the current standards.

The first class illustrated in FIG. 1D concerns a PPW comprising a propagative host pipe. One or several resonant pins 9B are included in the host pipe 5B supporting a propagating mode in the vicinity of the resonance frequency $f_r$ of the pin 9B with the resonance frequency $f_r$ being greater than the cut-off frequency $f_c$ of the host pipe 5B ($f_r>f_{c1}$). In the exemplary embodiment, the resonance frequency of the pins 9B is around 17 GHz, by choosing the size of pins $h_r$=4.4 mm. Whenever $f_r$ falls in the single-mode band of the host waveguide 5B, which starts directly above $f_c$. (implying W>2$h_r$), the unloaded waveguide supports its first transverse electric (TE) mode around $f_r$. Thus, the presence of the pins 9B creates a stop band in the transmission spectrum of the system. This is also apparent by considering the band structure of the infinite periodic system whose unit cell is shown in FIG. 1H (left), which features a forbidden band HBG (FIG. 1H, right). In FIG. 1H, the dashed line indicates the dispersion curve of the unloaded host pipe with a cut-off frequency of $f_c$ while the dashed straight line corresponds to the resonance of the local resonators. The bands of loaded pipe 5B (solid black line) show a level repulsion, similar to a polariton created by the strong interaction of a photon and a resonant state, from which the HBG nucleates.

Hence, by inserting a finite set of pins, such as a 5×1 or a 2×6 array, as shown in FIG. 1I, one obtains a significant drop in the transmission. The level repulsion occurs right above a frequency $f_o$, which can be interpreted or designated as the resonance frequency of the unit cell of the PPW, and it is slightly lower than the resonant frequency $f_r$ of the individual pin 9B. By increasing the number of pins 9B, the properties of the bandgap can be modified. The size and position of the HBG are related to the resonance frequency $f_r$, quality factor, and density of the individual resonators, and it is remarkably largely decoupled from the periodicity. This feature makes HBGs unique and inherently different from Bragg type bandgaps, whose frequency scale with the lattice constant, as they occur in (generally) non-resonant periodic systems due to destructive interferences between waves scattered off two distinct crystal planes.

The metamaterial port or metamaterial connector 19A, 19B previously described is structured based on the first class category and is detailed further below in relation to FIGS. 32 to 34.

The second class illustrated in FIG. 1E concerns the PPW 1 comprising an evanescent host pipe 5. One or several resonant pins 9 are included in the host waveguide 5 and have a with the resonance frequency $f_r$ below or lower than the cut-off frequency of the host waveguide 5 ($f_r<f_{c2}$). This is obtained when the width $W_2$ of the pipe is smaller than twice the pins' height $h_r$. As depicted in FIG. 1F, the unloaded pipe does not support any propagating mode below the cut-off frequency $f_c$. Besides, the anti-phase response of the resonant pins 9 creates a large HBG, shown in FIG. 1F (middle). Including pins 9 with the resonance frequency $f_r$, inside the hollow waveguide or pipe 5 (with a cut-off frequency $f_c$) results in a sub-wavelength guided mode SWGM below the resonance frequency $f_r$ which is schematically illustrated in the band diagram of the PPW in FIG. 1F (right). The width of this sub-wavelength guided mode SWGM is determined by the relative positions of the resonance frequency $f_r$ of the pins 9 and the cut-off frequency $f_c$, of the host hollow waveguide 5 providing a customizable bandwidth. The bandwidth's customizability is achieved by changing the width $W_2$ of the pipe or hollow waveguide 5. This feature can be observed either in the band diagram of the infinite PPW or in the scattering parameter ($S_{21}$, $S_{11}$) of a finite-size pin-pipe structure. FIG. 1G (left and right) shows the scenarios where small and large widths of W and W' are employed for making narrow and wideband PPWs, respectively. Increasing the width of the pipe 5 from W to W', or equivalently reducing the cut-off frequency $f_c$ from $f_c$ to $f_c'$, expands the sub-wavelength guided mode SWGM to the lower frequencies.

The bandwidth of the sub-wavelength guided mode SWGM can also be adjusted by altering the resonance frequency of the pins 9, for example, by changing the height of the pins 9.

To realize an exemplary bandpass filter 3, the Inventors accordingly assumed a closed box comprising the LRW with, for example, two coaxial probes 19 (FIG. 4A), whose positions and sizes are optimized for achieving the best matching. The main parameters that are optimized for achieving the best transmission are depicted in FIG. 4B. Considering the practical wires' diameter of 1 mm, and the optimized value of 2.5 mm for the distance between the wires 9, the frequency selection of the filter 3 is improving by the number of the wires 9. To have the best roll off with minimum ripples in the passband, the number of wires (N), i. e the degree of the filter is, for example, chosen to be 6. The sizes of the probes 19, air gap on top of the wires 9, the distance of the probes 19 from the LRW, and the distance of the probes 19 from the metallic walls are optimized using CST optimization and values are shown in Table. 1 (these exemplary values concern a non-limiting embodiment having the cut off frequency at 15 GHz (middle of Ku band). The spectra of the scattering coefficients ($S_{21}$, $S_{11}$), considering the optimized parameters of the structure, are shown in FIG. 5.

TABLE 1

The values of the main parameters after the optimization

| Parameters | Values |
|---|---|
| a | 2.5 mm |
| $d_2$ | 0.2 mm |
| $d_1$ | 2.3 mm |
| $h_{gap}$ | 5 mm |
| $h_{probe}$ | 6 mm |
| N | 6 |

Based on the investigation and the results, the main parameter, which interestingly affects the transmission spectrum, is the width W of the waveguide 5.

By decreasing the width W of the waveguide 5, the cutoff frequency of the rectangular waveguide 5 shifts to lower frequencies, and accordingly, it widens the bandwidth of the guided mode of the LRW 3. This is very interesting as the bandwidth can be tuned without scaling the frequency band of operation. The distance of walls from the resonant wires 9, shown by $d_y$ in FIG. 6, makes a significant influence on the transmission spectra. FIG. 6 shows the $S_{21}$ spectra for different values of $d_y$, illustrating the tunability of the bandwidth mentioned earlier.

In order to achieve the best coaxial transition, different types of the probe 19 have been studied, which demonstrate that the highest matching can be obtained by employing strip probes 19, instead of regular wire probes 19. As can be seen in FIG. 7, the return loss has the best value by considering the strip's width of w'=2 mm.

The Inventors designed and fabricated a filter 3 including a narrow pipe with two pins 9 connected to a standard WR75 waveguide with square flanges, to be used as a Ku band filter at 13 GHz (FIG. 26). Among different manufacturing techniques for such a metallic component, the selective laser melting (SLM) process was used with AlSi10Mg aluminum alloy, because of its relatively high fabrication speed and low-weight potential. This Aluminum metal 3D printing technique supports fine details as small as 0.5 mm, a minimum wall thickness of 1 mm, a dimensional tolerance of ±0.2 mm, and both matt and glossy finishing. FIGS. 26*a* and 26*b* show pictures of the filter, in which the length of the primary host pipe 5 is 2.5 mm (~λ/10), aiming at a 2% bandwidth, while the full size of the component is 9 mm and the weight is 7.4 g, considering 1 mm for the diameter of pins 9. FIG. 26*c* shows the results of the characterization of the device, which agree well with simulation results.

For a higher-order bandpass filter with sharper roll-off, a PPW with an even larger number of pins 9 was fabricated to create an exemplary wide bandpass filter for the Ku-band (12-18 GHz). The device similar to that of FIG. 4A, is shown in FIG. 27*a* and comprises six pins 9 with a height of 4 mm, inside a metallic box with a waveguide width of 6 mm, and with parameter a=2.5 mm (inter pin distance). The component was fabricated in two parts due to fabrication constraints: a box and a top plate connected with screws. The filter is then excited by extending the central wire of an SMA connector inside the filter, through the top plate. Since a wider pipe is used here (namely W=6 mm) than for the two-pin filter of FIG. 26 (W=2.5 mm), a wider bandwidth is obtained as expected, and also, due to the larger number of pins 9, a sharper roll-off is obtained. As shown in FIG. 27*b*, a passband with sharper roll-off between 13 and 16 GHz (solid black curve) is measured, and a fractional bandwidth of 14%. The fabricated PPW filter has a weight of 11 g and an interior length of 17.5 mm, which is ~0.92, at the center wavelength. This is much smaller and lighter than the length of conventional high-order metal pipe filters, which are typically multiple wavelengths long. The experimental results of the fabricated sample show a good agreement with simulations and support the theoretical investigations. The RF parameters can be further improved by optimizing the position of SMAs and fabricating a completely closed box to reduce dissipations caused by an air gap between the two parts of the system.

The Inventors investigated in detail the effect of increasing the width of the hollow waveguide 5 on the pass and rejection bands using full-wave simulations. As shown in FIG. 28*a*, the frequency spectrum of such PPW filter comprises three main parts of (i) the sub-λ mode (frequency passband FPB), (ii) the rejection band, and (iii) the parasitic passband created by host waveguide modes (the dash-dotted line shows the cut-off behavior of the transmission spectrum through the unloaded metal pipe). Although the unloaded host pipe 5 supports the propagation of its first TE mode above its cut-off frequency $f_c$ at 18 GHz, the rejection band of the filter or device 1 is not limited to 18 GHz and extends above the cut-off frequency $f_c$ up to 32 GHz (solid black line). This enlarged rejection band is due to a stopband or HBG induced by resonant pins 9 enclosed in the waveguide 5. Considering a fixed pin size, the main geometrical parameter that plays a role in shaping the passband and rejection band is the hollow waveguide width W. By increasing the width W, the passband of sub-λ widens, as shown in FIG. 28*b*, affecting also the rejection band.

The passband, rejection band, and host modes band of this ($6^{th}$ order) PPW filter 1 are extracted for different values of waveguide width W (3-15 mm), where pin height $h_r$=4.4 mm is fixed. The map of FIG. 29*a* demonstrates the principal role of Won the engineering the PPW filters 1. FIG. 29*b* shows that by setting the upper cut-off frequency at 15 GHz in this exemplary embodiment, altering the waveguide W from 3 mm to 15 mm results in a bandwidth variation from 3% to 75% at a fixed working frequency, which is a remarkable advantage.

Another feature of the PPW is its compatibility with different host waveguides or pipes, such as rectangular or circular metallic pipes. PPWs are also compatible with hollow pipes, with arbitrary cross-sections, where the bandwidth of each PPWs is determined by the cut-off frequency of the host pipe. For example, a circular PPW, shown in FIG. 30*a*, with a diameter of 8.8 mm (twice the height of the pins), has a passband equal to the passband of a rectangular CPPW with 6 mm width (FIG. 30(*c*)).

The PPW also demonstrates robustness against a distributed disorder in the pin position. Since the response of LRMs strongly depends on the resonance of the inclusions 9 rather than the periodicity, small disorders or offsets in the position of a resonant pin 9 with respect to a foreseen or intended position, or a small disorder or offset of the resonant pin 9 from a foreseen or intended position and with respect to an adjacent resonant pin 9 does not produce a significant change in the PPW transmission spectrum. FIG. 30(*b*) shows a PPW, whose pins 9, along the middle line of the waveguide 5, have random displacements on their lateral position (dy), uniformly distributed between −1 mm to +1 mm. As shown in FIG. 30(*c*), the transmission spectrum has the same passband as the fault-free rectangular and circular PPW. The device with disorders (small changes in positions) operates similarly to a device that is disorder-free. This is equally true in the case where the resonant pins 9 are non-periodically ordered or randomly ordered.

As mentioned previously, a metamaterial port or metamaterial connector 19A, 19B may be used to communicate microwave or millimeter wave signals into and out of the microwave or millimeter wave passive device 1. The metamaterial port or metamaterial connector 19A, 19B previously described is structured based on the previously mentioned first class category of FIG. 10. The advantage of using metamaterial port or metamaterial connector 19A, 19B is now explained in relation with FIGS. 31 to 34.

For compatibility with standard waveguide systems, the narrow PPWs can be connected to standard rectangular ports. One may consider a WR75 (with width $W_2$=19.05 mm) connected to a ($6^{th}$ order) PPW to construct a waveguide filter for the Ku-band downlinks channel used in satellite communications (FIG. 31*a*). To provide the required operating frequency and bandwidth between 10-13 GHz, the Inventors considered $h_r$=5.15 mm, a=2.8 mm, and W=7.4 mm, resulting in a filter with a total length of only 11 mm (0.36λ, where 2=30 mm). Since the mode profile of a PPW waveguide is much narrower than a standard waveguide, the direct connection of the PPW and the WR75 ports produces a low matching efficiency, as can be seen in the $S_{11}$ and $S_{21}$ spectra of FIG. 31*b*. To improve the wave transition, the Inventors used the previously mentioned first class PPW (FIG. 10) to construct the metamaterial port 19A, 19B, where, for example, the WR75 was used as a propagative host medium 5B.

To understand how the transition structure is designed, suppose that a single pin 9B is inserted in a WR75 waveguide, with a height $h_p$ where $2h_p<W_2$, and assume its size is slightly smaller than the size of the pins 9 inside the filter ($h_p<h_r$). This pin 9B resonates in a propagative medium 5B, thus introducing a zero near its resonance frequency $f_p$. This structure, shown in FIG. 32*a*, functions as a notch filter, and the drop point in the transmission spectra can be adjusted by adjusting the height $h_p$ of the pin 9B.

FIG. 32*b* shows the transmission spectra of a hollow waveguide 5B defined by a WR75 structure, loaded by a resonant pin 9B with various height $h_p$ values. In the metamaterial port 19A, 19B, the size of the pin is adjusted to let the wave pass in the passband of the PPW filter 1 and induce a zero in its rejection band. A height of $h_p$=3.5 mm is chosen to make a rejection band around 17 GHz. Furthermore, a 2×2 array of pins 9B was included to realize a passband mode profile that matches the field distribution of the PPW filter, as shown in FIGS. 33*a* and 33*b*. The full size of the structure, including both metamaterial port 19A, 19B, is only 24 mm (0.82), shown in FIG. 33*b*.

The simulation and results of experimental measurements of different samples are shown in FIGS. 34*a* to 34*c*. The filters 3 were fabricated using the same SLM Aluminum metal 3D printing used for the coaxial filter of FIG. 27, and a first fabricated device is shown on the right side of FIG. 34*a*. To reduce the insertion loss, a second silver-plated filter was fabricated, shown on the left side of FIG. 34*a*.

As shown in FIG. 34*b*, the Ku band waveguide filter, with subwavelength metamaterial port 19A, 19B, has a return loss of less than −15 dB in the passband, while it has a high level of rejection and a sharp roll-off at 13.2 GHz. Furthermore, silver plating can be used to reduce the insertion loss below 1 dB, as shown in FIG. 34*c*. The RF specifications of this PPW filter, with a total length of 24 mm (0.8λ), show the PPW to be a high-performance waveguide filter, with high power handling, yet at least one order of magnitude smaller than conventional waveguide filters in this frequency range, which is a remarkable advantage.

As mentioned previously, a metamaterial port or metamaterial connector 19A, 19B may be used to communicate microwave or millimeter wave signals into and out of the microwave or millimeter wave passive device 1.

According to a further aspect of the present disclosure, the present disclosure concerns devices or components 100, 200, 300 structured based on the previously mentioned first class category of FIG. 1D. Such microwave or millimeter wave passive devices or components 100, 200, 300 include the previously described metamaterial port or metamaterial connector 19A, 19B; as well as a port or coupler configured to assure an efficient matching between waveguide parts, or increasing a level of rejection and/or widening the rejection bands. Also included are a notch filter 200 and a bandstop filter 300 based on the previously mentioned first class category of FIG. 1D. FIGS. 24 and 25 respectively show an exemplary notch filter 200 and bandstop filter 300.

The microwave or millimeter wave passive device 100, 200, 300 comprises at least one hollow waveguide 5B configured to support a transverse electric TE mode of microwave or millimeter electromagnetic radiation, the at least one hollow waveguide 5B including a first wall structure 1B and a second wall structure 15B, an interconnecting base or wall 17B extending between the first and second wall structures 11B, 15B, and an enclosure or ceiling EWSB extending between the first and second wall structures 11B, 15B. The enclosure EWSB is located opposite the interconnecting base 17B. The enclosure EWSB and the interconnecting base 17B physically contact the first and second wall structures 11B, 15B to define a host cavity in which a cluster or plurality of coupled resonant structures 9B are located.

The first wall structure 11B, the second wall structure 15B, the interconnecting base 17B and the enclosure or ceiling EWSB may, for example, define a continuous enclosure or surrounding, or a fully closed enclosure or surrounding that enclose or surround the plurality of resonant structures 9B. The continuous enclosure or surrounding, or the fully closed enclosure or surrounding define an inner cavity or chamber in which the plurality of resonant structures 9B is located. The first wall structure 11B, the second wall structure 15B, the interconnecting base 17B and the enclosure or ceiling EWSB may, for example, define a fully laterally closed body.

The continuous or fully enclosed enclosure may, for example, define at least a first opening and/or at least a second opening. The first and second openings are for example configured to receive (or to which is attached), for example, the hollow waveguide 5A and a waveguide flange FL, or respectively a first and second waveguide flange FL.

The plurality of coupled resonant structures 9B is enclosed inside the at least one hollow waveguide 5B. The plurality of coupled resonant structures 9B is configured to provide coupled local resonators LR and at least one frequency stopband FSB or hybridization bandgap HBG.

The plurality of coupled resonant structures 9B is located between the first and second wall structures 11B, 15B, and each resonant structure 9B extends from the interconnecting base 17B into the at least one hollow microwave waveguide 5B to define a subwavelength resonant structure, and the successive resonant structures 9B are separated by a subwavelength distance.

A resonance frequency $f_r$ of the resonant structure 9B is above or greater than a cut-off frequency $f_c$ of the at least one hollow waveguide 5B, and in a frequency range in which the at least one hollow waveguide 5B supports a transverse electric TE mode of microwave or millimeter electromagnetic radiation, for example, a single transverse electric TE mode.

A width W of the at least one hollow waveguide 5B is greater than two-times a height $h_r$ of the resonant structures 9B or of each resonant structure 9B. The coupled local resonant structures 9B may be arranged or grouped in a periodic or aperiodic pattern, or arranged randomly inside the at least one hollow waveguide 5B.

A height $h_r$ of the resonant structures 9B and a distance between resonant structures 9B define a frequency or frequency range at or in which at least one selected microwave or millimeter wave signal is admitted into or transferred out of the microwave or millimeter wave passive device 100, 200, 300.

The device 100, 200, 300 may include connection means configured to connect the microwave or millimeter wave passive device 100, 200, 300 to a further device. The connection means may comprise or consists of a waveguide flange FL. The waveguide flange FL may, for example, include bore holes for attachment to another device or object via screw, or bolts and nuts. The notch filter 200 and bandstop filter 300 (FIGS. 24 and 25) includes connection means on both ends, for example, two flanges FL.

The bandstop filter 300 (FIG. 25) includes a first hollow waveguide 5B1 and a second hollow waveguide 5B2 connected together and having different waveguide widths. The arrangement of the resonant structures 9B1, 9B2 may also be different in each of the first and second hollow waveguides 5B1, 5B2.

Further details of the microwave or millimeter wave passive devices or components 100, 200, 300 have been previously described in relation to the previously described metamaterial port or metamaterial connector 19A, 19B, and in relation to the previously mentioned first class category of FIG. 1D.

As explained previously, the arrangement pattern, the number thereof and the height and diameter of the resonant structures 9B are set in order to define a predetermined filtering profile for the device 19, 100, 200, 300 and/or in view of the desired characteristics device to which it is to be connected.

Based on the above disclosed filtering technique of the microwave or millimeter wave passive devices or components, different types of diplexers such as T-junction or Y-junction can be designed using, for example, metallic walls or band gaps materials.

FIGS. 10 to 12 show different exemplary diplexers 27, 41.

FIG. 10 show a microwave passive component or device 1 that is an exemplary Y-junction diplexer 27. In the microwave passive component 1 or diplexer 27, the microwave waveguide 5 includes the first and second walls 11, 15 as well as a third wall structure 29 extending in the guiding direction GD. The interconnecting wall structure 17 extends, for example, between the first 11, second 15 and third wall structures 29. The enclosure or ceiling EWS is not shown for the purpose of illustrating the other elements of the diplexer.

In the exemplary diplexers 27 of FIGS. 10, the array 7 comprises or consists of a first sub-array 31 of resonant structures 9, a second sub-array 33 of resonant structures 9 and a third sub-array 35 of resonant structures 9 extending inside the hollow waveguide 5. The extension of subarrays in the device 27 is shown by a dashed line. In the exemplary example of FIG. 10, the first subarray 31 extends in the guiding direction GD before splitting or dividing to form the second and third subarrays 33, 35.

The first sub-array 31 is located, at least partially, between the first and second wall structures 11, 15. The second sub-array 33 is located between the first and third wall structures 11, 29 and the third sub-array 35 is located between the second and third wall structures 15, 29.

A distance or separation $ds_1$ between the first and second wall structures 11, 15 is greater than a distance or separation $ds_2$ between the first and third wall structures 11, 29 and/or a distance or separation $ds_3$ between the second and third wall structures 15, 29. The distance or separation $ds_2$ may be the (substantially) the same as, or different to the distance or separation $ds_3$. As a result, the bandwidth of the first sub-array 31 of resonant structures 9 is different to the bandwidth of the second sub-array 33 and the third subarray 35 of resonant structures 9. The bandwidth of the second sub-array 33 and the third subarray 35 of resonant structures 9 may be (substantially) the same or different.

The first sub-array 31, the second sub-array 33 and the third subarray 35 of resonant structures 9 are each configured to define different local resonator LR resonance frequencies $f_r$ and/or frequency passbands FPB with different cut-off frequencies or roll-off frequencies. The resonance frequency $f_r$ of the local resonator of each sub-array is defined, for example, by defining a different height $h_1$, $h_2$, $h_3$ for the resonant structures 9 of each sub-array so that each sub-array defines a different resonant frequency $f_r$. The second sub-array 33 and the third subarray 35 of resonant structures 9 define two narrowband channels relative to the wideband channel defined by the first subarray 31 of resonant structures 9.

The two narrowband channels can transfer or pass signals of different frequencies there through in view of the different frequency passbands defined by the different resonance frequencies $f_r$ of the resonant structures 9 of the second and third sub-arrays 33, 35 (resonant structures 9 of different heights).

The first, second and third sub-arrays 31, 33, 35 define first, second and third ports or channels of the diplexer 27. The first port can be, for example, an input port or channel and the second and third ports can be, for example, output ports or channels. Alternatively, the first port can be, for example, an output port or channel and the second and third ports can be, for example, input ports or channels.

The first, second and third wall structures 11, 15, 29 comprise or consist of continuous or planar metallic walls defining a non-planar or planar surface as shown, for example, in FIG. 10 and previously described above in relation to the filter device 3.

The diplexer 27 may include first, second and third terminals or probes 19 such as those mentioned previously. The first and second subarrays 31, 33 are located, at least partially, between the first 19A and second 19B terminals or probes. The first and third subarrays 31, 35 are located between the first 19A and third 19C terminals or probes.

Metamaterial ports or connectors previously described may alternatively be used or used instead of the coaxial ports 19A, 19B, 19C shown in FIG. 10. In such a case, the metamaterial ports are connected and coupled via openings in the lateral walls LW of the diplexer 27.

It is noted that optionally the diplexer 27 including wall structures 11, 15, 29 may additionally comprise a resonant metamaterial included between the wall structures 11, 15, 29 and the array 7.

The Inventors have thus designed an exemplary Y junction diplexer 27, using the narrowband and wideband filters, designed or disclosed previously. In FIG. 10, by employing the metallic walls 11, 15 in a relatively large distance from the resonators, a wideband filter is created, for example, as an input port. Two narrowband channels with different resonance frequencies or frequency passbands are separated from the Y-junction to, for example, the output ports.

The present disclosure also concerns another exemplary microwave passive component 1 that is a T-junction diplexer 41. FIGS. 11 and 12A shows exemplary T-junction diplexers 41.

In the microwave passive component 1 or diplexer 41, the hollow waveguide 5 includes the first and second walls 11, 15 as well as a third 43, fourth 45 and fifth 47 wall structures. The interconnecting wall structure 17 extends, for example, between the first 11, second 15, third 43, fourth 45 and fifth 47 wall structures. The enclosure wall or ceiling EWS is not shown for the purposes of illustrating the other elements of the diplexer 41.

The array 7 comprises or consists of a first sub-array 51 of resonant structures 9, a second sub-array 53 of resonant structures 9 and a third sub-array 55 of resonant structures 9 extending inside the microwave waveguide 5.

The first sub-array 51 is located between the first 11 and second 15 wall structures. The second sub-array 53 is located between the third 43 and fifth 47 wall structures. The third sub-array 55 is located between the fourth 45 and fifth 55 wall structures.

The second and third sub-arrays 53, 55 extend (substantially) perpendicular to the first sub-array 51 inside the waveguide 5. The second and third sub-arrays 53, 55 extending parallel to each other and in an aligned or linear manner with respect to each other inside the waveguide 5.

A separation or width $W_1$ between the first and second wall structures 11, 15 is greater than a separation or width $W_2$ between the third 43 and fifth 47 wall structures and/or the fourth 45 and fifth 55 wall structures.

The first sub-array 51, the second sub-array 53 and the third subarray 55 of resonant structures 9 are configured to define different resonance frequencies $f_r$ and/or frequency passbands FPB with different cut-off frequencies or roll-off frequencies. As previously mentioned, the resonance frequency $f_r$ of the local resonator of each sub-array is defined, for example, by defining a different height h for the resonant structures 9 of each sub-array so that each sub-array defines a different resonant frequency $f_r$.

A wideband filter is created as a first port and two narrowband channels with different resonance frequencies are provided as second and third ports. The first 51, second 53 and third 55 sub-arrays define first, second and third ports.

The first port is, for example, an input port or channel and the second and third ports are, for example, output ports or channels. Alternatively, the second and third ports are, for example, input ports or channels and the first port is, for example, an output port or channel.

The first 11, second 15, third 43, fourth 45 and fifth 47 wall structures comprise or consist of continuous or planar metallic walls as shown for example in FIG. 12A.

The T-junction diplexer 41 may also include first 19A, second 19B and third 19C terminals or probes. The first 51 and second 53 subarrays are located between the first 19A and second 19B terminals or probes and the first 51 and third 55 subarrays are located between the first 19A and third 19C terminals or probes. Similar to the Y junction, some sorts of T junction and manifold models can be designed based on the technique developed by the Inventors. As one example, the structure of a designed T-junction diplexer based on LRWs whose bandwidths are adjusted by the widths of the waveguides is depicted in FIG. 12A. In this structure, the large value of $W_1$ causes the wideband filter, which supports a wide frequency range, consists of uplink and downlink channels 53, 55. On the other hand, the small value of $W_2$ results in two narrowband filters, whose frequency ranges or frequency passbands are determined by the length of the wires 9 in these two channels 53, 55. The $S_{11}$, $S_{21}$, and $S_{31}$ spectra of this structure after some initial optimization of some geometrical parameters, such as D (the width of the aperture between the wall structures 43, 45), are shown in FIG. 12B.

FIG. 11 shows an alternative T-junction diplexer 41 similar to that of FIG. 12A but in which metamaterial ports 19A, 19B, 19C or connectors previously described are included instead of the coaxial ports 19A, 19B, 19C shown in FIG. 12A.

A duplexer may be realized on the same basis as the above-described diplexer 41.

Based on the physics of the LRWs, a chain 7 of resonant wires 9 embedded in a narrow channel can be used as a narrowband filter, as a basic element for implementing the diplexer and multiplexers. Since the propagating wave in this filter is localized around the wires 9, strong isolation between channels can be obtained even for adjacent waveguides. Resonant channels with different resonance frequencies $f_r$ can form a multiplexer.

FIGS. 13A to 13D and FIGS. 15A and 15B show exemplary multiplexers or demultiplexers 59. The same general device structure is used for a multiplexer and a demultiplexer, in the case of a multiplexer there are more input channels than output channels, and in the case of a demultiplexer there are more output channels than input channels.

As can be seen, for example, in FIG. 13A, the multiplexer 59 or microwave waveguide 5 includes a plurality of wall structures 61, (61A, 61B, 61C, 61D, 61E, 61F, 61G, 61H, 61I, 61J, 61K, 61L). The interconnecting wall structure 17 may, for example, extend between the plurality of wall structures. The enclosure wall or ceiling EWS is not shown in FIG. 13A for the purposes of illustrating the other elements.

A plurality of arrays 7A, 7B, 7C, 7D, 7E, 7F of resonant structures 9 extend inside the microwave waveguide 5. Each array 7A, 7B, 7C, 7D, 7E, 7F is located between two wall structures 61A, 61B, 61C, 61D, 61E, 61F, 61G, 61H, 61I, 61J, 61K, 61L. For example, array 7A is enclosed by the first wall structure 61B and the second wall structure 61C.

Each array 7A, 7B, 7C, 7D, 7E, 7F of resonant structures 9 is configured to define different resonance frequencies $f_0$ and/or frequency passbands FPB with different cut-off frequencies or roll-off frequencies. As previously mentioned, the resonance frequency $f_r$ of the local resonator of each array can be defined, for example, by defining a different height h for the resonant structures 9 of each array so that each array defines a different resonant frequency $f_r$.

FIG. 13A shows an exemplary non-limiting embodiment comprising six arrays of resonant structures 9. However, more than 6 channels or less than six channels (at least three may be present). The diameter of the device 59 indicated in FIG. 13A is a non-limiting exemplary diameter to give an indication of the small size of these devices.

Each array 7A, 7B, 7C, 7D, 7E, 7F of resonant structures 9 defines, for example, input ports or channels. The input ports or channels share a central or output port CP. Alternatively, each array 7A, 7B, 7C, 7D, 7E, 7F defines output ports or channels in the case where the multiplexer operates as a demultiplexer, the central port CP being an input port.

The wall structures 61A, 61B, 61C, 61D, 61E, 61F, 61G, 61H, 61I, 61J, 61K, 61L comprise or consist of, for example, continuous or planar metallic walls defining a non-planar or planar surface as shown, for example, in FIG. 13A.

The multiplexer 59 includes a plurality of terminals or probes 19. Each array 7A, 7B, 7C, 7D, 7E, 7F is located between a first and second terminals or probes 19. For example, the first array 7A is located between a first terminal 19A and a second terminal 19SH, the second array 7B is located between a second terminal 19B and a second terminal 19SH. Each array has or shares a common terminal or probe 19SH. The terminals 19 are, for example, provided through the interconnecting wall structure 17 and/or the enclosure wall or ceiling EWS.

The multiplexer 59 of FIGS. 13A and 13B includes an additional outer lateral wall LW enclosing the resonant metamaterial and arrays 7 and the other elements mentioned above. The lateral wall defines an exemplary and non-limiting circular shape, but other shapes are also possible.

The multiplexer 59 of FIGS. 13A and 13B defines a non-limiting and exemplary overall cylindrical shape with a circular cross section. However, other shapes and cross-sections are also possible.

The wall structures comprise or consist, for example, of continuous or planar metallic walls (see for example, FIG. 13A). The walls can thus be realized using metallic sheets or planes as for example shown in FIG. 13A.

The exemplary structure of the disclosed multiplexer/demultiplexer (MUX/DeMUX) is composed of a coaxial port in the center of a closed metallic cylinder, and six coaxial ports at the end of the channels, separated by 60° angles (FIG. 13A). To realize a bandpass filter in each channel, the walls are, for example, included on both sides of the pins 9, while the distance of the walls from the pins 9 determines the bandwidth of each channel.

Metallic walls optionally with adjustable distance from the resonant pins 9 can be utilized (see, for example, FIG. 13A). The transmission spectra of the six coaxial, relative to the middle port 19SH as an input ($S_{k1}$), and for the device 1 of FIG. 13A are shown in FIG. 13E.

Thus, some resonant channels 7A, 7B, 7C, 7D, 7E, 7F, with different resonance frequencies (size of wires 9) in a compact structure shown in FIG. 13B, is disclosed herein as a six-channel multiplexer 59. Since the bandgap of this artificial material is induced by the resonance frequency of the wires 9 rather than periodicity, it is robust against disorder in the position of the wires 9 and it can be realized even by randomly positioned wires.

FIG. 13F shows an alternative embodiment of a multiplexer 59 like that of FIG. 13A but in which wall structures 61A, 61B, 61C, 61D, 61E, 61F comprise or consist of a resonant metamaterial (artificial walls). The resonant metamaterial may thus comprise or consist of a plurality or bed of elongated conductive bodies 25 defining microwave subwavelength elongated conductive bodies. The resonant metamaterial of the wall structures 61A, 61B, 61C, 61D, 61E, 61F is (fully) enclosed by the outer lateral wall LW which also encloses the plurality of arrays 7. The lateral wall LW defines an exemplary and non-limiting circular shape, but other shapes are also possible. Like FIG. 13A, FIG. 13F shows the multiplexer 59 without the upper enclosure (shown in FIGS. 13B and 13C for example).

The elongated conductive bodies 25 extend in the same direction as the resonant structures 9. The exemplary wall structures 61A, 61B, 61C, 61D, 61E, 61F comprise or consist of a bed of elongated conductive bodies 25 grouped between two arrays 7. The elongated conductive bodies 25 may, for example be randomly or orderly positioned in a group or bed.

The frequency distinction of the channels defined by each array 7 is another main important parameter. The height of the pin 9 controls or defines the frequency distinction. One significant impact on the output spectra of the channels is the height differences (δh) of the pins in the different channels or arrays 7 and can be used to determine the frequency distinction of the passbands of each array or channel 7.

For example, by setting the height of the pins 9 in a first channel 7 to $h_1$, the height of other channels 7 is obtained by $h_k = h_i + k \cdot \delta h$ (k=1, . . . , 5), where δh is the height difference. The smaller δh, provides the six channels with lower frequency distinction. FIGS. 14A and 14B show the output of the channels 7 with two values of δh=0.3 mm δh=0.5 mm.

The channels defined by each array 7 can be determined by setting a different pin height (or resonant frequency $f_r$) for each array 7. A bandwidth of each channel can be adjusted for each array 7 via the inter-wall distance of the walls from the pins 9.

FIGS. 15A and 15B disclosure an exemplary multiplexer/demultiplexer that is an exemplary four-port multiplexer comprising an input metamaterial port 19A and three output metamaterial ports 19B, 19C, 19D, thus forming an exemplary triplexer for use as a demultiplexer. The array 7A defines an input channel and arrays 7B, 7C, 7D output channels. In the case where there are more input channels than output channels, the device operates as a multiplexer. The same general device structure is used for a multiplexer and a demultiplexer.

FIG. 15 shows a cross-sectional schematic of an alternative multiplexer/demultiplexer 59 in which metamaterial ports 19A, 19B, 19C or connectors previously described are included instead of the coaxial ports 19A, 19B, 19C shown in FIG. 12A. A resonant junction RJ couples the electromagnetic waves into the different channels 7A, 7B, 7C, 7D. The resonant junction RJ can be formed in an ultra-small volume. The resonant junction RJ may, for example, be formed by inserting one or a small number of resonant elements or pins 9 configured to match input and output channels, that is, assuring a matching between an input signal and an output channel at a specific frequency and transfer of signal therebetween with minimum loss or reflection.

While diplexer and multiplexer/demultiplexer devices have been described above, other microwave or millimeter wave devices can be provided by the filtering principle of the present disclosure. FIGS. 17 to 23 show other such exemplary devices or components.

FIGS. 17A and 17B show a device 401 comprising or consisting of a monolithic antenna feed and a bandpass filter. The bandpass filter includes a first metamaterial port or connector 194 for connection to another waveguide. The bandpass filter includes a second metamaterial port or connector 19B connected to the antenna 403. The bandpass filter functions in the same manner as the bandpass filter of FIG. 9A.

FIGS. 18A and 18B show a device 501 comprising or consisting of a monolithic antenna feed and duplexer. The device 501 has a similar structure to the diplexer of FIG. 1I but including metamaterial port or connector 19C connected to the antenna 503. The filters are configured to pass signals of different frequencies in the channels CH1, CH2 between the metamaterial ports or connectors and the antenna.

FIG. 19 shows an exemplary power divider 601 that is a compact reflection less power divider.

FIG. 20 shows an orthogonal Mode Transducer (OMT) including metamaterial ports.

FIGS. 21A and 21B show a dual-band filter including metamaterial ports 19A, 19B.

FIGS. 22A and 22B show a compact H-bend filter 901. The compact reflection less H-bend filter is based on the PPW filter structure and uses metamaterial ports 19A, 19B for inputting and outputting the microwave or millimeter wave signal.

As previously mentioned, the hollow waveguide 5 of PPW may have a circular cross-section or other arbitrary cross-sectional shapes. The hollow waveguide 5 also allows the realization of small structures with a twist, curvatures, branches, or sharp bends. The PPW with an arbitrary cross-section can be constructed with a straight pipe, with a twisted pipe, with a bend, or one or more branches, as shown in FIGS. 23A to 23D. FIG. 23A shows the waveguide 5 having an arbitrary-cross-sectional shape. FIG. 23B shows the waveguide 5 twisted and the array of resonant structures 9 are gradually inclined along a guiding direction of the waveguide 5. FIG. 23C shows the waveguide 5 having a sharp bend. FIG. 23D shows an exemplary microwave component or device including a resonant junction RJ and multiple branches BH.

The second class of pin-pipe waveguides (FIG. 1E) can be employed to realize many different devices and to realize narrow or wide passbands in different passive devices, with customizable operating frequency and bandwidth. IT is possible to realize ultra-small waveguides, bandpass filters, low pass filters, dual and multiband filters, tunable/reconfigurable filters, duplexers, multiplexers, monolithic antenna feeds, power dividers, devices with compact bends, polarizers and ortho-mode transducers.

Using the PPW technique of the present disclosure, multiple different microwave or millimeter wave devices can be realized such as a bandpass filter (BPF) with coaxial ports, a BPF with standard waveguide ports, a Low pass filter (LPF) with coaxial or standard waveguide port, an Antenna feed with PPW BP filter, a multiplexer with coaxial and standard waveguide ports, a duplexer with standard port, an integrated with horn antenna, a duplexer with coaxial port, a waveguide E-Bend and H-Bend, Dual-Band Filters, Power divider, Cylindrical PPWs, Orthomode transducer (OMT), Polarizer, Low Pass filter, Notch filter and a Band Stop filter. Some of these components have been depicted in the Figures.

It should be noted that the sizes or dimensions of the microwave components or devices 1 disclosed herein are exemplary sizes. A smaller microwave component or device 1 footprint can be provided. It is possible to decrease the size of all these devices by scaling them down. This can be achieved, for example, by using more advanced 3D-printing techniques and/or by including smaller SMA ports. In all types of the disclosed waveguide components 1, while the height of the device 1 is determined by, for example, the quarter of an operating wavelength, the length and width of the proposed components 1 are specified by the diameter and periodicity of the metallic rods 9.

Since the mechanism of wave manipulation is decoupled from the periodicity (see, for example, FIG. 35) and the diameters of the pins 9, these resonant crystals or elements could be shrunk down, if the fabrication process allows. According to the minimum exemplary thickness of 1 mm (diameters of the pins 9) of the 3D metal printing service, typically used for the investigated exemplary devices 1, the exemplary diameter of 1 mm and exemplary periodicity of 2.5 mm was implemented. Higher resolution is possible and the Inventors have recently produced devices comprising pins 9 having diameters of 0.5 mm. An improved additive manufacturing process and the achievement of smaller thicknesses and diameters will assure that a smaller distance between the pins 9 can be obtained and accordingly the smaller footprint can be achieved.

Moreover, in some of the designed and fabricated devices 1, the whole sizes of components have also been limited by the size of the available coaxial SMA in the market, which needs enough space for connecting to the components. Therefore, by using smaller SMAs, the entire size of the components 1 can be reduced.

As mentioned previously, the terminals or ports 19 of the microwave components or devices 1 of the present disclosure may comprise or consist of a waveguide, for example, a rectangular waveguide. The type of ports can be, for example, implemented by coaxial or waveguide transition. While the Inventors found that the best matching of the coaxial transition can be achieved by adjusting the size and position of the coaxial ports, the Inventors have also considered some different types of waveguide transitions to obtain an improved matching efficiency.

The Inventors propose two exemplary approaches or methods to connect the small closed metallic box of the miniaturized filters 3 to conventional waveguides. The first method, shown in FIGS. 16A and 16B, is obtained by connection of a waveguide (for example rectangular) with the same size as a conventional waveguide (such as for example WR75 for Ku band) on both sides of locally resonant metamaterial waveguide (LRMW) filter 3.

The minimum length of these two parts (SL) at both sides could be, for example, around 2.5 mm. Besides, to obtain an improved return loss, the array of resonant pins 9 can extend into both larger waveguides (WR75). This technique enhances the mode coupling and improves the matching efficiency. The second method uses a (loop shape) wire in the rectangular waveguides (WR75) and coupling of the electromagnetic energy from a slot or opening (for example on the top) to the LRMW filter 3, such as via a coaxial probe (FIGS. 16C and 16D).

These types of transitions can similarly be applied to the other devices 1, for example, for the proposed MUX/DeMUX 59. While the coupling from the slot on top of the structure (FIG. 16C) would be used for the middle port, the first transition method (FIG. 16A) could be applied for the other six ports.

The microwave passive components or devices 1 of the present disclosures provide at least the following advantages:

The compactness of the structure, in comparison with all types of waveguide filters proposed in the prior art and also with what the Inventors have designed at LWE, is a main advantage. The described narrowband waveguide filter, for example at Ku-band, has a length of around 2 cm. Considering enough space for connecting the customary coaxial ports, the whole filter 3 would be realized with a length of 3.3 cm. The diplexers 27 and multiplexers 59 are also designed in a volume, considerably smaller than regular components conventionally used in satellite systems. As can be seen in FIG. 13A, the whole six-port multiplexer is designed within a box with a side of 4.8 cm. The metallic cylinder has a depth of 1.5 mm is shown. One sample of the designed diplexers 27, for splitting two channels at 13 and 14 GHz, is depicted in FIG. 12A, which has similarly a very small width $W_1$ around of 3.7 cm.

The simple custom design framework of this new technology is another significant aspect of this disclosure. The resonance frequency, i.e. the cut-off frequency of the filter (stopband), is simply determined by the length of the pins/wires 9. In addition, the bandwidth of the filter 3 directly depends on the width of the rectangular box 5, used as surrounding walls of resonant wires 9. This simplicity promises a customizable band pass filter. One can simply design a filter for any desired range of frequency, bandwidth, and RF interconnections (customizability).

The tunability of the bandwidth in the microwave filter 3 by using movable walls is promising a novel technique, can improve the field of reconfigurable filters, interestingly based on the waveguide technology. The bandwidth can be tuned independently of the working frequency. This tunability can be obtained manually or electrically.

The less intrinsic loss of the disclosed microwave components is another feature that distinguishes this device and method from the conventional metamaterial filters 3 in the prior art. Known small narrowband metamaterial filters, based on split-ring resonators (SRR) on microstrip lines or substrate integrated waveguides (SIWs) are typically very sensitive to dielectric loss, which limits their application in high-power satellite communications or radar systems. For example, by using low loss aluminum alloy, the small fabricated filters show a considerably low insertion loss that can be further reduced by silver plating High order bandpass filters can be realized, not like in traditional filters by cascading the bulky cavities at the cost of size, but simply by increasing the number of pins/wires, without low sensitivity on their periodicity, diameter, or position. By increasing the number of wires, improved frequency selection and steep roll-off can be obtained. A 1D chain of 6 quarter wires wavelength, with the entire length of 2 cm, provides an acceptable frequency selection.

High level of rejection in the stopband, realized by the hybridization bandgap of resonant meta material 9, is another feature of the proposed approach. Besides the bandpass filter, improved compact and customizable bandstop filter and multi bandstop filter can be designed using the proposed method in this disclosure relying on the effect of HBG.

High level of isolation in the diplexers and multiplexers can be promisingly obtained, due to the improved rejection in stopbands of the filters, which stem from the hybridization bandgap. Low crosstalk between adjacent channels of multiplexers, caused by the small mode volume of the propagating wave around the wires, is another result of using the locally resonant metamaterials.

The additive manufacturing technique[55] used for fabrication of the devices 1 such as the selective laser melting of lightweight and low loss material (AlSi10Mg), promises a low price fabrication of any complex and miniaturized structure. Here, this method of manufacturing overcomes the traditional restriction for the fabrication of the electrical resonant inclusions at microwave frequencies.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments and be given the broadest reasonable interpretation in accordance with the language of the appended claims. The features of any one of the above-described embodiments may be included in any other embodiment described herein.

REFERENCES

[1] David M. Pozar, *Microwave Engineering,* 4th ed. 1998.
[2] V. E. Boria and B. Gimeno, "Waveguide filters for satellites," *IEEE Microw. Mag.*, vol. 8, no. 5, pp. 60-70, 2007.
[3] R. Coirault, S. J. Feltham, G. Gatti, M. Guglielmi, and D. Perring, "Overview of Microwave Components Activities at the European Space Agency," *IEEE Trans. Microw. Theory Tech.*, vol. 40, no. 6, pp. 1150-1158, 1992.
[4] C. Kudsia, R. Cameron, and W. Tang, "Innovations in Microwave Filters and Multiplexing Networks for Communications Satellite Systems," *IEE Trans. Microw. theory Tech. Trans. Microw. theory Tech.*, vol. 40, no. 6, 1992.
[5] "Cubesat." [Online]. Available: https://www.cubesat.org/.
[6] J. Chin et al., "CubeSat 101: Basic Concepts and Processes for First-Time CubeSat Developers," 2017.
[7] P. Sarasa, P. Mader, K. Tossou, P. Lepeltier, and A. Space, "Comparative Study of the Power Handling Capability of Space Broadband Antenna Filters in Ku-band 5," 2005.
[8] O. A. Peverini et al., "Enhanced topology of E-plane resonators for high-power satellite applications," *IEEE Trans. Microw. Theory Tech.*, vol. 63, no. 10, pp. 3361-3373, 2015.
[9] G. F. Craven and C. K. Mok, "The Design of Evanescent Mode Waveguide Bandpass Filters for a Prescribed Insertion Loss Characteristic," *IEEE Trans. Microw. Theory Tech.*, vol. 19, no. 3, pp. 295-308, 1971.
[10] S. Bastioli and R. V. Snyder, "Evanescent mode filters using strongly-coupled resonator pairs," *IEEE MTT-S Int. Microw. Symp. Dig.*, pp. 1-3, 2013.
[11] A. Pons-Abenza et al., "Design and Implementation of Evanescent Mode Waveguide Filters Using Dielectrics and Additive Manufacturing Techniques," vol. XX, no. X, pp. 1-9, 2019.
[12] A. Ghadiya, S. Soni, and K. Trivedi, "Q-band cross-coupled dielectric resonator filter using TM mode for satellite application," *Int. J. Microw. Wirel. Technol.*, vol. 10, no. 2, pp. 235-241, 2018.
[13] D. Peroulis, E. Naglich, M. Sinani, and M. Hickle, "Tuned to resonance: Transfer-function-adaptive filters in evanescent-mode cavity-resonator technology," *IEEE Microw. Mag.*, vol. 15, no. 5, pp. 55-69, 2014.
[14] T. Skaik and M. Abuhussain, "Design of diplexers for E-Band Communication systems," *Mediterr. Microw. Symp.*, no. c, pp. 1-4, 2013.
[15] F. Teberio et al., "Compact broadband waveguide diplexer for satellite applications," *IEEE MTT-S Int. Microw. Symp. Dig.*, vol. 2016-Augus, no. 1, pp. 2-5, 2016.
[16] M. Rezaee and A. R. Attari, "A Compact Substrate Integrated Waveguide Diplexer Using Dual Mode Resonator as a Junction for System in Package Applications," *Electromagnetics*, vol. 37, no. 2, pp. 92-105, 2017.
[17] A. Vosoogh, M. S. Sorkherizi, A. U. Zaman, J. Yang, and A. A. Kishk, "An E-band Antenna-diplexer Compact Integrated Solution Based on Gap Waveguide Technology," pp. 2-3, 2017.
[18] S. Moon, H. H. Sigmarsson, H. Joshi, and W. J. Chappell, "Substrate integrated evanescent-mode cavity filter with a 3.5 to 1 tuning ratio," *IEEE Microw. Wire!. Components Lett.*, vol. 20, no. 8, pp. 450-452, 2010.
[19] C. Arnold, J. Parlebas, and T. Zwick, "Reconfigurable waveguide filter with variable bandwidth and center frequency," *IEEE Trans. Microw. Theory Tech.*, vol. 62, no. 8, pp. 1663-1670, 2014.
[20] R. Gomez-Garcia, J. M. Munoz-Ferreras, and D. Psychogiou, "Fully-reconfigurable bandpass filter with static couplings and intrinsic-switching capabilities," *IEEE MTT-S Int. Microw. Symp. Dig.*, pp. 914-917, 2017.
[21] E. J. Naglich, J. Lee, D. Peroulis, and W. J. Chappell, "High-Q tunable bandstop filters with adaptable bandwidth and pole allocation," *IEEE MTT-S Int. Microw. Symp. Dig.*, pp. 1-4, 2011.
[22] E. J. Naglich, J. Lee, and D. Peroulis, "Tunable bandstop filter with a 17-to-1 upper passband," *IEEE MTT-S Int. Microw. Symp. Dig.*, pp. 1-3, 2012.

[23] H. Joshi, H. H. Sigmarsson, S. Moon, D. Peroulis, and W. J. Chappell, "Tunable high Q narrow-band triplexer," *IEEE MTT-S Int. Microw. Symp. Dig.*, pp. 1477-1480, 2009.

[24] "Small satellite markrt." [Online]. Available: https://www.fortunebusinessinsights.com/ind ustry-reports/small-satellite-market-101917.

[25] E. Alfonso, A. U. Zaman, E. Pucci, and P.-S. Kildal, "Gap waveguide components for millimetre-wave systems: Couplers, filters, antennas, MMIC packaging," in *Antennas and Propagation* (*ISAP*), 2012 *International Symposium on,* 2012, pp. 243-246.

[26] A. Vosoogh, M. S. Sorkherizi, A. U. Zaman, J. Yang, and A. A. Kishk, "Diplexer integration into a ka-band high-gain gap waveguide corporate-fed slot array antenna," 2017 *IEEE Antennas Propag. Soc. Int. Symp. Proc.*, vol. 2017-Janua, pp. 2667-2668, 2017.

[27] F. Teberio et al., "Compact broadband waveguide diplexer for satellite applications," *IEEE MTT-S Int. Microw. Symp. Dig.*, vol. 2016-Augus, no. 1, pp. 2-5, 2016.

[28] J. T. Shen, P. B. Catrysse, and S. Fan, "Mechanism for designing metallic metamaterials with a high index of refraction," *Phys. Rev. Lett.*, vol. 94, no. 19, pp. 1-4, 2005.

[29] X. Wei, H. Shi, X. Dong, Y. Lu, and C. Du, "A high refractive index metamaterial at visible frequencies formed by stacked cut-wire plasmonic structures," *Appl. Phys. Lett.*, vol. 97, no. 1, pp. 1-4, 2010.

[30] M. Choi et al., "A terahertz metamaterial with unnaturally high refractive index," *Nature*, vol. 470, no. 7334, pp. 369-373, 2011.

[31] A. Ourir, G. Lerosey, F. Lemoult, M. Fink, and J. De Rosny, "Far field subwavelength imaging of magnetic patterns," *Appl. Phys. Lett.*, vol. 101, no. 11, 2012.

[32] F. Lemoult, M. Fink, and G. Lerosey, "Revisiting the wire medium: An ideal resonant metalens," *Waves in Random and Complex Media*, vol. 21, no. 4, pp. 591-613, 2011.

[33] J. B. Pendry, "Negative refraction makes a perfect lens," *Phys. Rev. Lett.*, vol. 85, no. 18, pp. 3966-3969, 2000.

[34] D. Lu and Z. Liu, "Hyperlenses and metalenses for far-field super-resolution imaging," *Nat. Commun.*, vol. 3, pp. 1-9, 2012.

[35] A. Alù, A. Salandrino, and N. Engheta, "Negative effective permeability and left-handed materials at optical frequencies," *Opt. Express*, vol. 14, no. 4, p. 1557, 2006.

[36] A. Ishikawa and T. Tanaka, "Negative magnetic permeability of split ring resonators in the visible light region," *Opt. Commun.*, vol. 258, no. 2, pp. 300-305, 2006.

[37] A. Ishikawa, S. Zhang, D. A. Genov, G. Bartal, and X. Zhang, "Deep subwavelength terahertz wavegu ides using gap magnetic plasmon," *Phys. Rev. Lett.*, vol. 102, no. 4, pp. 5-8, 2009.

[38] J. Valentine et al., "Three-dimensional optical metamaterial with a negative refractive index," *Nature*, vol. 455, no. 7211, pp. 376-379, 2008.

[39] R. Marques, F. Martin, and M. Sorolla, "Metamaterials with Negative Parameters: Theory, Design, and Microwave Applications," *Metamaterials with Negat. Parameters Theory, Des. Microw. Appl.*, pp. 1-315, 2007.

[40] M. Gil, J. Bonache, and F. Martin, "Metamaterial filters: A review," *Metamaterials*, vol. 2, no. 4, pp. 186-197, 2008.

[41] J. Garcia-Garcia et al., "Microwave filters with improved stopband based on sub-wavelength resonators," *IEEE Trans. Microw. Theory Tech.*, vol. 53, no. 6 II, pp. 1997-2004, 2005.

[42] F. Martin, J. Bonache, F. Falcone, M. Sorolla, and R. Marques, "Split ring resonator-based left-handed coplanar waveguide," *Appl. Phys. Lett.*, vol. 83, no. 22, pp. 4652-4654, 2003.

[43] F. Lemoult, N. Kaina, M. Fink, and G. Lerosey, "Wave propagation control at the deep subwavelength scale in metamaterials," *Nat. Phys.*, vol. 9, no. 1, pp. 55-60, 2013.

[44] N. Kaina, F. Lemoult, M. Fink, and G. Lerosey, "Ultra small mode volume defect cavities in spatially ordered and disordered metamaterials," *Appl. Phys. Lett.*, vol. 102, no. 14, 2013.

[45] N. Kaina, A. Causier, Y. Bourlier, M. Fink, T. Berthelot, and G. Lerosey, "Slow waves in locally resonant metamaterials line defect waveguides," *Sci. Rep.*, vol. 7, no. 1, pp. 1-11, 2017.

[46] F. Lemoult, N. Kaina, M. Fink, and G. Lerosey, "subwavelength scale in metamaterials," *Nat. Phys.*, vol. 9, no. 1, pp. 55-60, 2012.

[47] N. Kaina, A. Causier, Y. Bourlier, M. Fink, T. Berthelot, and G. Lerosey, "Slow waves in locally resonant metamaterials line defect waveguides," *Sci. Rep.*, vol. 7, no. 1, p. 15105, December. 2017.

[48] S. G. Johnson, S. Fan, P. R. Villeneuve, J. D. Joannopoulos, and L. A. Kolodziejski, "Guided modes in photonic crystal slabs," *Phys. Rev. B*, vol. 60, no. 8, pp. 5751-5758, 1999.

[49] F. Lemoult, N. Kaina, M. Fink, and G. Lerosey, "Wave propagation control at the deep subwavelength scale in metamaterials," *Nat. Phys.*, vol. 9, no. 1, pp. 55-60, 2013.

[50] N. Kaina, F. Lemoult, M. Fink, and G. Lerosey, "Ultra small mode volume defect cavities in spatially ordered and disordered metamaterials," *Appl. Phys. Lett.*, vol. 102, no. 14, pp. 1-4, 2013.

[51] B. Orazbayev, N. Kaina, and R. Fleury, "Chiral Waveguides for Robust Waveguiding at the Deep Subwavelength Scale," *Phys. Rev. Appl.*, vol. 10, no. 5, p. 1, 2018.

[52] T. Ma and G. Shvets, "All-Si valley-hall photonic topological insulator," 2016 *Conf. Lasers Electro-Optics*, CLEO 2016, 2016.

[53] S. Yves, R. Fleury, F. Lemoult, M. Fink, and G. Lerosey, "Topological acoustic polaritons: Robust sound manipulation at the subwavelength scale," *New J. Phys.*, vol. 19, no. 7, 2017.

[54] B. Orazbayev and R. Fleury, "Quantitative robustness analysis of topological edge modes in C6 and valley-Hall metamaterial waveguides," *Nanophotonics*, vol. 8, no. 8, pp. 1433-1441, 2019.

[55] O. A. Peverini et al., "Additive manufacturing of Ku/K-band waveguide filters: A comparative analysis among selective-laser melting and stereolithography," *IET Microwaves, Antennas Propag.*, vol. 11, no. 14, pp. 1-7, 2017.

[56] Z. Liu, "Locally Resonant Sonic Materials," *Science* (80-.)., vol. 289, no. 5485, pp. 1734-1736, 2000.

[57] M. L. Cowan, J. H. Page, and P. Sheng, "Ultrasonic wave transport in a system of disordered resonant scatterers: Propagating resonant modes and hybridization gaps" *Phys. Rev.* 8-*Condens. Matter Mater. Phys.*, vol. 84, no. 9, pp. 1-9, 2011.

[58] M. Bayindir, B. Temelkuran, and E. Ozbay, "Tight-binding description of the coupled defect modes in three-dimensional photonic crystals," *Phys. Rev. Lett.*, vol. 84, no. 10, pp. 2140-2143, 2000.

[59] J. Scheuer, G. T. Paloczi, J. K. S. Poon, and A. Yariv, "Coupled Resonator Optical Waveguides Toward the Slowing & Storage of Light," *Opt. Photonics News*, no. February, pp. 0-4, 2005.

[60] J. K. Poon, L. Zhu, G. A. DeRose, and A. Yariv, "Transmission and group delay of microring coupled-resonator optical waveguides," *Opt. Lett.*, vol. 31, no. 4, p. 456, 2006.

[61] F. Xia, L. Sekaric, and Y. Vlasov, "Ultracompact optical buffers on a silicon chip," *Nat. Photonics*, vol. 1, no. 1, pp. 65-71, 2007.

The entire contents of each of the above reference being herewith incorporated by reference.

The invention claimed is:

1. Microwave or millimeter wave passive device comprising:

a hollow waveguide including a first wall structure and a second wall structure extending in a guiding direction, and an interconnecting base extending between at least the first and second wall structures, at least one array of radiatively coupled first resonant structures enclosed inside the hollow waveguide, the at least one array of radiatively coupled first resonant structures configured to provide radiatively coupled local resonators and at least one microwave or millimeter wave frequency passband for providing at least one selected microwave or millimeter wave signal, the array extending along the guiding direction and being located between at least the first and second wall structures, wherein each first resonant structure extends from the interconnecting base into the hollow waveguide to define a microwave or millimeter wave subwavelength resonant structure, and wherein successive resonant structures are separated by a microwave or millimeter wave subwavelength distance, and wherein an operating frequency $f_o$ of the microwave or millimeter wave passive device is located in the at least one microwave or millimeter wave frequency passband, and the at least one array of radiatively coupled first resonant structures is configured to generate at least one hybridization bandgap in a frequency characteristic characterizing microwave or millimeter wave propagation in the microwave or millimeter wave passive device, wherein the at least one hybridization bandgap is a stopband frequency range in which the microwave or millimeter wave propagation is prohibited by fano-interference between a propagating electromagnetic wave and localized resonance modes of the first resonant structures; and wherein the at least one hybridization bandgap is located in a frequency range higher than the at least one microwave or millimeter wave frequency passband; and a resonance frequency $f_r$ of the each of the first resonant structures is located in the at least one hybridization bandgap, the resonance frequency $f_r$ being the frequency of the local resonator generated by the first resonant structure; and a subwavelength guided mode, that is a propagating mode of the waveguide of the microwave or millimeter wave passive device, having the operating frequency $f_o$ that is (i) below or less than a resonance frequency $f_r$ of the first resonant structures, and (ii) located in the at least one microwave or millimeter wave frequency passband.

2. Microwave or millimeter wave passive device according to claim 1, further including a first metamaterial port or connector including a plurality of radiatively coupled second resonant structures configured to couple or transfer an electromagnetic wave into the microwave or millimeter wave passive device, and/or a second metamaterial port or connector including a plurality of radiatively coupled second resonant structures configured to transfer an electromagnetic wave out of the microwave or millimeter wave passive device, the at least one array of radiatively coupled first resonant structures being located between the first and second metamaterial ports;

wherein the resonance frequency $f_r$ of the first resonant structures of the at least one array is lower than a resonance frequency of the second resonant structures of the plurality of radiatively coupled second resonant structures of the first and/or second metamaterial port.

3. Microwave or millimeter wave passive device according to claim 2, wherein the resonance frequency of the second resonant structures of the plurality of radiatively coupled second resonant structures of the first metamaterial port is higher than a than a cut-off frequency of the hollow waveguide of the first metamaterial port, and/or a resonance frequency of the second resonant structures of the plurality of radiatively coupled second resonant structures of the second metamaterial port is higher than a than a cut-off frequency of the hollow waveguide of the second metamaterial port.

4. Microwave or millimeter wave passive device according to claim 2, wherein a width of the hollow waveguide of the first metamaterial port is greater than two-times a height $h_r$ of the second resonant structures or of each second resonant structure of the first metamaterial port, and/or a width of the hollow waveguide of the second metamaterial port is greater than two-times a height $h_r$ of the second resonant structures or of each second resonant structures of the second metamaterial port.

5. Microwave or millimeter wave passive device according to claim 2, wherein the radiatively coupled second resonant structures of the first metamaterial port are arranged in a periodic or aperiodic pattern, or arranged randomly inside the hollow waveguide of the of the first metamaterial port, and/or the radiatively coupled second resonant structures of the second metamaterial port are arranged in a periodic or aperiodic pattern, or arranged randomly inside the hollow waveguide of the of the second metamaterial port.

6. Microwave or millimeter wave passive device according to claim 2, wherein a height $h_r$ of the second resonant structures of the first metamaterial port and a distance between the second resonant structures of the first metamaterial port define a frequency or frequency range at or in which at least one selected microwave or millimeter wave signal is admitted into the microwave or millimeter wave passive device.

7. Microwave or millimeter wave passive device according to claim 1, further including an enclosure extending between the first and second wall structures, the enclosure being located opposite the interconnecting base.

8. Microwave or millimeter wave passive device according to claim 1, wherein the resonance frequency $f_r$, which is resonance frequency of the first resonant structures inside the hybridization bandgap, is c/4 $h_r$, where $h_r$ is the height of each of the first resonant structures and c is the speed of light.

9. Microwave or millimeter wave passive device according to claim 1, wherein a width of the hollow waveguide is less than two-times a height $h_r$ of one or each first resonant structure.

10. Microwave or millimeter wave passive device according to claim 1, wherein a width of the hollow waveguide is tapered or gradually changes along the guiding direction; and wherein a height h of the hollow waveguide is tapered or gradually changes along the guiding direction.

11. Microwave or millimeter wave passive device according to claim 1, wherein a periodicity, radius, or height $h_r$ of the first resonant structures is tapered or gradually changes along the guiding direction.

12. Microwave or millimeter wave passive device according to claim 1, wherein the hollow waveguide extends along the guiding direction in a twisted manner or in a curved manner to define at least one bend;

wherein the first resonant structures of the at least one array are relatively inclined with respect to each other along the guiding direction of the twisted hollow waveguide.

13. Microwave or millimeter wave passive device according to claim 1, wherein a distance between the at least one array and the first wall structure and/or the second wall structure defines a bandwidth of the microwave or millimeter wave frequency passband.

14. Microwave or millimeter wave passive device according to claim 1, wherein the microwave or millimeter wave passive component is configured to define a bandwidth of the microwave or millimeter wave frequency passband by changing a cut-off frequency $f_c$ of the hollow waveguide.

15. Microwave or millimeter wave passive device according to claim 1, wherein the first resonant structures are configured to generate the hybridization bandgap.

16. Microwave or millimeter wave passive device according to claim 1, wherein each of the first resonant structures comprises an elongated conductive element of subwavelength extension or length.

17. Microwave or millimeter wave passive device according to claim 1, wherein the resonance frequency $f_r$ of the first resonant structure is defined by a length and/or elongated extension of the first resonant structure.

18. Microwave or millimeter wave passive device according to claim 1, further including a resonant metamaterial located between the at least one array of radiatively coupled first resonant structures and the first wall structure, and a resonant metamaterial located between the at least one array of radiatively coupled first resonant structures and the second wall structure, wherein the resonant metamaterial is configured to induce a forbidden frequency band and comprises a plurality and/or bed of elongated conductive bodies.

19. Microwave or millimeter wave passive device according to claim 1, wherein the hollow waveguide is resonant metamaterial-free or artificial wall-free between the at least one array of radiatively coupled first resonant structures and the first wall structure, and is resonant metamaterial-free or artificial wall-free between the at least one array of radiatively coupled first resonant structures and the second wall structure.

20. Microwave or millimeter wave passive device according to claim 1 further including a first terminal or probe and a second terminal or probe, the array being located between the first and second terminals, wherein the first terminal or probe and/or the second terminal or probe comprise a strip terminal or probe.

21. Microwave or millimeter wave passive device comprising:

a hollow waveguide including a first wall structure and a second wall structure extending in a guiding direction, and an interconnecting base extending between at least the first and second wall structures, at least one array of radiatively coupled first resonant structures in the hollow waveguide, the at least one array of radiatively coupled first resonant structures configured to provide radiatively coupled local resonators and at least one microwave or millimeter wave frequency passband for providing at least one selected microwave or millimeter wave signal, the at least one array extending along the guiding direction and being located between at least the first and second wall structures, wherein each first resonant structure extends from the interconnecting base into the hollow waveguide to provide a microwave or millimeter wave subwavelength resonant structure, and wherein successive resonant structures are separated by a microwave or millimeter wave subwavelength distance, wherein an operating frequency $f_o$ of the microwave or millimeter wave passive device is located in the at least one microwave or millimeter wave frequency passband, wherein the at least one array of radiatively coupled first resonant structures is configured to generate at least one hybridization bandgap in the microwave or millimeter wave passive device, wherein the at least one hybridization bandgap is a stopband frequency range in which the microwave or millimeter wave propagation is substantially prohibited by fano-interference between a propagating electromagnetic wave and localized resonance modes of the first resonant structures;

wherein the at least one hybridization bandgap is located in a frequency range higher than the at least one microwave or millimeter wave frequency passband;

wherein a resonance frequency $f_r$ of the each of the first resonant structures is located in the at least one hybridization bandgap, the resonance frequency $f_r$ being the frequency of the local resonator generated by the first resonant structure; and a subwavelength guided mode, that is a propagating mode of the waveguide of the microwave or millimeter wave passive device, having the operating frequency $f_o$ that is (i) no greater than a resonance frequency $f_r$ of the first resonant structures, and (ii) located in the at least one microwave or millimeter wave frequency passband.

* * * * *